(12) United States Patent
Sadlik et al.

(10) Patent No.: US 10,705,404 B2
(45) Date of Patent: Jul. 7, 2020

(54) TIR-MODULATED WIDE VIEWING ANGLE DISPLAY

(71) Applicant: Concord (HK) International Education Limited, Hong Kong (CN)

(72) Inventors: Bram M. Sadlik, Vancouver (CA); Robert J. Fleming, San Jose, CA (US); Steven Gou, Vancouver (CA); Scott W. Ferguson, Pleasanton, CA (US); Rob Hannebauer, Vancouver (CA); Alex Henzen, Bladel (NL)

(73) Assignee: Concord (HK) International Education Limited, Hong Kong (CN)

( * ) Notice: Subject to any disclaimer, the term of this patent is extended or adjusted under 35 U.S.C. 154(b) by 0 days.

(21) Appl. No.: 15/888,956

(22) Filed: Feb. 5, 2018

(65) Prior Publication Data

US 2018/0157144 A1    Jun. 7, 2018

Related U.S. Application Data

(63) Continuation-in-part of application No. 14/903,547, filed as application No. PCT/US2013/049606 on Jul. 8, 2013, now Pat. No. 9,939,707.

(51) Int. Cl.
*G02B 26/00* (2006.01)
*G02F 1/167* (2019.01)
(Continued)

(52) U.S. Cl.
CPC .......... *G02F 1/167* (2013.01); *G02F 1/13306* (2013.01); *G02F 1/195* (2013.01);
(Continued)

(58) Field of Classification Search
CPC ................. G02F 1/167; G02F 1/13306; G02F 1/134309; G02F 2001/1672; G09G 3/344; G09G 2320/068
(Continued)

(56) References Cited

U.S. PATENT DOCUMENTS 3,792,308 A    2/1974  Ota et al.
3,919,031 A    11/1975  White
(Continued)

FOREIGN PATENT DOCUMENTS

AT    333109 T    8/2006
CA    2292441 C    7/2002
(Continued)

OTHER PUBLICATIONS

Mossman, M. A. et al., "A Novel Reflective Image Display Using Total Internal Reflection" Displays Devices, DEMPA Publications, Tokyo JP vol. 25, No. 5 Dec. 1, 2004 pp. 215-221.
(Continued)

*Primary Examiner* — Euncha P Cherry
(74) *Attorney, Agent, or Firm* — Zhong Lun Law Firm

(57) ABSTRACT

The disclosed embodiments relate to lateral migration of particles in a totally internally reflective displays. In certain embodiments, the reflective image displays include partial and full walls to form partitions within the display. The walls mitigate diffusion and lateral migration or drift of electrophoretically mobile particles due to lateral electric fields at adjacent pixels. This improves image quality, bistability and long-term display performance.

19 Claims, 42 Drawing Sheets

(51) Int. Cl.
*G09G 3/34* (2006.01)
*G02F 1/133* (2006.01)
*G02F 1/19* (2019.01)
*G02F 1/1343* (2006.01)
*G02F 1/1681* (2019.01)
*G02F 1/1335* (2006.01)

(52) U.S. Cl.
CPC ....... *G09G 3/344* (2013.01); *G02F 1/133526* (2013.01); *G02F 1/134309* (2013.01); *G02F 1/1681* (2019.01); *G09G 2300/0452* (2013.01); *G09G 2300/08* (2013.01); *G09G 2320/0238* (2013.01); *G09G 2320/068* (2013.01)

(58) Field of Classification Search
USPC ....................................................... 359/296
See application file for complete search history.

(56) References Cited

U.S. PATENT DOCUMENTS

| | | |
|---|---|---|
| 4,025,674 A | 5/1977 | Mizuochi |
| 4,071,430 A | 1/1978 | Liebert |
| 4,203,106 A | 5/1980 | Dalisa et al. |
| 4,648,956 A | 3/1987 | Marshall et al. |
| 4,821,092 A | 4/1989 | Noguchi |
| 5,019,748 A | 5/1991 | Appelberg |
| 5,319,491 A | 6/1994 | Selbrede |
| 5,359,346 A | 10/1994 | Disanto |
| 5,396,350 A | 3/1995 | Beeson et al. |
| 5,596,671 A | 1/1997 | Rockwell, III |
| 5,717,283 A | 2/1998 | Biegelsen et al. |
| 5,871,653 A | 2/1999 | Ling |
| 5,959,777 A | 9/1999 | Whitehead |
| 5,999,307 A | 12/1999 | Whitehead et al. |
| 6,064,784 A | 5/2000 | Whitehead et al. |
| 6,215,920 B1 | 4/2001 | Whitehead et al. |
| 6,300,932 B1 | 10/2001 | Albert |
| 6,304,365 B1 | 10/2001 | Whitehead et al. |
| 6,376,828 B1 | 4/2002 | Comiskey |
| 6,377,383 B1 | 4/2002 | Whitehead et al. |
| 6,384,979 B1 | 5/2002 | Whitehead et al. |
| 6,437,921 B1 | 8/2002 | Whitehead |
| 6,452,734 B1 | 9/2002 | Whitehead et al. |
| 6,515,649 B1 | 2/2003 | Albert et al. |
| 6,532,048 B1 | 3/2003 | Matsui |
| 6,574,025 B2 | 6/2003 | Whitehead et al. |
| 6,671,452 B2 | 12/2003 | Winston et al. |
| 6,751,008 B2 | 6/2004 | Liang et al. |
| 6,787,976 B2 | 9/2004 | Minoura et al. |
| 6,819,471 B2 | 11/2004 | Amundson et al. |
| 6,822,783 B2 | 11/2004 | Matsuda et al. |
| 6,842,279 B2 | 1/2005 | Amundson |
| 6,863,414 B2 | 3/2005 | Ho |
| 6,865,011 B2 | 3/2005 | Whitehead et al. |
| 6,885,496 B2 | 4/2005 | Whitehead et al. |
| 6,891,658 B2 | 5/2005 | Whitehead et al. |
| 6,975,455 B1 | 12/2005 | Kotchick et al. |
| 7,046,439 B2 | 5/2006 | Kaminsky et al. |
| 7,093,968 B2 | 8/2006 | Hsueh et al. |
| 7,116,467 B2 | 10/2006 | Kombrekke et al. |
| 7,164,536 B2 | 1/2007 | Whitehead |
| 7,170,670 B2 | 1/2007 | Webber |
| 7,259,744 B2 | 8/2007 | Arango et al. |
| 7,286,280 B2 | 10/2007 | Whitehead et al. |
| 7,324,263 B2 | 1/2008 | Johnson et al. |
| 7,411,719 B2 | 8/2008 | Paolini et al. |
| 7,422,964 B2 | 9/2008 | Akiyama |
| 7,439,948 B2 | 10/2008 | Johnson et al. |
| 7,454,103 B2 | 11/2008 | Parriaux |
| 7,463,398 B2 | 12/2008 | Feenstra |
| 7,507,012 B2 | 3/2009 | Aylward et al. |
| 7,515,326 B2 | 4/2009 | Ibrede et al. |
| 7,564,614 B2 | 7/2009 | Chen et al. |
| 7,660,509 B2 | 2/2010 | Bryan et al. |
| 7,740,387 B2 | 6/2010 | Schults et al. |
| 7,760,417 B2 | 7/2010 | Whitehead |
| 7,775,700 B2 | 8/2010 | Lee |
| 7,830,586 B2 | 11/2010 | Miles |
| 7,852,430 B1 | 12/2010 | Gettmey |
| 7,940,457 B2 | 5/2011 | Jain et al. |
| 8,004,502 B2 | 8/2011 | Keam |
| 8,022,615 B2 | 9/2011 | Bai et al. |
| 8,040,591 B2 | 10/2011 | Whitehead |
| 8,094,364 B2 | 1/2012 | Park |
| 8,111,449 B2 * | 2/2012 | Miyashita ............... G02F 1/167 345/107 |
| 8,179,034 B2 | 5/2012 | Potts et al. |
| 8,384,659 B2 | 2/2013 | Yeo et al. |
| 8,587,512 B2 | 11/2013 | Hiji et al. |
| 8,648,772 B2 | 2/2014 | Hebenstreit et al. |
| 8,690,408 B2 | 4/2014 | Li |
| 9,360,696 B1 | 6/2016 | Ghali et al. |
| 9,377,574 B2 | 6/2016 | Li |
| 9,612,501 B2 | 4/2017 | Whitehead |
| 9,746,740 B2 | 8/2017 | Whitehead |
| 9,897,890 B2 | 2/2018 | Whitehead |
| 9,939,706 B2 | 4/2018 | Whitehead |
| 9,939,707 B2 | 4/2018 | Loxley et al. |
| 2001/0004275 A1 | 6/2001 | Umemoto et al. |
| 2002/0063963 A1 | 5/2002 | Whitehead et al. |
| 2002/0140884 A1 | 10/2002 | Richard |
| 2002/0171910 A1 | 11/2002 | Pullen et al. |
| 2002/0180687 A1 | 12/2002 | Webber |
| 2003/0038755 A1 | 2/2003 | Amundson et al. |
| 2003/0067666 A1 | 4/2003 | Kawai |
| 2003/0165016 A1 | 9/2003 | Whitehead et al. |
| 2003/0179327 A1 | 9/2003 | Nonaka et al. |
| 2003/0214697 A1 | 11/2003 | Duthaler et al. |
| 2004/0085496 A1 | 5/2004 | Paukshto et al. |
| 2004/0136047 A1 | 7/2004 | Whitehead et al. |
| 2004/0160551 A1 | 8/2004 | Wang et al. |
| 2004/0174584 A1 | 9/2004 | Whitehead et al. |
| 2004/0177237 A1 | 9/2004 | Huppenthal et al. |
| 2004/0179145 A1 | 9/2004 | Jacobsen et al. |
| 2004/0239613 A1 | 12/2004 | Kishi |
| 2005/0068287 A1 | 3/2005 | Lin et al. |
| 2005/0270439 A1 | 12/2005 | Weber et al. |
| 2006/0056009 A1 | 3/2006 | Kornbrekke et al. |
| 2006/0148262 A1 | 7/2006 | Lee et al. |
| 2006/0170330 A1 | 8/2006 | Disanto et al. |
| 2006/0209010 A1 | 9/2006 | Ding et al. |
| 2006/0209418 A1 | 9/2006 | Whitehead |
| 2006/0291034 A1 | 12/2006 | Patry et al. |
| 2007/0008739 A1 | 1/2007 | Kim et al. |
| 2007/0019434 A1 | 1/2007 | Lee |
| 2007/0046623 A1 | 3/2007 | Song |
| 2007/0047003 A1 | 3/2007 | Suwabe |
| 2007/0091434 A1 | 4/2007 | Garner et al. |
| 2007/0195231 A1 | 8/2007 | Kuribayashi et al. |
| 2007/0195391 A1 | 9/2007 | Nishikawa et al. |
| 2007/0247573 A1 | 10/2007 | Ouderkirk et al. |
| 2007/0263137 A1 | 11/2007 | Shigeta et al. |
| 2007/0263291 A1 | 11/2007 | Whitehead |
| 2008/0002247 A1 | 1/2008 | Nagato et al. |
| 2008/0024432 A1 | 1/2008 | Lee et al. |
| 2008/0030661 A1 | 2/2008 | Tung et al. |
| 2008/0043184 A1 | 2/2008 | Tung et al. |
| 2008/0174852 A1 | 7/2008 | Hirai et al. |
| 2008/0203910 A1 | 8/2008 | Reynolds |
| 2008/0204854 A1 | 8/2008 | Whitehead et al. |
| 2008/0218845 A1 | 9/2008 | Marakami |
| 2008/0219024 A1 | 9/2008 | Mi et al. |
| 2008/0231960 A1 | 9/2008 | Van Gorkom et al. |
| 2008/0266245 A1 | 10/2008 | Wilcox |
| 2008/0266646 A1 | 10/2008 | Wilcox et al. |
| 2008/0285282 A1 | 11/2008 | Karman et al. |
| 2008/0297496 A1 | 12/2008 | Watson et al. |
| 2008/0303994 A1 | 12/2008 | Jeng et al. |
| 2008/0304134 A1 | 12/2008 | Ban |
| 2009/0201570 A1 | 1/2009 | Frazier et al. |
| 2009/0096745 A1 | 4/2009 | Sprague et al. |
| 2009/0109172 A1 | 4/2009 | Lee et al. |
| 2009/0141221 A1 | 6/2009 | Taguchi et al. |

(56) References Cited

U.S. PATENT DOCUMENTS

| | | |
|---|---|---|
| 2009/0201565 A1 | 8/2009 | Bita et al. |
| 2009/0225398 A1 | 9/2009 | Duthaler et al. |
| 2009/0231714 A1 | 9/2009 | Zhao et al. |
| 2009/0244935 A1 | 10/2009 | Hsieh et al. |
| 2009/0256810 A1 | 10/2009 | Pasquariello |
| 2009/0262083 A1 | 10/2009 | Parekh |
| 2009/0262414 A1 | 10/2009 | Whitehead |
| 2009/0273746 A1 | 11/2009 | Uehara et al. |
| 2009/0322669 A1 | 12/2009 | Bryning et al. |
| 2010/0079843 A1 | 4/2010 | Derichs et al. |
| 2010/0085627 A1 | 4/2010 | Whitehead |
| 2010/0091224 A1 | 4/2010 | Cho et al. |
| 2010/0118383 A1 | 5/2010 | Van Abeeleen et al. |
| 2010/0148385 A1 | 6/2010 | Balko et al. |
| 2010/0172016 A1 | 7/2010 | Park et al. |
| 2010/0225575 A1 | 9/2010 | Ishii et al. |
| 2010/0245375 A1 | 9/2010 | Rhodes |
| 2010/0253711 A1 | 10/2010 | Muroi |
| 2011/0007381 A1 | 1/2011 | Paolini, Jr. et al. |
| 2011/0032460 A1 | 2/2011 | Lee et al. |
| 2011/0043435 A1 | 2/2011 | Hebenstreit et al. |
| 2011/0051054 A1 | 3/2011 | Wang et al. |
| 2011/0085116 A1 | 4/2011 | Kim |
| 2011/0085232 A1 | 4/2011 | Werner et al. |
| 2011/0193241 A1 | 8/2011 | Yen et al. |
| 2011/0273906 A1 | 10/2011 | Nichol et al. |
| 2011/0299014 A1 | 12/2011 | Jang et al. |
| 2011/0304902 A1 | 12/2011 | Yeo et al. |
| 2011/0310465 A1 | 12/2011 | Takanashi |
| 2011/0316764 A1 | 12/2011 | Parry-Jones et al. |
| 2012/0008203 A1 | 1/2012 | Ijzerman et al. |
| 2012/0019896 A1 | 1/2012 | Yoshida et al. |
| 2012/0019899 A1 | 1/2012 | Yeo |
| 2012/0026576 A1 | 2/2012 | Bita et al. |
| 2012/0062981 A1 | 3/2012 | Komatsu et al. |
| 2012/0069064 A1 | 3/2012 | Yamakita |
| 2012/0081777 A1* | 4/2012 | Heikenfeld .......... G02B 26/005 359/290 |
| 2012/0113367 A1 | 5/2012 | Kitson et al. |
| 2012/0113499 A1 | 5/2012 | Komatsu |
| 2012/0262496 A1 | 10/2012 | Swic |
| 2012/0281430 A1 | 11/2012 | Huang et al. |
| 2012/0287380 A1 | 11/2012 | Hagiwara et al. |
| 2012/0293857 A1 | 11/2012 | Kwon et al. |
| 2013/0050806 A1 | 2/2013 | Yasui et al. |
| 2013/0077284 A1 | 3/2013 | Chang et al. |
| 2013/0135320 A1 | 5/2013 | Govil |
| 2013/0139478 A1 | 6/2013 | Cappelle et al. |
| 2013/0155723 A1 | 6/2013 | Coleman |
| 2013/0182311 A1 | 7/2013 | Mochizuki et al. |
| 2013/0250419 A1 | 9/2013 | Lochbihler |
| 2013/0278995 A1 | 10/2013 | Drzaic et al. |
| 2013/0334972 A1 | 12/2013 | Atkins |
| 2014/0049448 A1 | 2/2014 | Christensen |
| 2014/0063586 A1 | 3/2014 | Jung et al. |
| 2014/0160185 A1 | 6/2014 | Okuno et al. |
| 2014/0333989 A1 | 11/2014 | Whitehead |
| 2014/0340376 A1 | 11/2014 | Itagaki et al. |
| 2015/0146273 A1 | 5/2015 | Whitehead |
| 2015/0234250 A1 | 8/2015 | Lin et al. |
| 2015/0352884 A1 | 12/2015 | Fuhse et al. |
| 2016/0026061 A1 | 1/2016 | O'Keeffe |
| 2016/0097961 A1 | 4/2016 | Whitehead |
| 2016/0116815 A1 | 4/2016 | Whitehead |
| 2016/0139306 A1 | 5/2016 | Chatterjee et al. |
| 2016/0139478 A1 | 5/2016 | Whitehead |
| 2016/0147128 A1 | 5/2016 | Loxley et al. |
| 2016/0155399 A1 | 6/2016 | Tripathi et al. |
| 2016/0216561 A1 | 7/2016 | Lee et al. |
| 2016/0231475 A1 | 8/2016 | Whitehead |
| 2016/0246155 A1 | 8/2016 | Loxley et al. |
| 2016/0274435 A1 | 9/2016 | Whitehead |
| 2016/0349592 A1 | 12/2016 | Goulding et al. |
| 2016/0363811 A1 | 12/2016 | Zhong et al. |
| 2016/0377950 A1 | 12/2016 | Zhang |
| 2017/0068145 A1 | 3/2017 | Nakamura et al. |
| 2017/0075184 A1 | 3/2017 | Low et al. |
| 2017/0160444 A1 | 6/2017 | Sadlik |
| 2017/0160448 A1 | 6/2017 | Whitehead |
| 2017/0160620 A1 | 6/2017 | Whitehead |
| 2017/0287406 A1 | 10/2017 | Whitehead |
| 2017/0299935 A1 | 10/2017 | Whitehead |
| 2018/0017838 A1 | 1/2018 | Thomas |
| 2018/0031941 A1 | 2/2018 | Goulding |
| 2018/0173074 A1 | 6/2018 | Zhang |

FOREIGN PATENT DOCUMENTS

| | | |
|---|---|---|
| CA | 2371138 C | 7/2005 |
| CA | 2410955 C | 1/2007 |
| CA | 2474384 C | 8/2010 |
| CA | 2643808 C | 8/2013 |
| CN | 1308734 A | 8/2001 |
| CN | 1173208 C | 10/2004 |
| CN | 1639625 A | 7/2005 |
| CN | 101160547 A | 4/2008 |
| CN | 1454327 A | 9/2008 |
| CN | 1029553189 A | 3/2013 |
| CN | 103207495 A | 7/2013 |
| CN | 108957898 A | 12/2018 |
| DE | 69825894 T2 | 9/2005 |
| EP | 1118039 B1 | 2/2003 |
| EP | 0988573 B1 | 8/2004 |
| EP | 1290486 B1 | 10/2004 |
| EP | 1368700 B1 | 7/2006 |
| JP | 2003535375 A | 11/2003 |
| JP | 200485635 A | 3/2004 |
| JP | 2007505330 A | 3/2007 |
| JP | 2007279641 A | 10/2007 |
| JP | 2009531721 A | 9/2009 |
| JP | 2009251215 A | 10/2009 |
| JP | 2005519329 A | 6/2017 |
| KR | 20070120608 A | 12/2007 |
| KR | 100949412 B1 | 3/2010 |
| TW | 201024886 A | 7/2010 |
| WO | 03/075085 A1 | 9/2003 |
| WO | 2005010604 A1 | 2/2005 |
| WO | 2006108285 A1 | 10/2006 |
| WO | 2006114743 A2 | 11/2006 |
| WO | 2008103554 A1 | 8/2008 |
| WO | 2012021121 A1 | 2/2012 |
| WO | 2014092729 A1 | 6/2014 |
| WO | 2014146937 A2 | 9/2014 |
| WO | 2014160552 A1 | 10/2014 |
| WO | 2014189751 A1 | 11/2014 |
| WO | 2015005899 A2 | 1/2015 |
| WO | 2015061538 A1 | 4/2015 |
| WO | 2015116913 A2 | 8/2015 |
| WO | 2015175518 A1 | 11/2015 |
| WO | 2016057613 A1 | 4/2016 |
| WO | 2016085835 A1 | 6/2016 |
| WO | 2016109273 A1 | 7/2016 |
| WO | 2016130720 A1 | 8/2016 |
| WO | 2007063355 A2 | 6/2017 |
| WO | 2017100157 A1 | 6/2017 |
| WO | 2017105443 A1 | 6/2017 |
| WO | 2017147449 A1 | 8/2017 |
| WO | 2017205312 A1 | 11/2017 |
| WO | 2017214396 A1 | 12/2017 |
| WO | 2017040628 A1 | 3/2018 |

OTHER PUBLICATIONS

Gou, S. et al., "Transparent Superhydrophobic Surfaces for Applications of Controlled Reflectance" Applied Optics vol. 51, Issue No. 11, Apr. 10, 2012, pp. 1645-1653.

Whitehead, L. et al., "The Many Roles of Illumination in Information Display" Society for Information Display Symposium (Invited Paper), Issue No. 0097-966X/06/3701-0000, May 2010.

Wong, R. et al., "Electrochemical Threshold Conditions During Electro-Optical Switching of Ionic Electrophorectic Optical Devices" Applied Optics vol. 48, Issue No. 6, Feb. 20, 2009, pp. 1062-1072.

(56) References Cited

OTHER PUBLICATIONS

Whitehead, L. et al., "Reflections on Total Internal Reflection" Optics and Photonics News Feb. 2009, pp. 28-34.
Whitehead, M. et al., "Observations of Total Internal Reflection at a Natural Super-Hydrophobic Surface" Physics in Canada vol. 64, Issue No. 1, Mar. 2008, pp. 7-11.
Hrudey, P. et al., "Application of Transparent Nanostructured Electrodes for Modulation of Total Internal Reflection" SPIE 2007 Conference Paper No. 6647 Aug. 2007, pp. 1-12.
Hrudey, P. et al., "Variable Diffraction Gratings Using Nanoporous Electrodes and Electrophoresis of Dye Ions" SPIE 2007 Conference Paper No. 6645 Aug. 2007, pp. 1-12.
Webster, A. et al., "Control of Reflection at an Optical Interface in the Absence of Total Internal Reflection for a Retroreflective Display Application" Applied Optics vol. 45, Issue No. 6, Feb. 20, 2006, pp. 1169-1176.
Mossman, M. et al., "Off the Beaten Path with Total Internal Reflection" International Optical Design Conference (Invited Paper), Jun. 2006, pp. 1-12.
Whitehead, L. et al., "Total Internal Reflection for Illumination and Displays" SPIE Newsroom Sep. 7-8, 2006.
Mossman, M. et al., "Controlled Frustration of TIR by Electrophoresis of Pigment Particles" Applied Optics vol. 44, Issue No. 9, Mar. 20, 2005, pp. 1601-1609.
Kwong, V. et al., "Control of Reflectance of Liquid Droplets by Means of Electrowetting" Applied Optics vol. 43, Issue No. 4, Feb. 1, 2004, pp. 808-813.
Mossman, M. et al. "A High Reflectance, Wide Viewing Angle Reflective Display Using Total Internal Reflection in Mirco-Hemispheres" International Display Research Conference, Issue No. 1083-1312/00/2003-0233, Sep. 2003, pp. 233-236.
Mossman, M. et al., "Grey Scale Control of Total Internal Reflection Using Electrophoresis of Sub-Optical Pigment Particles" International Conference of the Society for Information Display, Boston, MA Issue No. 2-0966X/02/3301-0522, May 2002, pp. 522-525.
Coope, R. et al., "Modulation of Retroreflection by Controlled Frustration of Total Internal Reflection" Applied Optics vol. 41, Issue No. 25, Sep. 1, 2002, pp. 5357-5361.
Mossman, M. et al., "New Method for Maintaining Long Term Image Quality in a TIR Based Electrophoretic Display" International Display Research Conference, Nice, France, Eurodisplay Oct. 2002, pp. 851-854.
Mossman, M. et al., "New Reflective Color Display Technique Based on Total Internal Reflection and Subtractive Color Filtering" International Conference of the Society for Information Display, San Jose, CA Issue No. 1-0966X/01/3201-1054, Jun. 2001, pp. 1054-1057.
Whitehead, L. et al., "Visual Applications of Total Internal Reflection in Prismatic Microstructures" Physics in Canada Nov./Dec. 2001, pp. 329-335.
Mossman, M. et al., "A New Reflective Display Based on Total Internal Reflection in Prismatic Microstructures" Proceedings of the 2000 Society for Information Display, International Display Research Conference, Issue No. 1083-1312/00/2001-0311, Oct. 2000, pp. 311-314.
Supplementary European Search Report received for European Patent Application No. 13889042.1, dated Feb. 8, 2017, 10 pages.
International Search Report and Written Opinion received for International Application No. PCT/US2013/049606, dated Jul. 8, 2014, 15 pages.
Kambe, N. et al., "Refractive Index Engineering of nano-Polymer Composites," Symposium, Apr. 20, 2001, 6 pages, Materials Research Society Symposium Proceedings, Pittsburgh, PA.
Robben, B. et al., "Electrodynamics of Electronic Paper Based on Total Internal Reflection," Journal, Sep. 20, 2018, pp. 034041-1-034041-11, DOI 10.1103/PhysRevApplied.10.034041, Americal Physical Society.
Extended European Search Report received for European Patent Application No. 18151942.2, dated Apr. 17, 2018.

\* cited by examiner

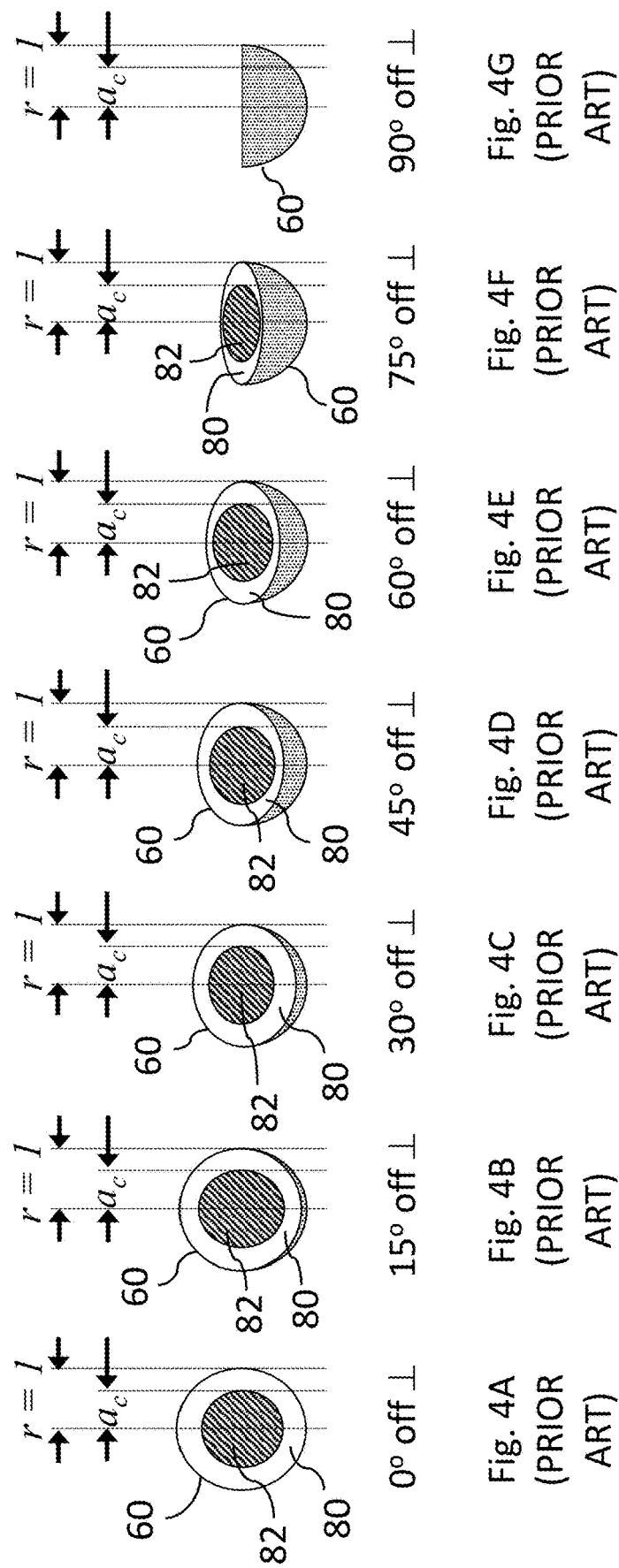

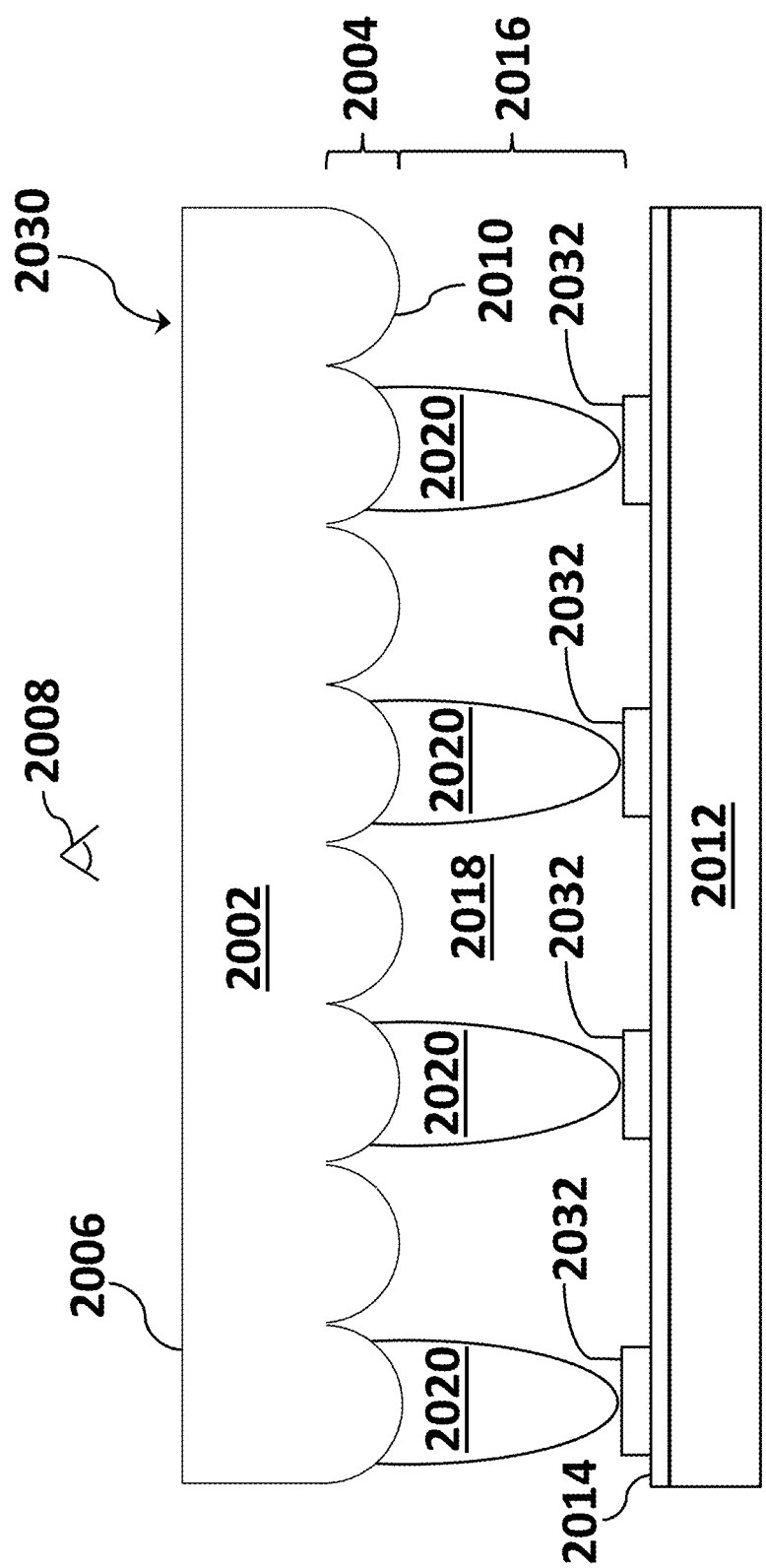

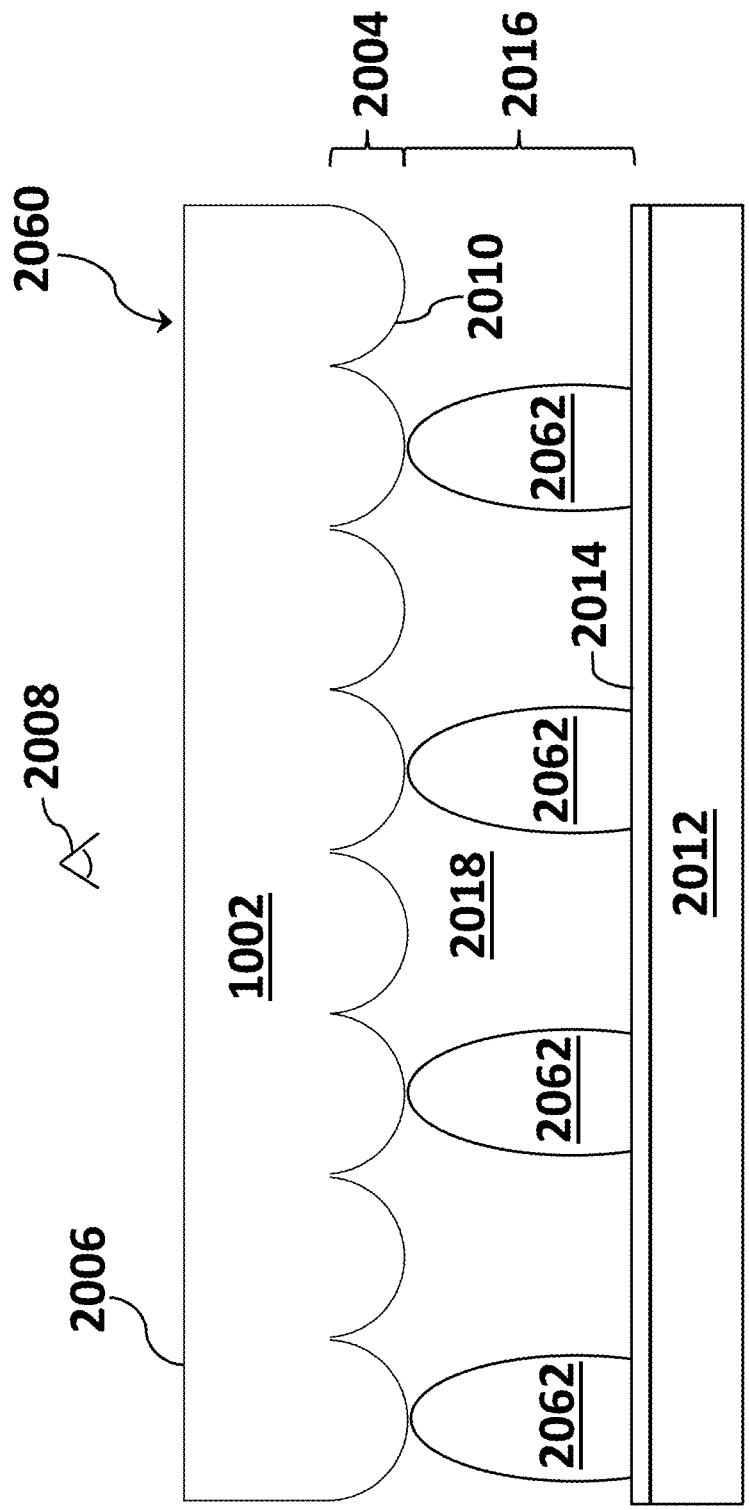

TIR-MODULATED WIDE VIEWING ANGLE DISPLAY

The instant specification is a Continuation-In-Part (CIP) of application Ser. No. 14/903,547 (filed Feb. 5, 2016), which was National Phase application of Application Serial No. PCT/US2013/049606 (filed Jul. 8, 2013). The specification of each of the aforementioned applications is incorporated herein in its entirety.

FIELD

This disclosure pertains to frustration of TIR in high brightness, wide viewing angle displays of the type described in U.S. Pat. Nos. 6,885,496; 6,891,658; 7,286,280; 7,760,417 and 8,040,591; all of which are incorporated herein by reference.

BACKGROUND

FIG. 1A depicts a portion of a prior art reflective (i.e. front-lit) frustrated total internal reflection (TIR) modulated display 10 of the type described in U.S. Pat. Nos. 6,885,496; 6,891,658; 7,286,280; 7,760,417 and 8,040,591. These patents describe an entirely new design of the outward sheet that was previously described in U.S. Pat. Nos. 5,959,777; 5,999,307; 6,064,784; 6,215,920; 6,304,365; 6,384,979; 6,437,921; 6,452,734 and 6,574,025 which comprised of, for example, various spatially uniform prism structures, dielectric light fibers, parallel, and perpendicular and interleaved structures. As a result of the new closely packed, high refractive index, spherical or hemispherical beaded, outward sheet design first described in patents '496' and '658', the practical angular viewing range of frustrated TIR or other reflective display methods was increased. The new design offers semi retro-reflective gain, whereby light rays which are incident on the hemispherical beaded surface are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications.

Display 10 includes a transparent outward sheet 12 formed by partially embedding a large plurality of high refractive index (e.g. $\eta_1 > \sim 1.90$) transparent spherical or approximately spherical beads (it is noted that said spherical or approximately spherical beads may also be referred to herein as "hemispherical beads" or "hemi-beads" or "beads") 14 in the inward surface of a high refractive index (e.g. $\eta_2 \approx \eta_1$) polymeric material 16 having a flat outward viewing surface 17 which viewer V observes through an angular range of viewing directions Y. The "inward" and "outward" directions are indicated by double-headed arrow Z. Beads 14 are packed closely together to form an inwardly projecting monolayer 18 having a thickness approximately equal to the diameter of one of beads 14. Ideally, each one of beads 14 touches all of the beads immediately adjacent to that one bead. Minimal interstitial gaps (ideally, no gaps) remain between adjacent beads.

An electro-active TIR-frustrating medium 20 is maintained adjacent the portions of beads 14 which protrude inwardly from material 16 by containment of medium 20 within a reservoir 22 defined by lower sheet 24. An inert, low refractive index (i.e. less than about 1.35), low viscosity, electrically insulating liquid such as Fluorinert™ perfluorinated hydrocarbon liquid ($\eta_3 \sim 1.27$) available from 3M, St. Paul, Minn. is a suitable fluid for the medium 20. Other liquids such as Novec™ also available from 3M can also be used as the fluid for medium 20. A bead:liquid TIR interface is thus formed. Medium 20 contains a finely dispersed suspension of light scattering and/or absorptive particles 26 such as pigments, dyes, dyed or otherwise scattering/absorptive silica or latex particles, etc. Sheet 24's optical characteristics are relatively unimportant: sheet 24 need only form a reservoir for containment of electro-active TIR-frustrating medium 20 and particles 26, and serve as a support for backplane electrode 48.

As is well known, the TIR interface between two media having different refractive indices is characterized by a critical angle $\theta_c$. Light rays incident upon the interface at angles less than $\theta_c$ are transmitted through the interface. Light rays incident upon the interface at angles greater than $\theta_c$ undergo TIR at the interface. A small critical angle is preferred at the TIR interface since this affords a large range of angles over which TIR may occur.

In the absence of TIR-frustrating activity, as is illustrated to the right of dashed line 28 in FIG. 1A, a substantial fraction of the light rays passing through sheet 12 and beads 14 undergoes TIR at the inward side of beads 14. For example, incident light rays 30, 32 are refracted through material 16 and beads 14. The rays undergo TIR two or more times at the bead:liquid TIR interface, as indicated at points 34, 36 in the case of ray 30; and indicated at points 38, 40 in the case of ray 32. The totally internally reflected rays are then refracted back through beads 14 and material 16 and emerge as rays 42, 44 respectively, achieving a "white" appearance in each reflection region or pixel.

A voltage can be applied across medium 20 via electrodes 46, 48 (shown as dashed lines) which can for example be applied by vapour-deposition to the inwardly protruding surface portion of beads 14 and to the outward surface of sheet 24. Electrode 46 is transparent and substantially thin to minimize its interference with light rays at the bead:liquid TIR interface. Backplane electrode 48 need not be transparent. If TIR-frustrating medium 20 is activated by actuating voltage source 50 to apply a voltage between electrodes 46, 48 as illustrated to the left of dashed line 28, suspended particles 26 are electrophoretically moved into the region where the evanescent wave is relatively intense (i.e. within 0.25 micron of the inward surfaces of inwardly protruding beads 14, or closer). When electrophoretically moved as aforesaid, particles 26 scatter or absorb light, thus frustrating or modulating TIR by modifying the imaginary and possibly the real component of the effective refractive index at the bead:liquid TIR interface. This is illustrated by light rays 52, 54 which are scattered and/or absorbed as they strike particles 26 inside the thin (~0.5 μm) evanescent wave region at the bead:liquid TIR interface, as indicated at 56, 58 respectively, thus achieving a "dark" appearance in each TIR-frustrated non-reflective absorption region or pixel. Particles 26 need only be moved outside the thin evanescent wave region, by suitably actuating voltage source 50, in order to restore the TIR capability of the bead:liquid TIR interface and convert each "dark" non-reflective absorption region or pixel to a "white" reflection region or pixel.

As described above, the net optical characteristics of outward sheet 12 can be controlled by controlling the voltage applied across medium 20 via electrodes 46, 48. The electrodes can be segmented to electrophoretically control the particles suspended in the TIR frustrating, low refractive index medium 20 across separate regions or pixels of sheet 12, thus forming an image.

FIG. 2 depicts, in enlarged cross-section, an inward hemispherical or hemi-bead portion 60 of one of spherical beads 14. Hemi-bead 60 has a normalized radius r=1 and a refractive index $\eta_1$. A light ray 62 perpendicularly incident (through material 16) on hemi-bead 60 at a radial distance a from hemi-bead 60's centre C encounters the inward surface of hemi-bead 60 at an angle $\theta_1$ relative to radial axis 66. For purposes of this theoretically ideal discussion, it is assumed that material 16 has the same refractive index as hemi-bead 60 (i.e. $\eta_1=\eta_2$), so ray 62 passes from material 16 into hemi-bead 60 without refraction. Ray 62 is refracted at the inward surface of hemi-bead 60 and passes into TIR-frustrating medium 20 as ray 64 at an angle $\theta_2$ relative to radial axis 66.

Now consider incident light ray 68 which is perpendicularly incident (through material 16) on hemi-bead 60 at a distance $$a_c = \frac{\eta_3}{\eta_1}$$

from hemi-bead 60's centre C. Ray 68 encounters the inward surface of hemi-bead 60 at the critical angle $\theta_c$ (relative to radial axis 70), the minimum required angle for TIR to occur. Ray 68 is accordingly totally internally reflected, as ray 72, which again encounters the inward surface of hemi-bead 60 at the critical angle $\theta_c$. Ray 72 is accordingly totally internally reflected, as ray 74, which also encounters the inward surface of hemi-bead 60 at the critical angle $\theta_c$. Ray 74 is accordingly totally internally reflected, as ray 76, which passes perpendicularly through hemi-bead 60 into the embedded portion of bead 14 and into material 16. Ray 68 is thus reflected back as ray 76 in a direction approximately opposite that of incident ray 68.

All light rays which are incident on hemi-bead 60 at distances $a \geq a_c$ from hemi-bead 60's centre C are reflected back (but not exactly retro-reflected) toward the light source; which means that the reflection is enhanced when the light source is overhead and slightly behind the viewer, and that the reflected light has a diffuse characteristic giving it a white appearance, which is desirable in reflective display applications. FIGS. 3A, 3B and 3C depict three of hemi-bead 60's reflection modes. These and other modes coexist, but it is useful to discuss each mode separately.

In FIG. 3A, light rays incident within a range of distances $a_c < a \leq a_1$ undergo TIR twice (the 2-TIR mode) and the reflected rays diverge within a comparatively wide arc $\varphi_1$ centered on a direction opposite to the direction of the incident light rays. In FIG. 3B, light rays incident within a range of distances $a_1 < a \leq a_2$ undergo TIR three times (the 3-TIR mode) and the reflected rays diverge within a narrower arc $\varphi_2 < \varphi_4$ which is again centered on a direction opposite to the direction of the incident light rays. In FIG. 3C, light rays incident within a range of distances $a_2 < a \leq a_3$ undergo TIR four times (the 4-TIR mode) and the reflected rays diverge within a still narrower arc $\varphi_3 < \varphi_2$ also centered on a direction opposite to the direction of the incident light rays. Hemi-bead 60 thus has a "semi-retro-reflective," partially diffuse reflection characteristic, causing display 10 to have a diffuse appearance akin to that of paper.

Display 10 has relatively high apparent brightness, comparable to that of paper, when the dominant source of illumination is behind the viewer, within a small angular range. This is illustrated in FIG. 1B which depicts the wide angular range a over which viewer V is able to view display 10, and the angle β which is the angular deviation of illumination source S relative to the location of viewer V. Display's 10's high apparent brightness is maintained as long as β is not too large. At normal incidence, the reflectance R of hemi-bead 60 (i.e. the fraction of light rays incident on hemi-bead 60 that reflect by TIR) is given by equation (1):

$$R = 1 - \left(\frac{\eta_3}{\eta_1}\right)^2 \tag{1}$$

where $\eta_1$ is the refractive index of hemi-bead 60 and $\eta_3$ is the refractive index of the medium adjacent the surface of hemi-bead 60 at which TIR occurs. Thus, if hemi-bead 60 is formed of a lower refractive index material such as polycarbonate ($\eta_1 \sim 1.59$) and if the adjacent medium is Fluorinert ($\eta_3 \sim 1.27$), a reflectance R of about 36% is attained, whereas if hemi-bead 60 is formed of a high refractive index nano-composite material ($\eta_1 \sim 1.92$) a reflectance R of about 56% is attained. When illumination source S (FIG. 1B) is positioned behind viewer V's head, the apparent brightness of display 10 is further enhanced by the aforementioned semi-retro-reflective characteristic.

As shown in FIGS. 4A-4G, hemi-bead 60's reflectance is maintained over a broad range of incidence angles, thus enhancing display 10's wide angular viewing characteristic and its apparent brightness. For example, FIG. 4A shows hemi-bead 60 as seen from perpendicular incidence—that is, from an incidence angle offset 0° from the perpendicular. In this case, the portion 80 of hemi-bead 60 for which $a \geq a_c$ appears as an annulus. The annulus is depicted as white, corresponding to the fact that this is the region of hemi-bead 60 which reflects incident light rays by TIR, as aforesaid. The annulus surrounds a circular region 82 which is depicted as dark, corresponding to the fact that this is the non-reflective region of hemi-bead 60 within which incident rays are absorbed and do not undergo TIR. FIGS. 4B-4G show hemi-bead 60 as seen from incident angles which are respectively offset 15°, 30°, 45°, 60°, 75°, and 90° from the perpendicular. Comparison of FIGS. 4B-4G with FIG. 4A reveals that the observed area of reflective portion 80 of hemi-bead 60 for which $a \geq a_c$ decreases only gradually as the incidence angle increases. Even at near glancing incidence angles (e.g. FIG. 4F) an observer will still see a substantial part of reflective portion 80, thus giving display 10 a wide angular viewing range over which high apparent brightness is maintained.

Display 10 can exhibit undesirable clustering of particles 26 over time. More particularly, particles 26 tend to form loose agglomerates within the TIR-frustrating medium 20, with the surrounding regions of TIR-frustrating medium 20 containing relatively few suspended particles 26. Such clustering of absorptive particles 26 can cause long-term deterioration of display 10's image quality and overall performance. This invention relates to improvements and modifications of display 10 design such as:

a) Non-uniform distribution of the TIR frustrating, electrophoretically mobile particles on the surfaces of the hemispherical beads in the dark state of the system;
b) Settling and clustering of the TIR-frustrating particles;
c) Non-uniformity of the electric field between the electrodes; and This invention also provides a modified system whereas the dark state depends on the light scattering or absorptive properties of the TIR-frustrating particles within the suspending fluid and not on frustration of TIR.

The foregoing examples of the related art and limitations related thereto are intended to be illustrative and not exclusive. Other limitations of the related art will become apparent to those of skill in the art upon a reading of the specification and a study of the drawings.

BRIEF DESCRIPTION OF DRAWINGS

Exemplary embodiments are illustrated in referenced figures of the drawings. It is intended that the embodiments and figures disclosed herein are to be considered illustrative rather than restrictive.

FIGS. 4A, 4B, 4C, 4D, 4E, 4F and 4G depict the FIG. 2 hemi-bead, as seen from viewing angles which are offset 0°, 15°, 30°, 45°, 60°, 75° and 90° respectively from the perpendicular;

FIG. 20B schematically illustrates a cross-section of a portion of a TIR-based display with rounded walls and base;

FIG. 20C schematically illustrates a cross-section of a portion of a TIR-based display with rounded walls;

DESCRIPTION

Throughout the following description specific details are set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

The present invention has numerous different aspects. Although these various aspects will for convenience and ease of understanding be described seriatim, it will readily be apparent to those skilled in the technology of electrophoretic displays that several aspects of the present invention may be incorporated into a single device. For example, an encapsulated device could also make use of the viscosity modifier, polymer coated particles and high volume fraction aspects of the invention.

Also, in view of the large number of aspects of the present invention, it is convenient to group the various aspects according to which of the aforementioned problems they are primarily designed to address, as follows:

Section A: Non-Uniform Distribution of Particles

Figure 1:
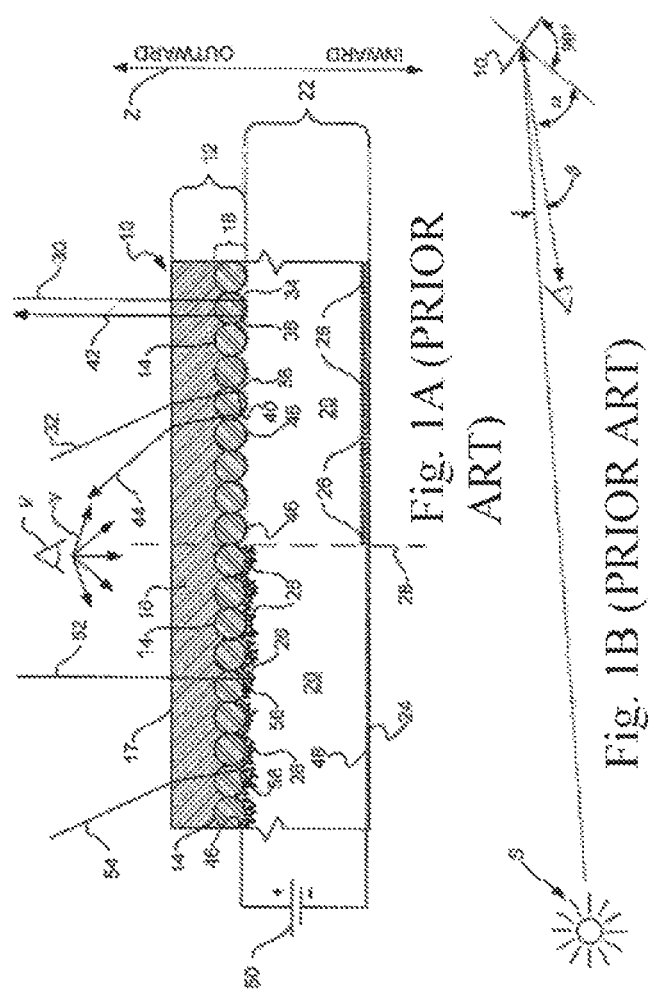
FIG. 1A is a greatly enlarged, not to scale, fragmented cross-sectional side elevation view, of a portion of a TIR frustrated or modulated prior art reflective image display.
FIG. 1B schematically illustrates the wide angle viewing range α of the FIG. 1A display, and the angular range β of the illumination source.
Figure 5:
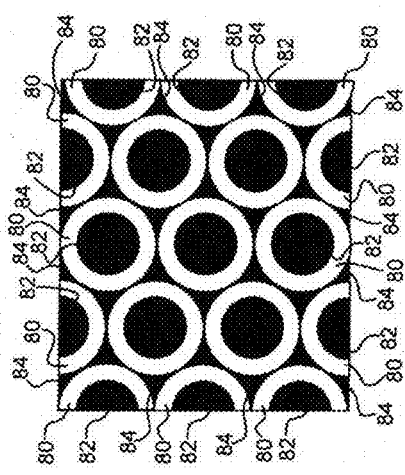
FIG. 5 is a top plan (i.e. as seen from a viewing angle offset 0° from the perpendicular) cross-sectional view of a portion of the FIG. 1A display, showing the spherical beads arranged in a hexagonal closest packed (HCP) structure.
Figures 6A, 6B:
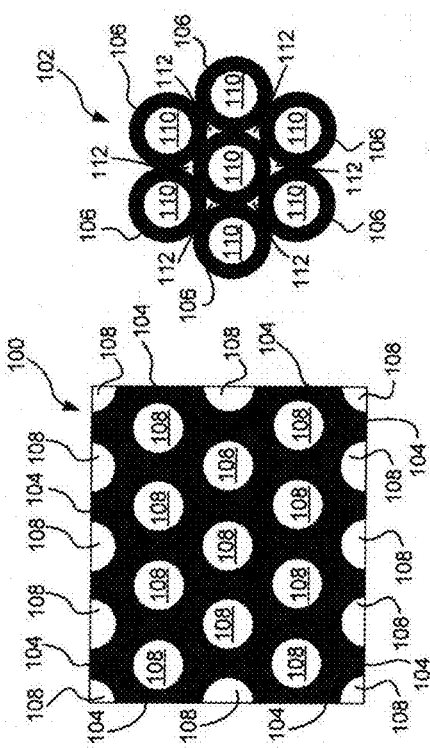
FIGS. 6A and 6B are top plan views, on a greatly enlarged scale, of two alternative backplane electrode patterns for use with the FIG. 5 structure.

In FIG. 1A, a transparent outward sheet formed by partially embedding a large plurality of high refractive index, transparent spherical or approximately spherical beads in the inward surface of a high refractive index polymeric material having a flat outward viewing surface by which a viewer observes through an angular range of viewing directions. The spherical beads are packed closely together to form an inwardly projecting monolayer having a thickness approximately equal to the diameter of one of beads. Ideally, each one of beads touches all of the beads immediately adjacent to that one bead in a hexagonal closest packed (HCP) arrangement as illustrated in FIG. 5, but can also be arranged in a random-like fashion. Minimal interstitial gaps (ideally, no gaps) remain between adjacent beads. Said arrangement of beads is covered by a transparent conductive layer 46 such as indium tin oxide (ITO—other conductive materials, including conductive polymers may alternatively be used such as Baytron™). The rear electrode also shown in FIG. 1A is provided on a planar surface lying parallel to the outward surface of the reflective sheet. Thus, the distance between the two electrodes varies cyclically, in a wave-like manner, as one traverses the surface of the spherical beads.

As will readily be apparent to those skilled in the technology of image display systems, the cyclic variation in the distance between the channel and rear electrodes causes the electric field between these two electrodes to be non-uniform, and this non-uniform electric field is likely to lead to substantially non-uniform distribution of particles on the walls of the beads in the "dark" state in which TIR is intended to be frustrated. This non-uniform distribution may cause parts of the beaded electrode not to be covered by particles, so that TIR does not occur at these non-covered parts, leading to an undesirably high dark state reflectance. Accordingly, if the particle distribution could be made more uniform, the contrast ratio between the dark and light states of the display could be improved.

It is believed (although the present invention is in no way limited by this belief) that when an electric field is applied across the electrodes to move the light absorbing, TIR-frustrating particles adjacent the beaded electrode, said particles will initially concentrate on the areas of maximum field intensity along the non-uniform surface of the beads, and that thereafter, as the electric field continues to be applied, the particles will tend to spread from these areas of maximum field intensity to areas of lower field intensity. Accordingly, using light absorbing particles with a range of electrophoretic mobilities, in accordance with the variable electrophoretic mobility aspect of the present invention, should improve the uniformity of distribution of the particles in the dark state, since the more mobile particles will already have traveled to the areas of maximum field intensity as the less mobile particles are still reaching the areas of maximum field intensity. The electrophoretic mobilities of the particles may vary from about a two-fold to about a five-fold, or higher range, i.e., at least one of the particles should have an electrophoretic mobility which is at least about twice, and preferably at least about five times, that of another of the particles. Also, with or without using such a range of mobilities, it is important to control the duration of the period during which the electric field is applied to the electrodes (the duration of the "driving pulse") since too short a pulse will tend to leave the particles concentrated on the areas of maximum field intensity, whereas too long a pulse will allow most particles to move into the "valleys" (the points furthest distant from the rear electrode) between the beads, in either case producing an undesirably non-uniform coverage of the beaded surface. It is also advantageous to use light absorbing particles with high charges since such highly charged particles, when in close proximity to one another on the surface of the beaded electrode, will coulombically repel one another, and will thus tend to more uniformly distribute themselves over the beaded electrode and frustrate TIR.

Another technique to increase the uniformity of particle distribution in the dark and light states and to prevent lateral migration of the particles is to physically tether the particles to the beaded electrode. Image display systems may usefully be modified by tethering light absorbing, TIR-frustrating particles to each other or to a fixed electrode using polymeric chains or similar tethers. The use of such tethers with larger light absorbing particles in TIR-based reflective display systems is practicable because of the very short distance which the particles need to move between the dark and light states. Because frustration of TIR relies upon the particles disrupting the evanescent wave, which penetrates only about 100-250 nm beyond the surface at which the reflection is notionally taking place, particle movement of about 500 nm is sufficient to cause a shift between the light and dark states of the system, and movements of this magnitude are practicable with tethered particles. If tethered particles are used, close attention should be paid to the fluid in which the light absorbing, TIR frustrating particles are suspended in, since solvation of the tether is an important factor in controlling the conformation of the tether and hence the movement of the tethered particle relative to the electrode, and the degree of solvation can be greatly affected by the composition of the suspending fluid.

Figure 7:
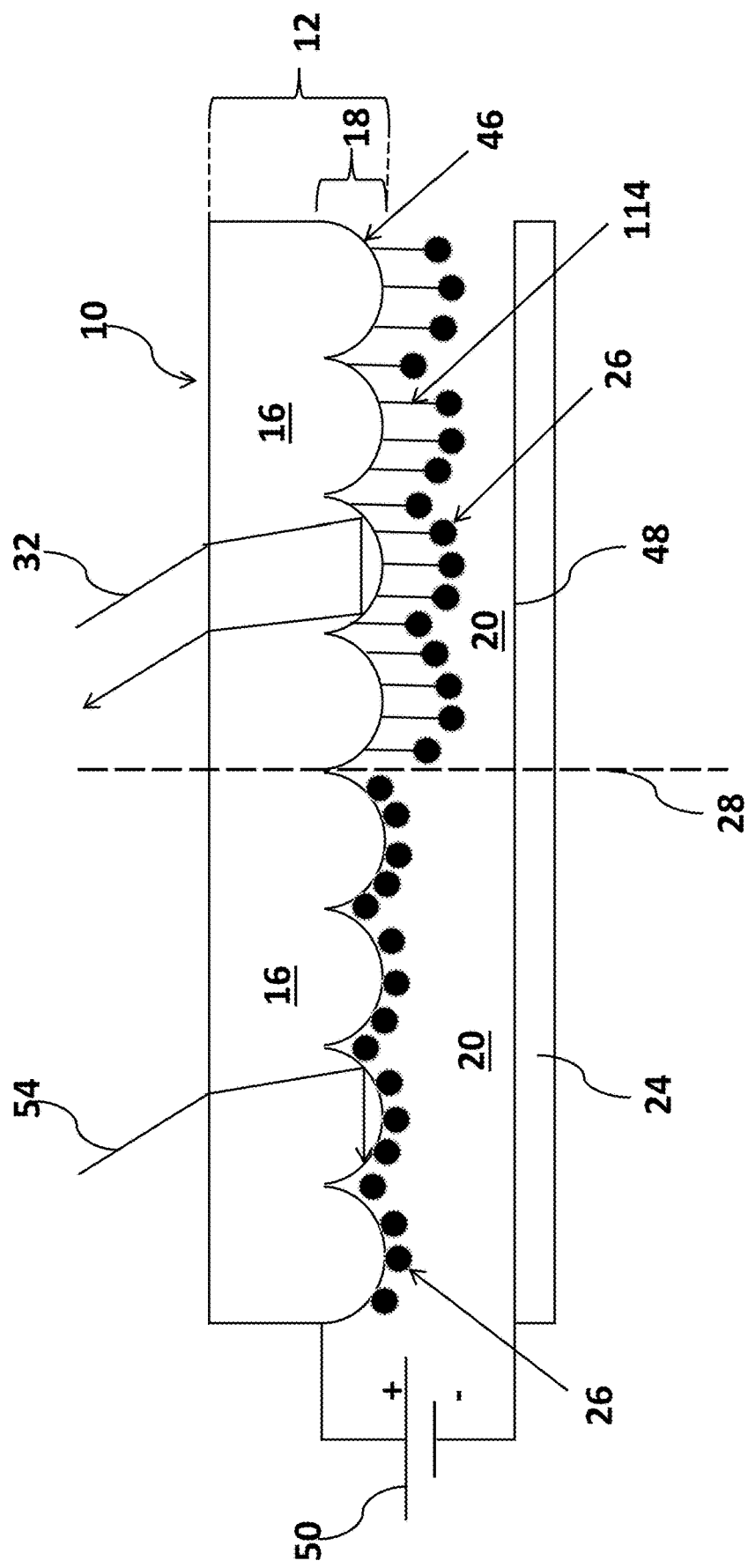
FIG. 7 is a greatly enlarged, not to scale, fragmented cross-sectional side elevation view, of a portion of a TIR frustrated or modulated prior art reflective image display with tethered particles in the light (non-frustrated) and dark (frustrated) state.

A schematic cross-section through a tethered particles image display device of the present invention is shown in FIG. 7. This device comprises a reflecting sheet (better described as a light transmitting member) 12 having a planar outward surface (the top surface as illustrated in FIG. 7; in actual use, this outward surface typically lies in a vertical plane, so that the plane of FIG. 7 is horizontal) through which an observer views the display. The reflecting sheet 12 has an inward surface having the form of a series of spherical or hemispherical beads 18 (in FIG. 7 the hemispherical bead structure is depicted), which form a wave-like surface structure. Between the electrodes 46 and 48 is disposed a fluidic medium 20 having a refractive index which is sufficiently smaller than the refractive index of the reflecting sheet 12 to permit the TIR's previously mentioned to take place. Suspended within the fluidic medium 20 are a plurality of electrically charged particles 26, each of which is connected to the front electrode 46 by an individual flexible filament or tether 114. The tethers 114 can vary in length, and the number of particles 26 is greatly reduced in FIG. 7 for ease of comprehension; in practice, the number of particles 26 is made somewhat greater than that required to form a continuous layer covering the front electrode 46 in order to ensure that when an electric field is applied to bring the particles 26 adjacent the front electrode 46, substantial complete coverage of the electrode 46 by the particles 26 will be achieved, since even a small area of the electrode 46 not covered by the particles 26 can have a substantial adverse effect on the dark state, and hence the contrast ratio, of the display 10.

FIG. 7 illustrates the light state of the display 10 to the right of the dotted line 28, in which light incident on the outward surface of the reflecting sheet 12 undergoes a double TIR and is returned out through the outward surface in the manner already described. If, however, an electric field of appropriate polarity is applied between the electrodes 46 and 48, the particles 26 will move closely adjacent the front electrode 46 to create a dark state as shown to the left of the dotted line (note that the tethers in the dark state have been removed from FIG. 7 for clarity but are assumed to be present). The particles 26 are chosen to have a refractive index greater than that of the fluid medium 20, such that when the particles lie closely adjacent the front electrode 46, TIR is disrupted, and light incident on the outward surface of the reflecting sheet 12 is no longer returned out through the outward surface, so that the device 10 appears dark.

The limited movement needed to switch between the light and dark states in the beaded outward sheet system also has interesting implications as regards the design of electrophoretically mobile particles to be used in these systems. As a first approximation, the layer of light absorbing, TIR frustrating particles covering the beaded electrode in the dark state of such a system may be modeled as a two-dimensional close-packed array of spheres formed on a flat surface. Such a close-packed array leaves voids immediately adjacent the surface, these voids having a form similar to that of a frustum of a triangular pyramid, with the height of this frustum equal to the radius of the spheres. If this radius is significantly larger than the distance by which the evanescent wave penetrates the flat surface, a proportion of the evanescent wavefront will lie within the voids and hence with not be disrupted by the particles, and the same proportion of the light striking the surface will undergo TIR. (It is of course appreciated that the intensity of the evanescent wave decreases exponentially with distance from the surface so that there is, strictly speaking, no wavefront at a specific distance from the surface. Nevertheless, for present qualitative purposes, it is convenient to consider an evanescent wavefront extending parallel to the beaded wave-like surface at a distance such that the intensity of the wave at the wavefront is some arbitrary fraction, say 1/e, of its intensity at the surface.) Accordingly, the diameter of the particles will affect the proportion of the TIR which is frustrated. In general, it appears that for spherical particles, a diameter of about 200-300 nm (in accordance with one part of the controlled shape particles aspect of the present invention) should be most successful in frustrating TIR.

However, in accordance with another part of the controlled shape particles aspect of the present invention, and from the foregoing discussion, it also appears that spherical or near spherical particles are not the optimum shape for frustrating TIR. Essentially, the ideal situation for disrupting the evanescent wave, and thus frustrating TIR, is to form a continuous layer of material at the evanescent wavefront. While it may be impossible to satisfy this condition in practice, to approach as closely as possible to this condition requires that there be as few gaps as possible in the layer of particles at the relevant distance. To the extent that small particles can assist in filling voids between larger particles, use of a mixture of electrophoretically mobile TIR frustrating particles of differing sizes may be advantageous in leaving as few voids as possible. However, formation of an almost-continuous layer is best achieved by using particles which have substantially greater dimensions in directions parallel to the surface than perpendicular to it. Accordingly, using particles in the form of flat plates or prisms or oblate ellipsoids or spheroids should give better frustration of TIR than using spherical particles. The flat plates or prisms desirably have an aspect ratio (the ratio of average diameter to thickness) of at least about 3:1. Specifically, aluminum flakes having an aspect ratio of about 10:1 and an effective major diameter of about 5-15 µm are available commercially and should be very suitable for use in the beaded outward sheet systems. Similar flakes of other metals may also be employed. Other types of high aspect ratio particles may be employed such as nacreous pigments, pearlescent pigments and other high aspect ratio "effect" pigments.

In beaded outward sheet TIR systems, the structure of the beaded surface, and particularly the optical properties thereof, are of crucial importance in promoting effective frustration of TIR and hence good contrast between the light and dark states of the system. For example, the beaded surface could use a conducting polymer as the electrode in place of indium tin oxide (ITO). Alternatively, in accordance with the low refractive index layer aspect of the present invention, the optical properties of the beaded surface might be modified by using a layer of ITO (or similar conductive material) which is thicker than that required to form a sufficiently conductive electrode, or by coating a low refractive index material, such as magnesium fluoride over the ITO. Note that the use of a low refractive index, or indeed other material over the electrode in this manner may be useful in increasing the range of materials which can be used to form the electrodes. Because of the very low refractive index which is required of the liquid medium with suspended TIR frustrating particles in the beaded TIR systems, a good candidate for the choice of said medium is restricted to highly fluorinated liquids. Certain conductive materials otherwise suitable for use as electrodes in the beaded TIR systems, especially certain conductive polymers, may be adversely affected by long term contact with such highly fluorinated liquids. Covering the electrode with a layer of non-conducting material widens the range of conductive materials which can be used with such liquids. The current required to switch a beaded TIR system is sufficiently low that the presence of a thin layer of a material normally regarded as an insulator over one or both of the electrodes does not have a substantial impact on the operation of the system.

Figure 8:
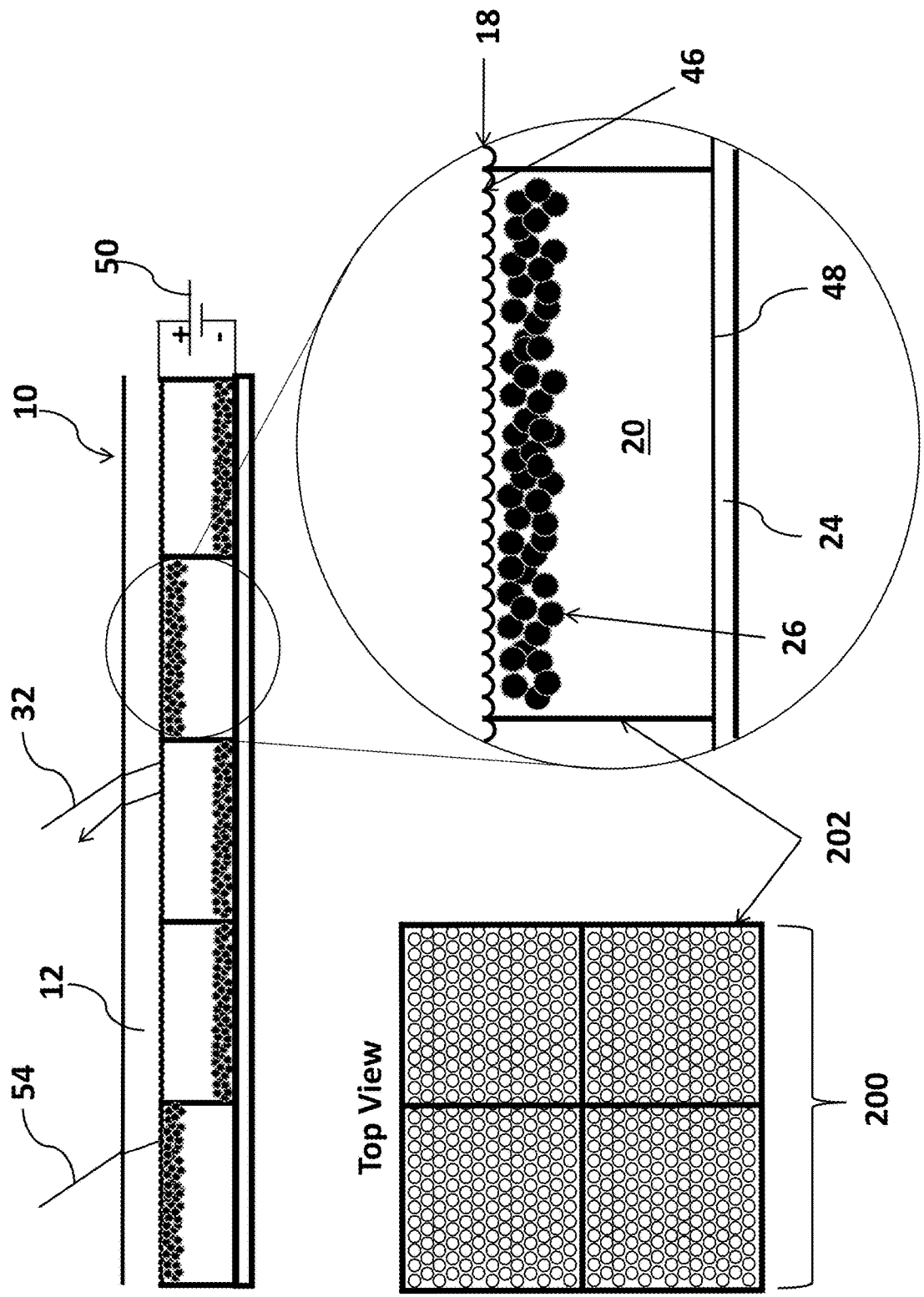
FIG. 8 is a greatly enlarged, not to scale, fragmented cross-sectional side elevation view, of a portion of a TIR frustrated or modulated prior art reflective image display with the TIR-frustrating, electrophoretically mobile particles confined to a square-like shaped micro-cells. A top view of an array of micro-cells and an enlarged view of a single micro-cell is shown.

Another technique to increase the uniformity of particle distribution and to prevent lateral migration of particles is to isolate and corral the plurality of particles contained within the liquid medium into individual compartments. The individual compartments are comprised of walls at regular intervals that can be organized in such a way as to form a macroscopic pattern from a plurality of micro-cells (these may also be referred to as "micro-wells") each of which comprise a low refractive index medium, light absorbing, TIR frustrating particles and any other desired performance enhancing additives. Said macroscopic pattern of micro-cells may comprise a plurality of circle, triangle, square, pentagonal or hexagonal-like walled structures. In one particular embodiment, a schematic cross-section through an image display device of the present invention is shown in FIG. 8, wherein the particles are isolated in a macroscopic array of square-like walled micro-cells. This device designated 10 has a reflecting sheet 12, a support member 24 and electrodes 46 and 48 all of which are identical to the corresponding integers shown in FIG. 1. The light state where the particles are attracted to the rear electrode and away from the beaded front sheet and dark state where the particles are attracted to the beaded front electrode into the evanescent wave region and frustration of TIR of the display are both shown in FIG. 8. A plurality of micro-cells are arrayed in an organized macroscopic arrangement of squares denoted 200 and formed from walls 202. A top view is also shown in FIG. 8 illustrating the side-by-side macroscopic arrangement of micro-cells. The walls of the micro-cells can either be full walls that bridge the rear and front planes and completely encapsulate the liquid medium (as shown in FIG. 8) comprising the light absorbing, TIR frustrating particles or partial walls that do not bridge the rear and front planes completely but enough to slow or prevent migration of particles. The walls may be composed of a polymer material and can be formed into a plurality of wells by numerous techniques such as, but not limited to, molding, pressing, embossing or chemical and physical etching via patterning of a photoresist layer. Other techniques and embodiments for providing an array of micro-cells of the inventions described above will readily be apparent to those skilled in the relevant art.

Another technique to increase the uniformity of particle distribution and to prevent lateral migration of particles is to isolate and corral the plurality of particles contained within the liquid medium by encapsulating the particles 26 and low refractive index medium 20 within a plurality of microcapsules in a beaded outward sheet TIR system 10 described herein. Microcapsules with flexible walls have an advantage when used in a beaded front plane TIR system as opposed to rigid microcapsules. Flexible microcapsules can fill the crevices and voids between the beads on the contoured inward side of the outward sheet electrode surface to resolve optical requirements for TIR displays.

In a beaded outward sheet system using microcapsules, the region lying between the beaded outward sheet electrode and flat rear electrode will be lined with a conforming film of the microcapsule wall material, and obviously the electrophoretically mobile TIR frustrating particles at all times remain separated from the beaded front and planar rear electrodes by the thickness of the microcapsule wall. It is necessary to ensure the particles in contact with the internal surface of the microcapsule wall are sufficiently close to the beaded surface to disrupt the evanescent wave (allowing, of course, for the effect of the refractive index of the microcapsule wall material on the depth of penetration of the evanescent wave) and thus frustrate TIR. There are two approaches to this problem, which may be used separately or in combination. The first approach is to use a microcapsule wall material which has a refractive index which does not differ from the refractive index of the reflective sheet by more than about 0.3, and preferably not more than about 0.2; for example, certain methacrylate polymers have refractive indices within the desired range. In this case, the microcapsule becomes, optically, part of the material forming the beads, and the interface at which TIR occurs is that between the microcapsule wall and the low refractive index medium, and the TIR frustrating particles can thus lie immediately adjacent this interface. The second approach uses a very thin microcapsule wall (less than 200, and preferably less than 100 nm) to ensure that the evanescent wave penetrates into the low refractive index liquid medium. It may also be desirable to increase the viscosity of the medium using a viscosity modifier, and the preferred viscosity modifiers for this purpose are the same as those described below for viscosity modifier devices of the present invention.

Figure 9:
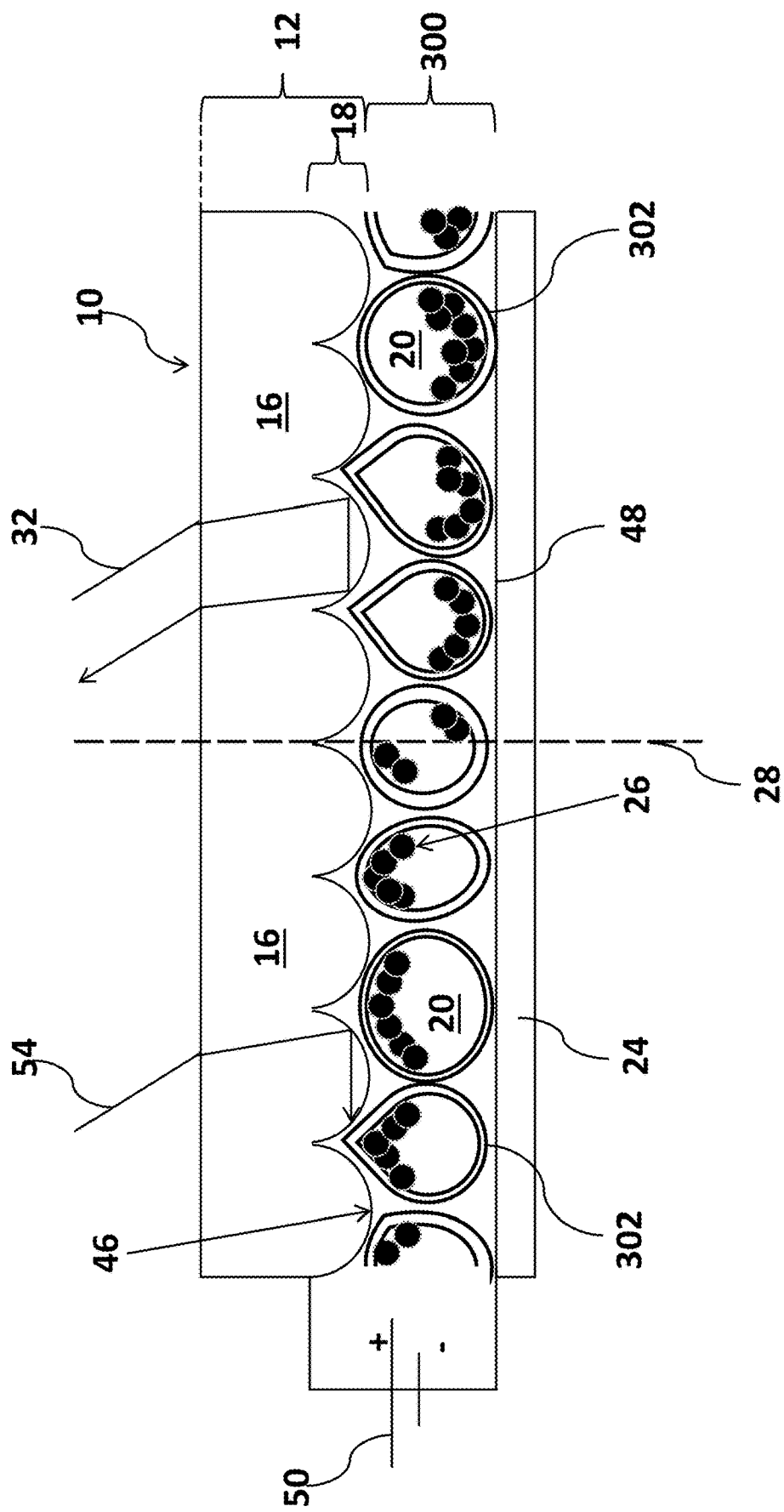
FIG. 9 is a greatly enlarged, not to scale, fragmented cross-sectional side elevation view, of a portion of a TIR frustrated or modulated prior art reflective image display containing a plurality of capsules.

FIG. 9 of the accompanying drawings is a schematic cross-section through an encapsulated device of the present invention. This device designated 10 has a reflecting sheet 12, a support member 24 and electrodes 46 and 48 all of which are identical to the corresponding integers shown in FIG. 1. However, in the device 10 the low refractive index liquid medium 20 and the particles 26 are confined within a plurality of capsules (generally designated 300) each defined by a capsule wall 302. These capsule walls 302 are deformable, so that when the capsules are deposited upon the reflecting sheet 12 and the support 24 thereafter placed on top of the capsules 300 to form the complete device 10. The individual capsule walls 302 deform to substantially fill the space between the sheet 12 and the support 24, assuming the essentially wave-like, beaded surface structure form shown in FIG. 9.

Another approach to increase the uniformity of particle distribution and to prevent lateral migration of particles in beaded outward sheet TIR display systems described herein is to use a polymer-dispersed low refractive index liquid medium which comprises a discontinuous phase containing the liquid medium and light absorbing, electrophoretically-mobile, TIR frustrating particles and a continuous phase essentially free from such particles. The discontinuous phase is comprised of a plurality of droplets, each of which comprise a low refractive index medium and at least one particle disposed within the suspending fluid and capable of moving through the fluid upon application of an electric field, and the continuous phase surrounding and encapsulating the discontinuous phase, the discontinuous phase comprising at least about 40 percent by volume of the liquid medium comprising the electrophoretically mobile particles and any other additives. The continuous phase surrounds and encapsulates the discontinuous phase, thus providing a cohesive medium.

Figure 10:
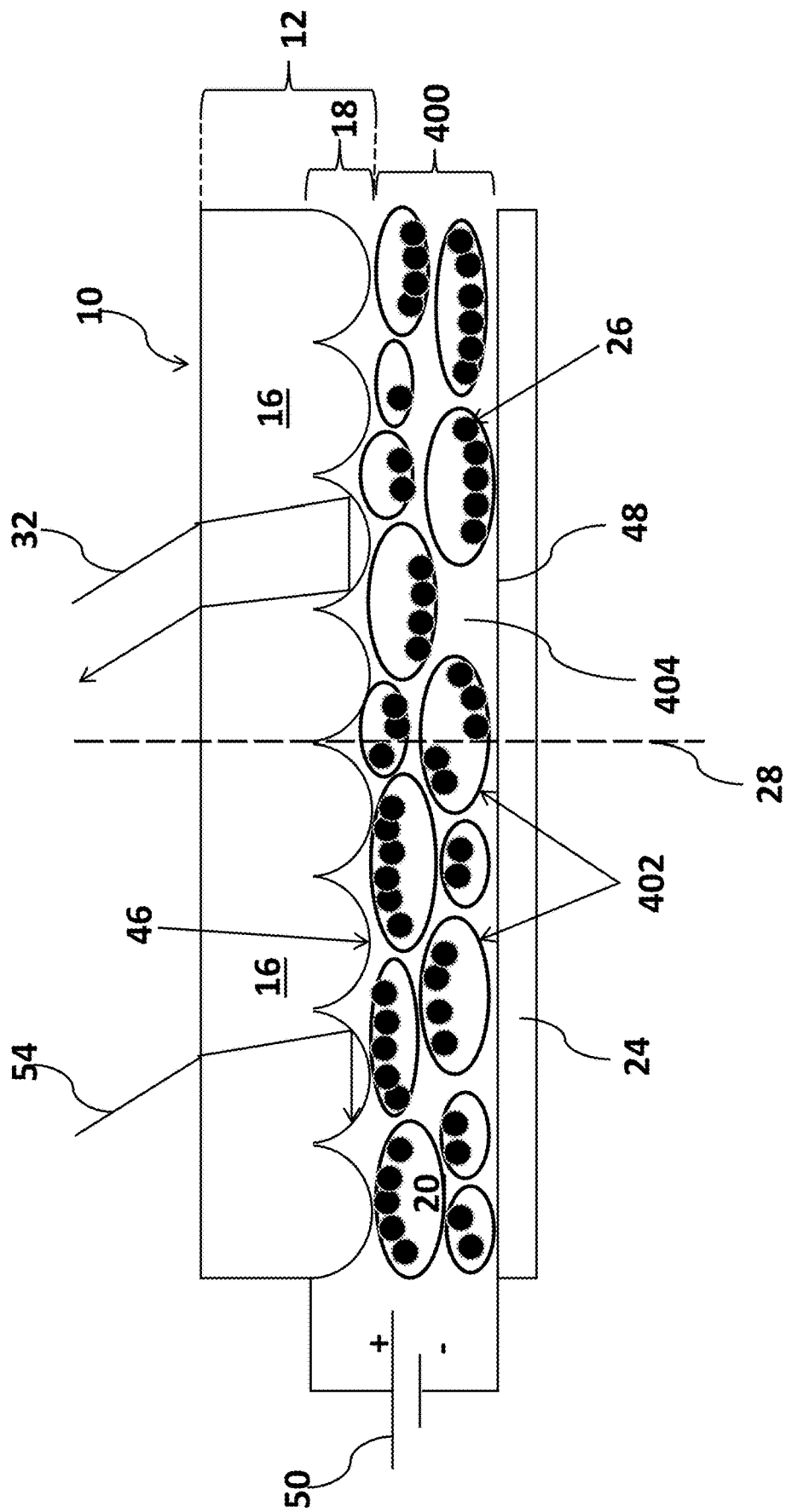
FIG. 10 is a greatly enlarged, not to scale, fragmented cross-sectional side elevation view, of a portion of a TIR frustrated or modulated prior art reflective image display containing a plurality of droplets surrounded by a polymer-based continuous phase.

In the present polymer dispersed medium 400 shown in FIG. 10 lying between the beaded front plane 12 with electrode 46 and rear electrode 48, the discontinuous phase (droplets) may comprise from about 40 to about 95 percent by volume of the medium, but preferably comprises about 50 to about 80 percent by volume. The optimum proportion of droplets will of course vary with the specific materials employed, but will typically be in the range of about 60 to about 70 percent by volume. If the proportion of droplets is too high, the polymer dispersed 400 is mechanically weak and easily damaged, and droplets may leak from the medium upon rough handling. On the other hand, it is undesirable to use a proportion of continuous phase substantially larger than that required to provide mechanical strength to the medium. As is well-known to those knowledgeable concerning related electrophoretic displays, such displays normally comprise a thin layer of the electrophoretic medium between two electrodes, so that at any given operating voltage between the electrodes, the field applied to the electrophoretic medium is inversely proportional to its thickness. If excess continuous phase is used in the present medium, the thickness of the medium needed to provide a given amount of droplets will be unnecessarily increased, so that either the applied field will be reduced (and the switching time of the display thereby increased) or the operating voltage must be increased, either of which is undesirable. An unnecessarily excessive amount of continuous phase will also likely increase the distance of a droplet comprising the electrophoretically mobile TIR, frustrating particles and low refractive index medium from the beaded surface which will have a negative effect on the ability to frustrate TIR.

The droplets may comprise a single type of particle disposed in a low refractive index medium, or two or more types of particles, differing in electrophoretic mobility. The electrophoretically mobile, TIR-frustrating particles may comprise, but not limited to, carbon black. The low refractive index medium may comprise, but not limited to, Fluorinert™ FC-770, FC-43, FC-75, Novec™ 649 or 7500. The droplets are about less than 20 μm in thickness, and the medium comprising the discontinuous droplets and continuous film-forming phase may have a thickness of 50 μm to up to about 200 μm.

As already indicated, the medium 400 of the present invention is prepared by dispersing the droplets in a liquid medium containing a film-forming material, and then subjecting the liquid medium to conditions effective to cause the film-forming material to form a film and thus produce the two-phase polymer dispersed medium in which the film-forming material forms the continuous phase and the droplets for the discontinuous phase. The initial dispersion or emulsification of the droplets in the liquid medium may be effected by any of a variety of conventional techniques, for example rapid stirring of a mixture of the liquid medium and the material which will form the droplets, or sonication of such a mixture. Devices suitable for forming the droplets also include, but are not limited to, blade mixers, rotor-stator mixers and colloid mills, devices in which a liquid stream is pumped at high pressures through an orifice or interaction chamber (such as the Microfluidizer sold by Microfluidics), sonicators, Gaulin mills, homogenizers, blenders, etc. The dispersion or emulsification may also be effected by shearing, using a colloid mill or similar apparatus. It should, however, be noted that the presence of the TIR frustrating particles within the droplets tends to make a dispersion or emulsion of such droplets less stable than a similar emulsion or dispersion of the same materials in which the droplets do not contains solid particles, and hence in the present process it is preferred to use a liquid medium which can solidify rapidly.

The continuous phase which is also referred to as the film-forming material will be organic or bioorganic-based. It may be a gelatin, such as lime-processed gelatin, acid-processed pig gelatin or acid-processed ossein gelatin, or a modified gelatin such as acetylated gelatin, phthalated gelatin, oxidized gelatin, etc. Other film formers include water-soluble polymers and co-polymers including, but not limited to, poly(vinyl alcohol), partially hydrolyzed poly(vinyl acetate/vinyl alcohol), hydroxyethyl cellulose, poly(vinylpyrrolidone), and polyacrylamide. Copolymers of these with hydrophobic monomers, such as t-butyl acrylamide, or isopropyl acrylamide can also be used. Polymeric film formers that are also capable of gelation upon application of high or low temperature are particularly useful. Such materials include the various gelatins described above, cellulosic materials, and homopolymers or copolymers containing isopropyl acrylamide. Additional film formers that may be used are polymers soluble in hydrocarbon-based solvents such as, but not limited to, polyacrylates, polymethacrylates, polyamides, epoxys, silicones and polystyrene. The film forming materials mentioned herein may formed and cured using radiation (typically ultra-violet light-curable), cooling, drying, polymerization, cross-linking, sol-gel formation, and pressure-curing. After curing of the organic polymer film-forming material using the methods described, it will comprise of at least about 5 percent to about 15 percent by weight of the film 400 shown in FIG. 10. The thickness of the final film comprising the discontinuous and continuous phases is at least about 10 μm.

FIG. 10 of the accompanying drawings is a schematic cross-section through an encapsulated device of the present invention which further illustrates the invention. This device designated 10 has a reflecting sheet 12, a support member 24 and electrodes 46 and 48 all of which are identical to the corresponding integers shown in FIG. 1. However, in the device 10 the low refractive index medium 20 (The low refractive index medium may comprise, but not limited to, Fluorinert™ FC-770, FC-43, FC-75, Novec™ 649 or 7500) and the TIR frustrating particles 26 are confined within a plurality of discontinuous phase droplets (generally designated 400) surrounded by a continuous phase 404. These droplets 402 are deformable, so that when the medium 400 comprising the discontinuous droplet phase 402 and the surrounding continuous phase 404 are deposited upon the reflecting sheet 12 and the support 24 and then dried the individual droplets 402 deform and flatten as medium 400 contracts between the sheet 12 and the support 24, as shown in FIG. 9. As medium 400 contracts upon drying and or curing the droplets flatten and become closer to the beaded front plant 12, close enough such that when the dark state is created upon application of an electric field the particles in the droplets are attracted to the beaded front electrode surface into the evanescent wave region and frustrates TIR.

Section B: Settling of Particles

One problem which the beaded outward sheet system described herein 10, shares with many other prior image display systems comprising particles is settling of the TIR frustrating particles under gravity so that after long usage the particles occupy and drift to various locations of the space between the front and rear electrodes leading to an uneven distribution of the particles throughout the low refractive index liquid medium. Note that since, in the beaded outward sheet system, particles are free to move between beads as they are moved from the beaded front electrode to the rear electrode, then in the reverse direction, the systems will suffer from particle settling if the region of the liquid medium 20 between the beaded front plane electrode and flat back electrode 48 lie at an angle to the horizontal, and in most display applications it is impossible to keep the region horizontal when the display is in use.

A technique for dealing with the settling problem is to increase the viscosity of and/or gel the low refractive index fluid medium with the suspended TIR frustrating particles, for example by dissolving a polymer in the liquid medium. Although such an increase in viscosity will decrease the mobility of the particles, and hence the switching time (the time required to switch the display between its dark and light states) will be increased, a modest increase in switching time can be tolerated since the switching times of beaded outward sheet TIR systems can be made very low, because of the very short distances which the particles need to move between the light and dark states. Furthermore, if the viscosity modifier comprises a polymer having an intrinsic viscosity of $\eta$ in the low refractive index medium and being substantially free from ionic or ionizable groups in the low refractive index medium, the polymer being present in the low refractive index is medium in a concentration of from about $0.5\ \eta^{-1}$ to about $2.0\ \eta^{-1}$, very substantial increases in the bistability of the device can be produced at the expense of only a modest increase in switching time. Polymers for use as a viscosity modifier may be, but not limited to, non-aromatic, fluorinated and perfluorinated polyolefins and polysiloxanes with number average molecular weights in excess of about 50,000 and more preferably in excess of about 100,000.

A further technique for reducing, or at least deferring, the effects of particle settling is to reduce the difference in density between the TIR frustrating, electrophoretically mobile particles and the low refractive index medium; this approach also widens the range of materials which can be used in such particles. The density of many types of TIR frustrating particles can be reduced by attaching polymer chains. For example, U.S. Pat. No. 6,215,920 recommends using either "dyed or otherwise scattering/absorptive silica particles" or "dyed or otherwise scattering/absorptive latex particles" in TIR systems, because of the low specific gravities of these materials (given as about 1.44 for silica and about 1.5 for latex particles) are tolerable for use with the low specific gravity, low viscosity fluorinated alkane, low refractive index liquid medium with which they are intended to be used. Carbon black may be suitable material for the light absorbing particles but the density of untreated carbon black may be too high to be useful in TIR systems described herein. By attaching polymer chains to the carbon black, its density could be reduced sufficiently to render it useful in such systems. It is recommended that the carbon black particles have from about 1. to about 25 percent by weight of the carbon black of the polymer chemically bonded to, or cross-linked around, the carbon black particles.

Attachment of polymer to the electrophoretically mobile, TIR frustrating particles has uses other than altering the density thereof. For example, such polymer attachment may be useful in increasing or decreasing the effective refractive index of the particles. A high refractive index particle may be useful for increasing optical coupling between the particle and the surface of the beaded front plane electrode, thus promoting efficient frustration of TIR, and for this purpose the polymer coating may contain repeating units derived from arsenic-containing monomers. If a low refractive index particle is desired, the polymer coating may contain repeating units derived from highly fluorinated monomers.

A different approach to the settling problem is to increase the volume fraction of the suspended particles in the low refractive index liquid medium described in U.S. Pat. No. 6,865,011 for TIR display systems comprised of an outward sheet with prism structures. As already noted, to frustrate TIR it is necessary for the particles to be within about 250 nm of the beaded front plane surface. Conversely, a spacing of 500 nm or greater between the beaded surface and the particles will permit full TIR. If the volume fraction of the particles in the low refractive index medium is increased above about 25 percent, and perhaps as high of about 75 percent (depending upon factors such as the size distribution and shape of the particles), the particles will be unable to undergo substantial settling, since they almost "fill" the liquid medium 20, but when an electric field of appropriate polarity to cause a "white" state of the display is applied between the electrodes, a narrow gap, conforming to the shape of the beaded surface, will be cleared of the electrophoretically mobile TIR frustrating particles, thus permitting TIR to occur. A dispersant such as, but not limited to, Krytox™ 157-FSL, Krytox™ 157-FSM or Krytox™ 157-FSH fluorinated oil (respectively having specified molecular weights of approximately 2500, 3500-4000 and 7000-7500, CAS Registry No. 860164-51-4, DuPont Performance Lubricants, Wilmington, Del. 19880-0023) is preferably added to the suspension to facilitate stable suspension of the particles in the low refractive index medium.

Section C: Non-Uniformity of Electric Field

One problem in beaded outward sheet TIR display systems is the non-uniformity of the electric field between the planar rear electrode and the non-planar, wave-like beaded front plane electrode surface. This problem is best overcome by making the rear electrode substantially conform to that of the beaded electrode so that a gap of substantially constant width (though having a wave-like form as seen in cross-section) remains between the electrodes. The electric field between such electrodes, except in the adjacent peaks, valleys and recesses of the contoured surface, will lie perpendicular to the electrode surfaces.

Figure 11:
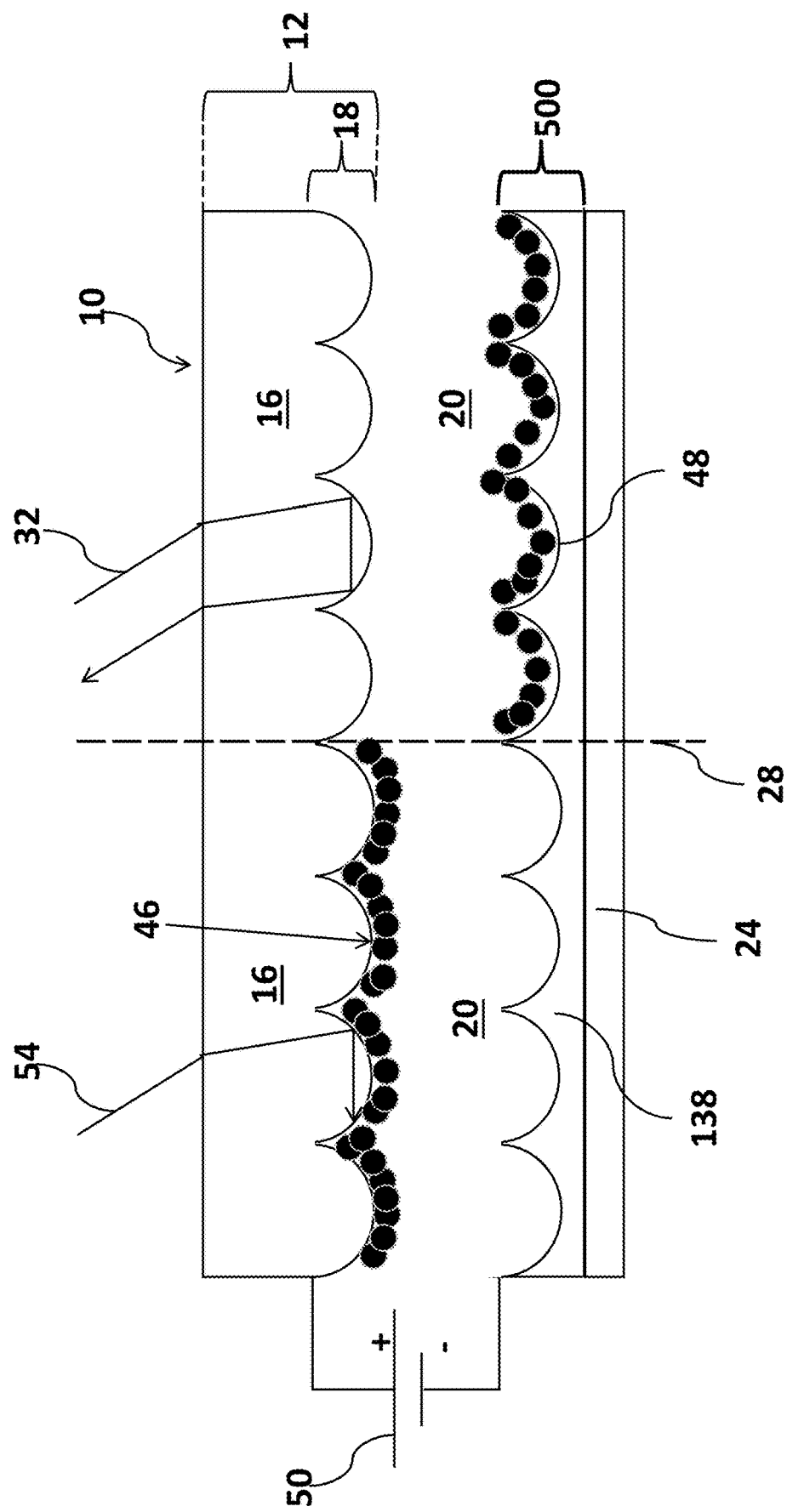
FIG. 11 is a greatly enlarged, not to scale, fragmented cross-sectional side elevation view, of a portion of a TIR frustrated or modulated prior art reflective image display containing a conforming backplane.

The shaping of the rear electrode can be effected in various ways. The material supporting the back electrode could be a polymer to provide the desired conforming shape of the rear electrode and coated with a conductor in the same way as for the beaded front plane electrode. To provide proper alignment between the two electrodes, it may be desirable to provide projections on one of the electrode-bearing sheets, with corresponding recesses on the other. Alternatively, the rear electrode itself could be shaped to provide the appropriate surface. For example, a layer of metal could be deposited on a substrate and shaped, possibly by electrochemical machining, to provide the necessary conforming surface shape of the rear electrode. A further possibility is shown in FIG. 11 of the accompanying drawings, which illustrates a system comprising a conforming rear support 500 and electrode 48. As shown in FIG. 11, this system (generally designated 10) has a reflecting sheet 12, a space comprising of the electrophoretically mobile, TIR frustrating particles and low refractive index liquid medium, a support member 24 and electrodes 46 and 48 all of which are identical to the corresponding integers shown in FIG. 1. The conforming backplane system 500 of the display system 10 closely conforms to the shape of the beaded front plane 18 so that only a thin layer of liquid medium 20 containing electrophoretically mobile particles 26 is present in the system. The beaded front plane outward sheet structure 12 and the conforming backplane structure 500 may preferably be registered with respect to each other but also may be slightly offset with respect to each other.

Instead of using a shaped backplane to control the movement of the particles in a beaded outward sheet TIR display system described herein, particle movement could be controlled by using a mixture of two immiscible liquids as the electrophoretically controlled medium. If the medium comprises two immiscible liquids, one of which wets the beaded electrode material and the other does not (it being assumed that the rear electrode is formed of a different material which is not wetted by the first liquid) and the proportions of the two liquids are adjusted appropriately, the "wetting" liquid will form a thin layer adjacent and conforming to the beaded electrode. The properties of the particles can be adjusted so that the particles have a lower free energy when dispersed in one of the liquids than in the other. Accordingly, the particles may only move within the layer of the wetting liquid. Alternatively, movement of the particles between the two liquids could be used to provide a threshold for switching of the system, thus opening up the possibility of passive matrix driving of the system.

Finally, a beaded outward sheet TIR display system may be modified by using particles containing multiple absorption or scattering centers. Consider a "raisin bun" particle in which a plurality of small light-scattering and/or light-absorptive centers (formed, for example, from carbon black) are distributed within a light-transmissive matrix. If such particles are present in a beaded outward sheet system adjacent the surface at which TIR would otherwise occur (at the beads), and the refractive index of the matrix is not too dissimilar to that of the material forming the surface, the light reaching the surface will enter the matrix and will be scattered and/or absorbed by the various centers, so that essentially none of the light emerging from the surface re-enters that surface. The optical effect of the particle will thus be identical to frustrated TIR, although achieved by a different mechanism. This type of particle permits a wider choice of materials to be used in beaded TIR systems.

The inventions described in Sections A-C to prevent particle migration and settling and to reduce or eliminate non-uniformity in the electric field in beaded front plane, TIR-frustratable displays may be used in applications such as, but not limited to, electronic book readers, portable computers, tablet computers, cellular telephones, smart cards, signs, watches, shelf label or flash drives.

According to certain embodiments of the disclosure, a TIR based image display comprises an array of inward convex protrusions and one or both of partial or full walls forming compartments. The compartments formed from walls confine the electrophoretically mobile particles either fully or partially within the partition formed by the walls.

In an exemplary embodiment, the walls further comprise a dielectric layer. The compartments may be substantially aligned with one or more color filter sub-pixels and one or more thin film transistors (TFTs).

In certain embodiments, the compartments are substantially aligned with a respective one of the color filter sub-pixels. In other embodiments, the compartments are not be substantially aligned with the color filter sub-pixels. The color filter sub-pixels may be substantially aligned with TFTs. A TIR image display may comprise walls that are formed on the convex protrusions or between the convex protrusions or a combination of both. In some embodiments, a TIR image display may comprise one or more dielectric layers on one or more of the front electrode, rear electrode and walls. A TIR image display may comprise a continuous array of convex protrusions and walls. The continuous array of protrusions and walls may be formed simultaneously by one or more of embossing, thermal embossing, injection molding, photolithography, micro-fabrication or micro-replication from a metal shim master. In certain embodiments, walls may be placed on a planarized rear electrode layer. In certain embodiments, using the backplane TFT array as a photo-mask, self-aligned walls may be formed by a photolithographic method.

Figure 12A:
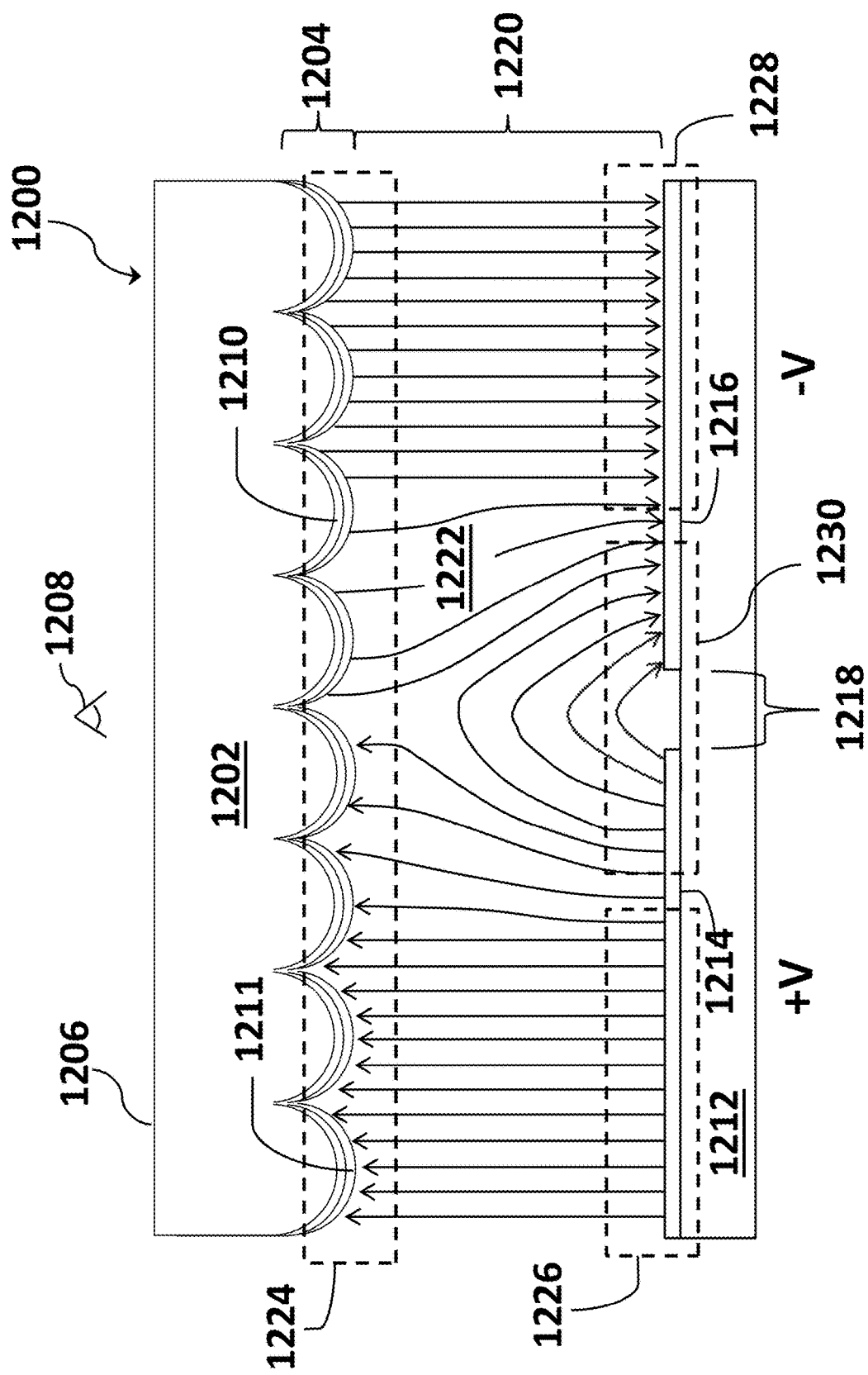
FIG. 12A schematically illustrates electric field lines in a cross-section of a portion of a TIR-based display.

FIG. 12A schematically illustrates electric field lines in a cross-section of a portion of a TIR-based display 1200. A voltage source and electrophoretically mobile particles are not shown for clarity of the illustration but may be included in exemplary embodiments of an operating display. Display 1200 comprises transparent outward sheet 1202, plurality of convex protrusions 1204, front surface 1206 facing viewer 1208, transparent front electrode 1210 and dielectric layer 1211 located on the surface of convex protrusions 1204, rear support 1212, first rear pixel electrode 1214, second rear pixel electrode 1216, gap 1218 between said first and second rear pixel electrodes, cavity 1220 formed by the outward sheet 1202 and rear support 1212 and an air or liquid medium 1222.

Figure 2:
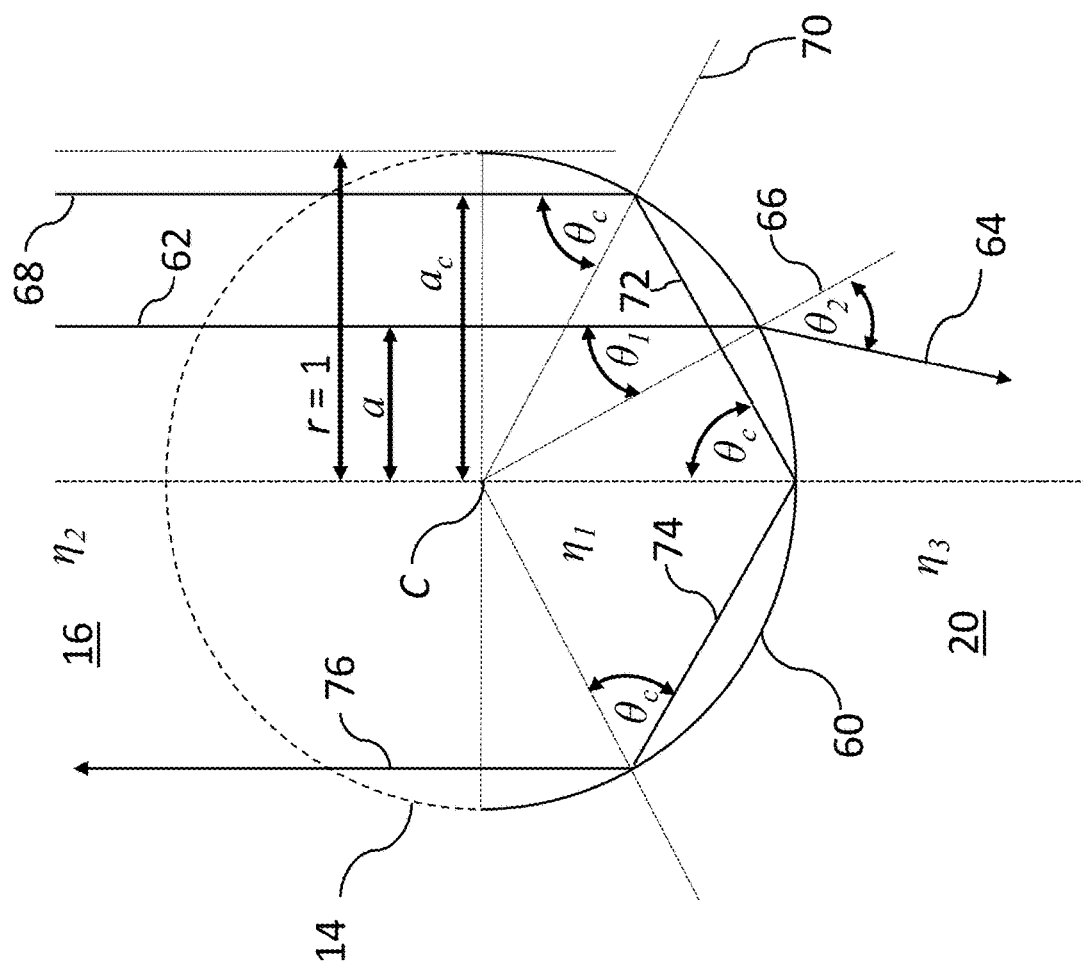
FIG. 2 is a greatly enlarged, cross-sectional side elevation view of a hemispherical ("hemi-bead") portion of one of the spherical beads of the FIG. 1A apparatus.

FIG. 12A illustrates a representative cross-section and the effect of adjacent pixels 1214, 1216 driven to different states, such as black and white, on the electric field lines. The ground electrode 1210, the first pixelated rear or back electrode 1214 (denoted by "+V") and second adjacent pixelated rear or back electrode 1216 (denoted by "−V") in display 1200 in FIG. 12A, are assumed to each be substantially equipotentials. An equipotential is where the magnitude of the voltage bias may be about the same. This is imposed by the conductivity of the material but may have a positive or negative bias. The electric field lines (represented by directional arrows) located within cavity 1220 flow from a higher potential (+V) to a lower potential (−V). It should be noted that electrical conductors that make up the front and rear electrodes may have field lines that leave the surface at right angles (normal) to their surface. This means that near the surface of the electrodes, there may be minimal or very low lateral components to the electric field, thus there are no lateral fields that drive the drift of particles immediately adjacent to the electrode. This is true of the locations 1224, 1226, 1228 marked by dotted line boxes in FIG. 2A.

Near gap 1218 (marked by dotted line box 1230 in FIG. 12A) the electric fields near electrode 1214 are still vertical but they may rapidly turn and point to the lower voltage electrode 1216 that lies nearby. This is because the ground electrode 1210, being much further away, may have little or no influence. The field lines may terminate at the adjacent electrode instead of crossing gap 1220 to the ground electrode 1210.

Figure 12B:
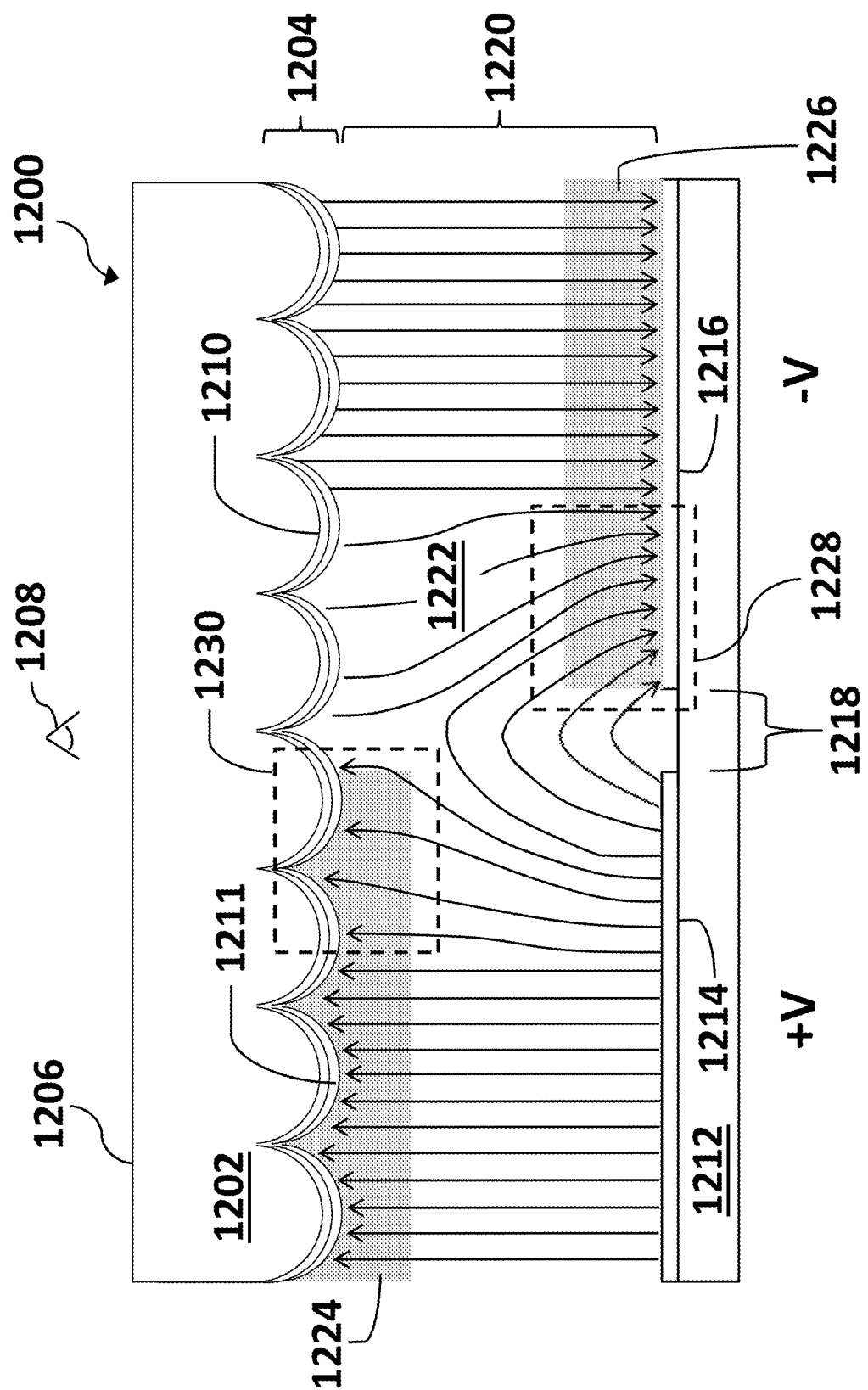
FIG. 12B schematically illustrates electric field lines in a cross-section of a portion of a TIR-based display.

FIG. 12B schematically illustrates electric field lines in a cross-section of a portion of a TIR-based display 1200. FIG. 12B illustrates the greatest effect of the electric field lines on electrophoretically mobile particles in display 1200. Suspended in medium 1222 are pluralities of positively charged electrophoretically mobile particles in shaded areas 1224, 1226. Shaded areas 1224, 1226 represent aggregation of particles in each locations. In this and other example displays in this disclosure, particles 1224, 1226 may comprise a positive charge polarity for illustrative purposes only. In some embodiments one or more of the particles may instead comprise a negative polarity. Particles represented by shaded area 1224 denote where the layer of positively charged particles may be attracted to and reside if attracted to a negative voltage bias at front electrode 1210. Particles represented by shaded area 1226 denote where the layer of particles may be attracted to and reside if attracted to a negative voltage bias at rear electrodes 1216.

In FIGS. 12-15, the electric fields shown indicate the initial forces that are imposed on the particle once the voltage bias is applied. The addition of particles may influence the local electric fields. It must be noted that the electric fields within the cell and the redistribution of charge through electrophoretic motion may be dictated by Gauss's Law. In the differential form, Gauss's Law is expressed in Equation (2) as follows:

$$\nabla \cdot E = \frac{\rho}{\varepsilon_0} \qquad (2)$$

Where $\nabla \cdot E$ is the divergence of the electric field, $\rho$ is the total electric charge density and $\varepsilon_0$ is the electric constant. This shows that the presence of charge directly affects the divergence of the electric field. The end state electric field may be different than those shown herein once the particles are in position against the electrodes.

FIG. 12B illustrates where positively charged particles may be ideally located when electrodes 1214 and 1216 are driven to opposing voltages. If a positive voltage (+V) is applied at rear pixel electrode 1214, the opposing ground electrode 1210 would be at a negative voltage bias. This would attract the positively charged particles to approximately the shaded region 1224. If a negative voltage bias (−V) is applied at rear pixel electrode 1216, the opposing ground electrode 1210 would be at a positive voltage bias. The positively charged particles would be attracted to the rear electrode surface 1216 and may be located approximately in shaded region 1226.

The lateral electric fields may have the most effect on the drift of particles located at rear electrode 1216 in region 1228 (highlighted by a dotted line box). Thus, the drift of the particles may be most affected where pixels are adjacent and are driven to opposite voltages. Charged particles located at the surface may also affect the electric field lines differently than what is illustrated in the Figures. For example, location 1228 in FIG. 12B shows where particle lateral migration into the bulk of cavity 1220 may be greatest. To a lesser extent, particles may laterally migrate away from location 1230 at front electrode 1210 and into the bulk of cavity 1220. The particle migration may be due to particle diffusion. The particles may remain in place at all other locations within the cell where the electric field lines are substantially normal to the front and rear electrodes. The particles may also move slightly where the electric field lines are substantially normal to the front and rear electrodes.

Figure 13:
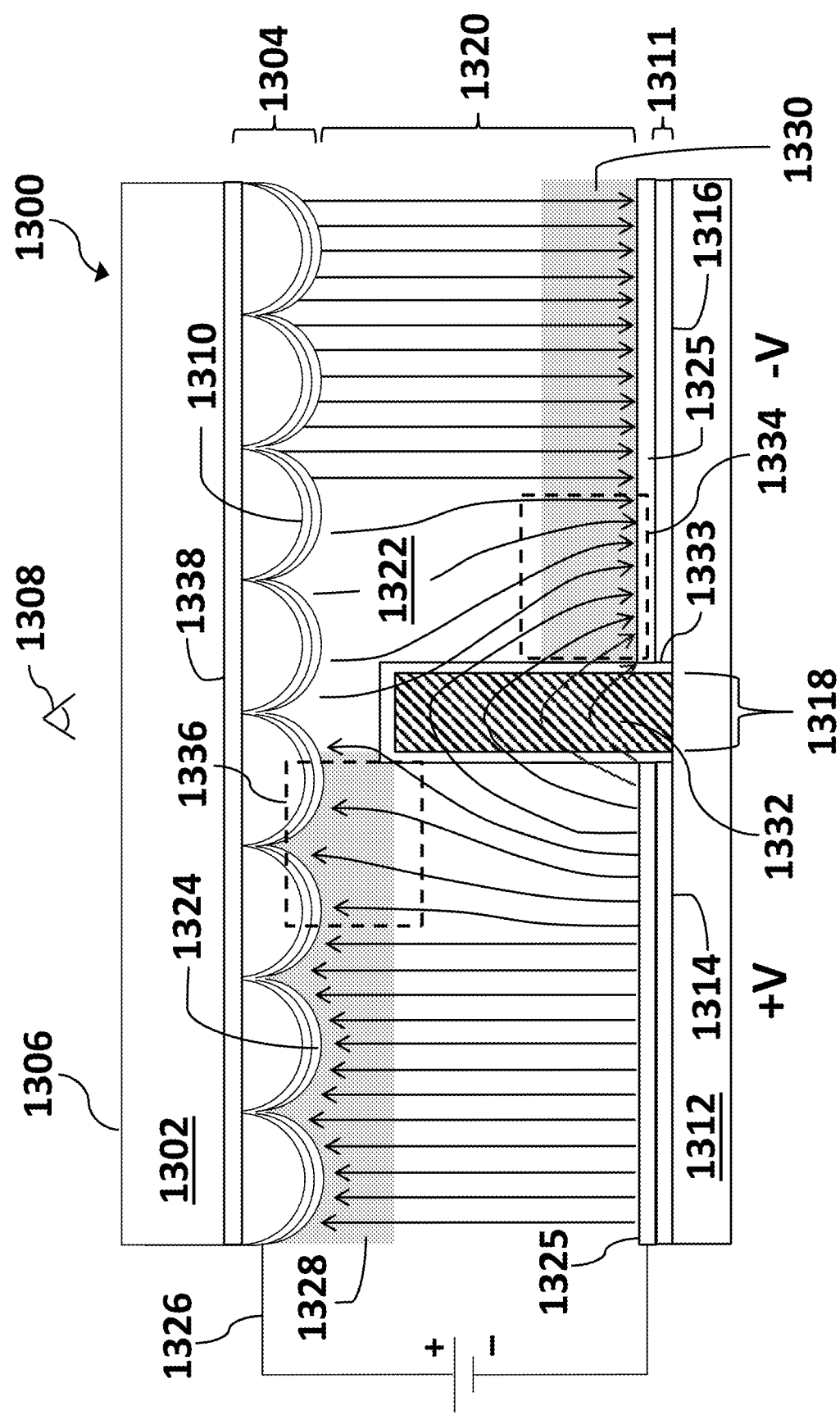
FIG. 13 schematically illustrates electric field lines in a cross-section of a portion of a TIR-based display comprising a partial wall.

FIG. 13 schematically illustrates electric field lines in a cross-section of a portion of a TIR-based display 1300 comprising a partial wall. Display 1300 embodiment comprises a transparent outward sheet 1302 with an inward array of convex protrusions 304. In some embodiments, sheet 1302 and protrusions 1304 may be a continuous sheet of the same material. In other embodiments, sheet 1302 and protrusions 1304 may be separate layers and comprise different materials. In an exemplary embodiment, sheet 1302 and protrusions 1304 may comprise different refractive indices. In an exemplary embodiment, sheet 1302 may comprise a flexible glass. In an exemplary embodiment, sheet 1302 may comprise glass of thickness in the range of about 20-250 μm. Sheet 1302 may comprise a flexible glass such as SCHOTT AF 32® eco or D 263® T eco ultra-thin glass. Sheet 1302 may comprise a polymer such as polycarbonate. In an exemplary embodiment, sheet 1302 may comprise a flexible polymer. In an exemplary embodiment, protrusions 1304 may comprise a high refractive index polymer. In some embodiments, convex protrusions 1304 may be in the shape of hemispheres or cones or a combination thereof. Protrusions 1304 may be of any shape or size or a mixture of shapes and sizes. Protrusions 1304 may be elongated hemispheres or hexagonally shaped or a combination thereof. In other embodiments the convex protrusions may be microbeads embedded in sheet 1302.

Protrusions 1304 may have a refractive index of about 1.5 or higher. In an exemplary embodiment, protrusions 1304 may have a refractive index of about 1.5-1.9. The protrusions may have a diameter of at least about 0.5 microns. The protrusions may have a diameter of at least about 2 microns. In some embodiments the protrusions may have a diameter in the range of about 0.5-5000 microns. In other embodiments the protrusions may have a diameter in the range of about 0.5-500 microns. In still other embodiments the protrusions may have a diameter in the range of about 0.5-100 microns. The protrusions may have a height of at least about 0.5 microns. In some embodiments the protrusions may have a height in the range of about 0.5-5000 microns. In other embodiments the protrusions may have a height in the range of about 0.5-500 microns. In still other embodiments the protrusions may have a height in the range of about 0.5-100 microns. In certain embodiments, the protrusions may include materials having a refractive index in the range of about 1.5 to 2.2. In certain other embodiments, the high refractive index protrusions may be a material having a refractive index of about 1.6 to about 1.9.

In some embodiments, sheet 1302 and protrusions 1304 may be a continuous sheet of substantially the same material. In other embodiments, sheet 1302 and protrusions 1304 may be formed of different materials having similar or different refractive indices. In some embodiments, sheet 1302 may comprise glass. Sheet 1302 may comprise a polymer such as polycarbonate. In an exemplary embodiment, protrusions 1304 may comprise a high refractive index polymer. Protrusions 1304 may be comprise a substantially rigid, high index material. High refractive index polymers that may be used may comprise high refractive index additives such as metal oxides. The metal oxides may comprise one or more of $SiO_2$, $ZrO_2$, $ZnO_2$, ZnO or $TiO_2$. In some embodiments, the convex protrusions may be randomly sized and shaped. In some embodiments the protrusions may be faceted at the base and morph into a smooth hemispherical or circular shape at the top. In other embodiments, protrusions 1304 may be hemispherical or circular in one plane and elongated in another plane. In some embodiments, sheet 1302 and layer of convex protrusions 1304 may be a continuous layer. In an exemplary embodiment, the convex protrusions 1304 may be manufactured by microreplication. In an exemplary embodiment, sheet 1302 may be a flexible, stretchable or impact resistant material while protrusions 1304 may comprise a rigid, high index material.

Display 1300 further comprises outward front surface 1306 facing a viewer 1308. Display 1300 may further comprise a transparent front electrode 1310 located on the inward surface of protrusions 1304. Front electrode layer 1310 may be flexible or conformable. Front electrode layer 1310 may comprise a transparent conductive material such as indium tin oxide (ITO), Baytron™, or conductive nanoparticles, silver wires, metal nanowires, graphene, nanotubes or other conductive carbon allotropes or a combination of these materials dispersed in a substantially transparent polymer. Front electrode layer 1310 may comprise a transparent conductive material further comprising silver nanowires manufactured by C3Nano (Hayward, Calif., USA). Front electrode layer 1310 may comprise C3Nano ActiveGrid™ conductive ink.

Display 1300 may further comprise a rear support 1312. Rear support 1312 may be one or more of a metal, polymer, wood or other material. Rear support 1312 may be one or more of glass, polycarbonate, polymethylmethacrylate (PMMA), polyurethane, acrylic, polyvinylchloride (PVC), polyimide or polyethylene terephthalate (PET).

Display 1300 may further comprise a rear electrode layer 1311. Rear electrode layer 1311 may comprise a plurality of pixels. For illustrative purposes, two pixels are shown in FIG. 13, first rear pixel electrode 1314 and second rear pixel electrode 1316. In some embodiments, there may also be a gap 1318 between first and second rear pixel electrodes 1314, 1316. A cavity 1320 may be formed by the outward sheet 1302 and rear support 1312. Rear electrode layer 1311 may be located on the inner surface of rear support layer 1312. Rear electrode layer 1311 may be flexible or conformable. Rear electrode layer 1311 may comprise transparent conductive material or non-transparent conductive material such as aluminum, gold or copper. Rear electrode layer 1311 may be vapor deposited or electroplated. Rear electrode layer 1311 may be continuous or patterned. Rear electrode layer 1311 may be integrated with rear support layer 1312. Alternatively, rear electrode layer 1311 may be positioned proximal to rear support 1312. In another embodiment, rear electrode layer 1311 may be laminated or attached to rear support 1312. Rear electrode layer 1311 may comprise a thin film transistor (TFT) array or a passive matrix array. Rear electrode layer 1311 may comprise a direct drive patterned array of electrodes or a segmented array of electrodes. Rear electrode layer 1311 may comprise an active matrix of organic field-effect transistors (FETs). The organic FETs may comprise an active semiconducting layer of a conjugated polymer or a small conjugated molecule. The organic FETs may comprise an organic dielectric layer in the form of either a solution processed dielectric or a chemical vapor deposited dielectric. Layer 1311 may comprise aluminum, ITO, copper, gold or other electrically conductive material. In one embodiment, layer 1311 may comprise organic TFTs. In other embodiments, layer 1311 may comprise indium gallium zinc oxide (IGZO) TFTs. Layer 1311 may comprise low temperature polysilicon, low temperature polysilicon manufactured by a polyimide "lift-off" process, amorphous silicon on a flexible substrate or TFTs on flexible substrates manufactured by FlexEnable (Cambridge, United Kingdom) or those manufactured by FlexEnable and Merck (Darmstadt, Germany). In an exemplary embodiment, each TFT of rear electrode layer 1311 may be substantially aligned or registered with at least one single color filter sub-pixel. In an exemplary embodiment, layer 1311 may comprise a planarization layer. A planarization layer may be used to smooth the surface of the backplane drive electronics. This may allow complete walls or partial walls to be placed or formed on top of the planarization layer. The planarization layer may comprise a polymer. The planarization layer may be deposited using a slot die coating process or flexo-print process. The planarization layer may comprise a photoresist. The planarization layer may comprise at least one dielectric. The planarization layer may comprise a polyimide.

Display 1300 further comprises a fluid or air medium 1322. Medium 1322 may be located in cavity 1320 between front electrode layer 1310 and rear electrode layer 1311. Medium 1322 may comprise a low refractive index. Medium 1322 may be an inert, low refractive index fluid medium. Medium 1322 may be a hydrocarbon or water. In other embodiments, the refractive index of medium 1322 may be about 1 to 1.5. In still other embodiments the refractive index of medium 1322 may be about 1.1 to 1.4. In an exemplary embodiment, medium 1322 may be a fluorinated hydrocarbon. In another exemplary embodiment, medium 1322 may be a perfluorinated hydrocarbon. In an exemplary embodiment, medium 1322 has a lower refractive index than the refractive index of convex protrusions 1304. In other embodiments, medium 1322 may be a mixture of a hydrocarbon and a fluorinated hydrocarbon. In an exemplary embodiment, medium 1322 may comprise one or more of Fluorinert™, Novec™ 7000, Novec™ 7100, Novec™ 7300, Novec™ 7500, Novec™ 7700, Novec™ 8200, Teflon™ AF, CYTOP™ or Fluoropel™.

In other embodiments, medium 1322 may also comprise an electrowetting fluid. In an exemplary embodiment, the electrowetting fluid may comprise a dye. The electrowetting fluid may move towards protrusions 1304 into the evanescent wave region to frustrate TIR. The electrowetting fluid may move away from protrusions 1304 and out of the evanescent wave region to allow for TIR. The electrowetting fluid may be a silicone oil that may be pumped via small channels into and out of the wells formed by the walls.

In an exemplary embodiment, display 1300 may further comprise an optional dielectric layer 1324 located on the surface of the transparent front electrode 1310. In some embodiments, display 1300 may further comprise an optional dielectric layer 1325 located on the surface of rear electrode layer 1311. The one or more optional dielectric layers may be used to protect one or both of the front electrode layer 1310 and/or rear electrode layer 1311. In some embodiments, the dielectric layer on the front electrode layer may comprise a different composition than the dielectric layer on the rear electrode layer.

The dielectric layers may be substantially uniform, continuous and substantially free of surface defects. The dielectric layer may be at least about 5 nm in thickness or more. In some embodiments, the dielectric layer thickness may be about 5 to 300 nm. In other embodiments, the dielectric layer thickness may be about 5 to 200 nm. In still other embodiments, the dielectric layer thickness may be about 5 to 100 nm. The dielectric layers may each have a thickness of at least about 30 nanometers. In an exemplary embodiment, the thickness may be about 30-200 nanometers.

In other embodiments, parylene may have a thickness of about 20 nanometers. The dielectric layers may comprise at least one pin hole. The dielectric layer may define a conformal coating and may be free of pin holes or may have minimal pin holes. The dielectric layer may also be a structured layer. The dielectric layer may also act as a barrier layer to prevent moisture or gas ingress. The dielectric layers may have a high or low dielectric constant. The dielectric layers may have a dielectric constant in the range of about 1-15. Dielectric compounds may be organic or inorganic in type. The most common inorganic dielectric material is $SiO_2$ commonly used in integrated chips. The dielectric layer may be one or more of SiN, SiNx or SiON. The dielectric layer may be $Al_2O_3$. The dielectric layer may be a ceramic. Organic dielectric materials are typically polymers such as polyimides, fluoropolymers, polynorbornenes and hydrocarbon-based polymers lacking polar groups. The dielectric layers may be a single polymer or a combination of polymers. The dielectric layers may comprise one or more of the following polyimide-based dielectrics Dalton DL-5260T, TC-139, DL-2193, Nissan SE-150, SE-410, SE-610, SE-3140N, SE-3310, SE-3510, SE-5661, SE-5811, SE-6414, SE-6514, SE-7492, SE-7992 or JSR AL-1054, AL-3046, AL22620, AL16301, AL60720. The dielectric layers may be combinations of polymers, metal oxides and ceramics. In an exemplary embodiment, the dielectric layers comprise parylene. In other embodiments the dielectric layers may comprise a halogenated parylene. The dielectric layers may comprise parylene C, parylene N, parylene HT or parylene HTX. Other inorganic or organic dielectric materials or combinations thereof may also be used for the dielectric layers. One or more of the dielectric layers may be CVD or sputter coated. One or more of the dielectric layers may be a solution coated polymer, flexo-printed polymer, vapor deposited dielectric or sputter deposited dielectric. Dielectric layer 1325 may be conformal to electrode structures or could be used to planarize the electrode structures.

Display 1300 in FIG. 13 may comprise a voltage bias source 1326. Voltage bias source 1326 may be used to create a bias within cavity 1320 between front electrode 1310 and rear electrode layer 1311. A bias may be applied to move electrophoretically mobile particles 1328 within cavity 1320. Bias source 326 may be coupled to one or more processor circuitry and memory circuitry configured to change or switch the applied bias in a predefined manner and/or for predetermined durations.

Suspended in medium 1322 are one or more pluralities of positively charged electrophoretically mobile particles. In other embodiments, particles 1328, 1330 may comprise a negative charge polarity. Particles are represented by shaded areas 1328, 1330 to denote where the particles would be attracted to and reside if attracted to a negative voltage bias (−V) at the front 1310 or rear pixel electrode 1316. Particles 1328, 1330 may be formed of an organic material or an inorganic material or a combination of an organic and inorganic material. The particles may have a polymer coating. Particles 1328, 1330 may comprise a coating of an organic material or an inorganic material or a combination of an organic and inorganic material. Particles 1328, 1330 may be a dye or a pigment or a combination thereof. Particles 1328, 1330 may be at least one of carbon black, a metal or metal oxide. Particles 1328, 1330 may comprise weakly charged or uncharged particles. Particles 1328, 1330 may be light absorbing or light reflecting or a combination thereof. Particles 1328, 1330 may also have any light absorption characteristics such that they may impart any color of the visible spectrum or a combination of colors to give a specific shade or hue.

Display 1300 may further comprise a plurality of light reflecting particles suspended in medium 1322. The light reflective particles may comprise a white reflective particle such as titanium dioxide ($TiO_2$). The light reflective particles may comprise a positive charge polarity, negative charge polarity or neutral charge polarity or a combination thereof. The light reflective particles may be around 200-300 nm. This is a typical size of $TiO_2$ particles used in the paint industry to maximize light reflectance properties. Particles of larger or smaller sizes may also be used. The light reflective particles may further comprise a coating (not shown). The coating on the light reflecting materials may comprise an organic material or an inorganic material such as a metal oxide. The coating may comprise of an effective refractive index that is substantially similar to the refractive index of medium 1322. In some embodiments, the difference between the refractive indices of the coating on the light reflecting particles and medium 1322 may be about 40% or less. In other embodiments, the difference between the refractive indices of the coating on the light reflecting particles and medium 1322 may be about 0.5-40%.

Transparent front electrode 1310 may be a conformal coating on the surface of the convex protrusions 1304. Electrode layer 1310 may not affect the total internal reflection of light rays at the surface of the convex protrusions 1304. In some embodiments electrode 1310 may be one or more of indium tin oxide (ITO), a conductive polymer such as BAYTRON™, conductive nanoparticles dispersed in a clear polymer or other transparent conductor.

In some embodiments, rear electrodes 1314, 1316 may be part of a passive matrix array of electrodes. In other embodiments, rear electrodes 1314, 1316 may be part of a patterned array of direct drive electrodes. In other embodiments, rear electrodes 1314, 1316 may be part of a thin film transistor (TFT) array of electrodes.

Figures 3A, 3B, 3C:
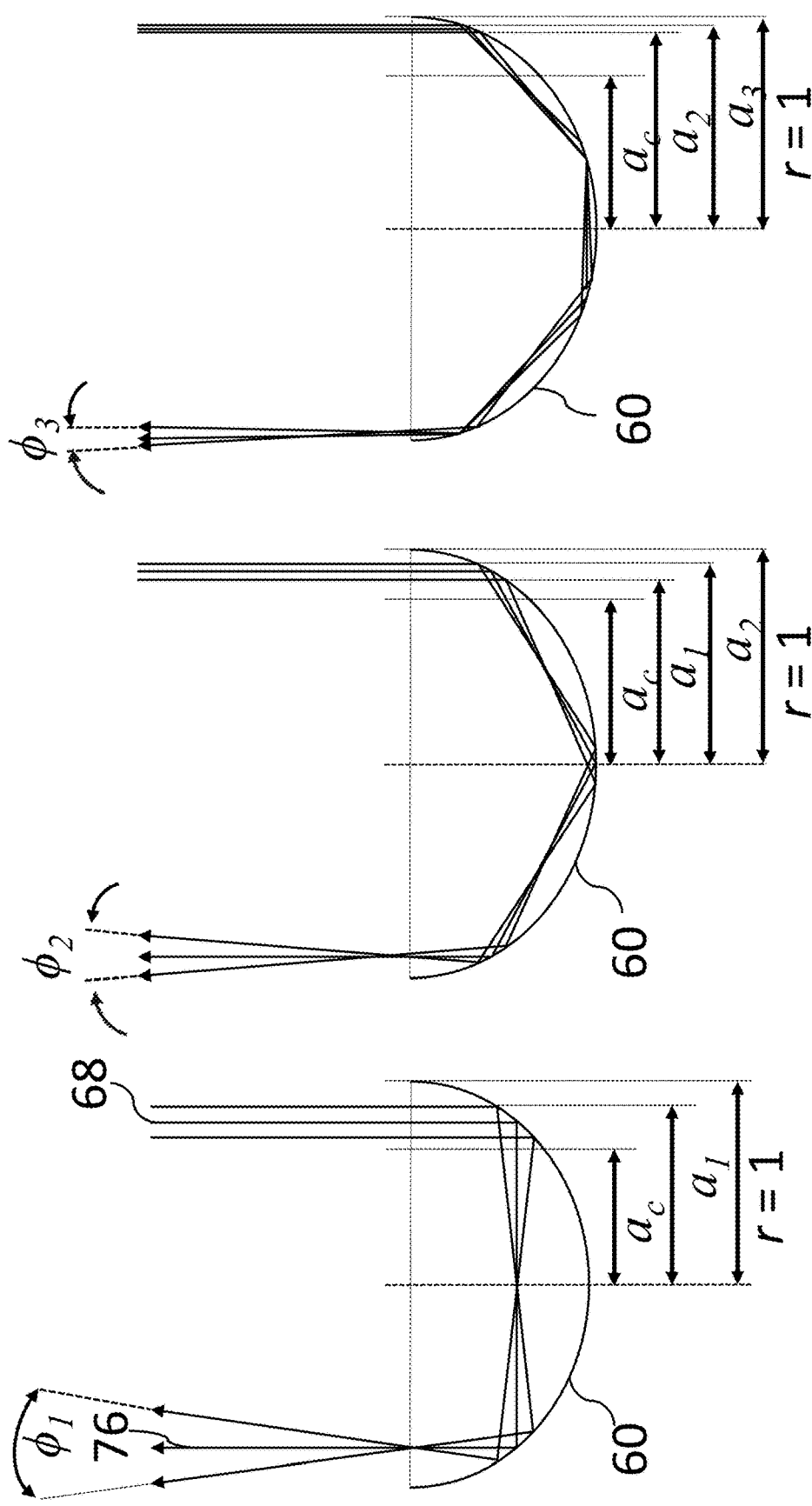
FIGS. 3A, 3B and 3C depict semi-retro-reflection of light rays perpendicularly incident on the FIG. 2 hemi-bead at increasing off-axis distances at which the incident rays undergo TIR two, three and four times respectively.

In order to mitigate, retard or diminish, lateral particle migration, walls 1332 (represented by cross hatched lines in FIG. 3) may be added. Walls may also be referred to as partition walls, sidewalls or cross walls. In this embodiment, partial walls may be added to the rear of the cell nearest the location between adjacent pixel electrodes 1314, 1316. In one embodiment, partial walls do not completely bridge rear sheet 1312 to front sheet 1302. As shown in FIG. 13, the partial wall 1332 may be located between adjacent pixels to limit, reduce and retard drift-induced lateral migration of the particles.

In an exemplary embodiment, the rear electrodes and rear support may be planarized with a planarization layer. A planarization layer may comprise a dielectric. The wall may be formed on top of the planarization layer. In an exemplary embodiment, the surface of partial walls may be coated with a dielectric layer 1333. The walls may be formed in a periodic or random array. The walls may comprise one or more of the following materials: AZ Electronic Materials (Charlotte, N.C., USA) AX series, DX series, EXP series, HiR 1075, MiR 701, MiR 703, MiR 900, N6000, nLOF 2000, nLOF 5000, 3300, 3300-F, 1500, N4000, P4000 series, 4500 series, 9200 series, 10XT, 50XT, PLP-30, PLP-40, 5XT series, 12XT series, 40XT series, 125nXT series, 5nXT/15nXT, TX 1311; DOW® (Midland, Mich., US) Laminar series, Eagle 2100 ED, Photoposit series, Epic 2135, UVN 2300, UV series, MCPR i7010N, Megaposit SPR 955-CM; DuPont® (Wilmington, Del., USA) Riston Etchmaster 213/830, Riston Goldmaster GM100, Riston MultiMaster MM100i/MM500, Riston PlateMaster PM200/PM300, Riston TentMaster TM200i, Riston Laser LDI 300/500/7000/7200/8000, Riston FX 250/500/900; Eternal Materials Co. (Kaohsiung City, Taiwan) Etertec Series, Laminar Series; Fujifilm (Tokyo, Japan) FEP-100, FEN-100, GAR series, GKR series, SC series, HNR series, HR series, IC series, HPR 500 series, OCG 825, HiPR 6500 series, OiR series, FHi series, GiR 1102, PMMA; Hitachi (Chiyoda, Tokyo, Japan) RD series, DL series, SL series, RY series, H series, HM series, FR series, FZ series; HTP HiTech Photopolymere AG (Basel, Switzerland) DiaEtch 101, DiaEtch 102, DiaEtch 120, DiaEtch 122, DiaPlate; JSR Micro (Sunnyvale, Calif., USA) ARX series, M series, V series, NDS series; KOLON Industries (Gyeonggi-do, South Korea) Trumask; MacDermid (Waterbury, Conn., USA) PMGI, LOR; MicroChem Corp. (Westborough, Mass., USA) SU-8 series, KMPR 1000, PMMA, PermiNex; Sumitomo Chemical (Tokyo, Japan) Sumiresist.

In display 1300 in FIG. 13, particle drift may occur in region 1334 denoted by a dotted line box. This is where the lateral component of the electric field may be the highest. Particles that lie close to top electrode 1310, near region 1336, may not see a very large lateral component to the electric field. Region 1336 is where diffusion may have a larger impact on particle migration than drift. Partial walls 1332, as illustrated in FIG. 13, form partial micro-segregated regions. They may not completely bridge the rear support 1312 to the front transparent sheet 1302.

Micro-segregation using partial walls plays different roles depending on whether they are near or away from the rear electrode(s). The partial walls may be particle diffusion blocking or drift blocking. In some embodiments, partial walls may be used on the front sheet only. In other embodiments partial walls may be on the rear sheet located at the rear TFT layer. In still some other embodiments, each of the front or the rear sheet may have partial walls. In an exemplary embodiment, there is a complete seal of the wall to the TFT near location 1334 that may comprise the highest lateral electric field.

The top of wall 1332 may not be completely sealed to the outward sheet 302 if the viscosity of medium 1322 is high enough to prevent diffusion of the electrophoretically mobile particles. In some embodiments, a viscosity enhancement material may prevent diffusion driven particle migration. In another embodiment, a viscosity enhancement material that undergoes shear thickening may prevent diffusion driven particle migration. In other embodiments, the tops of the walls may also contain gettering materials. Gettering materials may consume and trap the particles thus suppressing subsequent diffusion driven migration such as in region 1336 in FIG. 13.

Display embodiment 1300 may further comprise a color filter layer 1338. Color filter layer 1338 may further comprise sub-pixels wherein each sub-pixel may comprise a color. The color of each sub-pixel may be selected from at least one of red, green, blue, cyan, magenta, yellow, white, clear or black. In an exemplary embodiment, each color filter sub-pixel may be substantially aligned with a pixel electrode in rear electrode layer 1311. In an exemplary embodiment, color filter layer 1338 may be located between array of convex protrusions 1304 and front sheet 1302. In other embodiments, color filter layer 338 may be located on the outward side of sheet 1302 facing viewer 1308.

Figure 14:
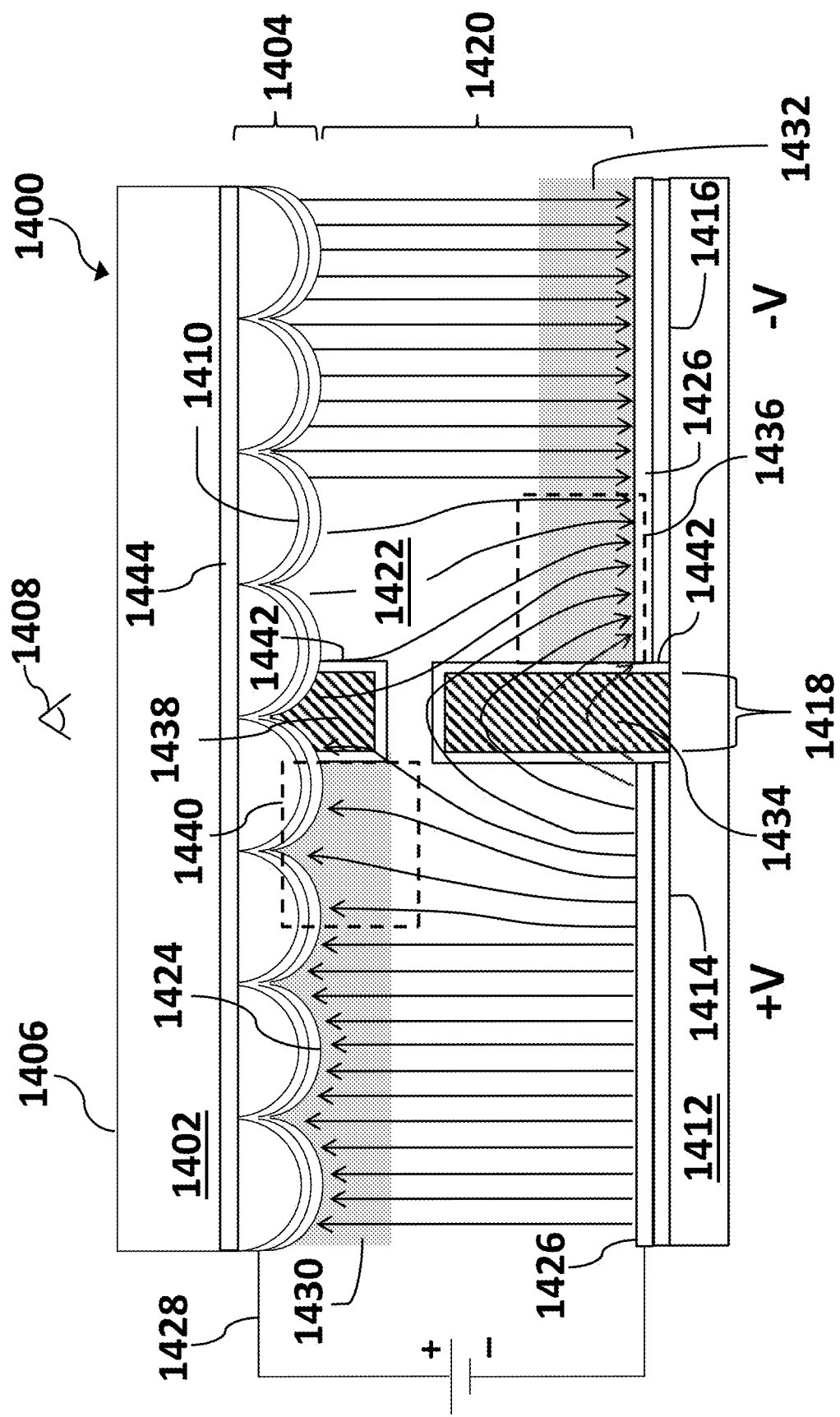
FIG. 14 schematically illustrates electric field lines in a cross-section of a portion of a TIR-based display comprising partial walls.

FIG. 14 schematically illustrates electric field lines in a cross-section of a portion of a TIR-based display 1400 comprising partial walls. Display 1400 comprises a transparent outward sheet 1402 with convex protrusions 1404, outward front surface 1406 facing viewer 1408, transparent front electrode 1410 located on the inward surface of protrusions 1404, rear support 1412, first rear pixel electrode 1414, second rear pixel electrode 1416, gap 1418 between said first and second rear pixel electrodes and cavity 1420 formed by the outward sheet 1402 and rear support 1412. Display 1400 further comprises a fluid or air medium 1422.

In an exemplary embodiment, at least one dielectric layer 1424 may be located on the surface of transparent front electrode 1410. In some embodiments, at least one dielectric layer 1426 may be located on the surface of rear electrodes 1414, 1416. Display embodiment 1400 may further comprise a voltage bias source 1428.

Suspended in medium 1422 may be pluralities of electrophoretically mobile particles (not shown) comprising a positive charge polarity. In some embodiments, the particles may instead comprise a negative charge polarity. In other embodiments, pluralities of particles of both positive and negative charge may be suspended in medium 1422. Particle aggregations are represented by shaded areas 1430, 1432 to denote where the particles may be attracted to and reside if attracted to a negative voltage bias (−V) at the front 1410 or rear pixel electrodes 1414, 1416.

In order to mitigate the lateral particle migration, multiple partial walls may be added. In this embodiment, partial walls may be added to the rear of the cell nearest the location between adjacent pixel electrodes. Additionally, partial walls may be added at the front of the cell and approximately across from the rear wall. As shown in FIG. 14, the rear partial walls 1434 may be located between adjacent pixels 1414, 1416 to limit drift-induced lateral migration of the particles. In an exemplary embodiment, the rear electrodes and rear support may be planarized with a planarization layer. A planarization layer may comprise a dielectric. The wall may be formed on top of the planarization layer. Particle drift may most likely occur in region 1436 (denoted by a dotted line box) where the lateral component of the electric field may be the highest.

The embodiment illustrated in display 1400 further comprises a second partial wall 1438 that extends from the front sheet 1402 towards the rear partial wall 1434. Wall 1438 may further limit particle diffusion in region 1440 for particles 1430 attracted to the front electrode 1410. In some embodiments, there may not be a perfect alignment between the top wall 1438 with and the rear wall 1434. In certain other embodiment, an alignment may be optionally provided. The rear partial wall 1434 may only need to extend out a small distance to disrupt particle diffusion. In one embodiment the gap between the rear and front walls may be small enough to prevent diffusion of particles to adjacent pixels. The combination of partial walls 1434, 1438 extending from the front and rear sheets, 1402, 1412, respectively, may decrease particle migration. This may prevent the need for walls that completely extend from the rear to the front sheet. This may also increase the manufacturability of the display and lower the manufacturing costs.

In other embodiments, at least one dielectric layer 1442 may be located on the surface of partial walls 1434, 1438. The dielectric layers formed on partial walls 1434, 1438 from top sheet 1402 and bottom sheet 1412 may be comprise substantially the same material or may be different materials.

Display embodiment 1400 may further comprise a color filter layer 1444. Color filter layer 1444 may further comprise sub-pixels wherein each sub-pixel may comprise a color. The color of each sub-pixel may be selected from at least one of red, green, blue, cyan, magenta, yellow, white, clear or black. In an exemplary embodiment, each color filter sub-pixel may be substantially aligned with pixel electrodes 1414, 1416. In an exemplary embodiment, color filter layer 1444 may be located between array of convex protrusions 1404 and front sheet 1402. In other embodiments, color filter layer 1444 may be located on the outward side of sheet 1402 facing viewer 1408.

Figure 15:
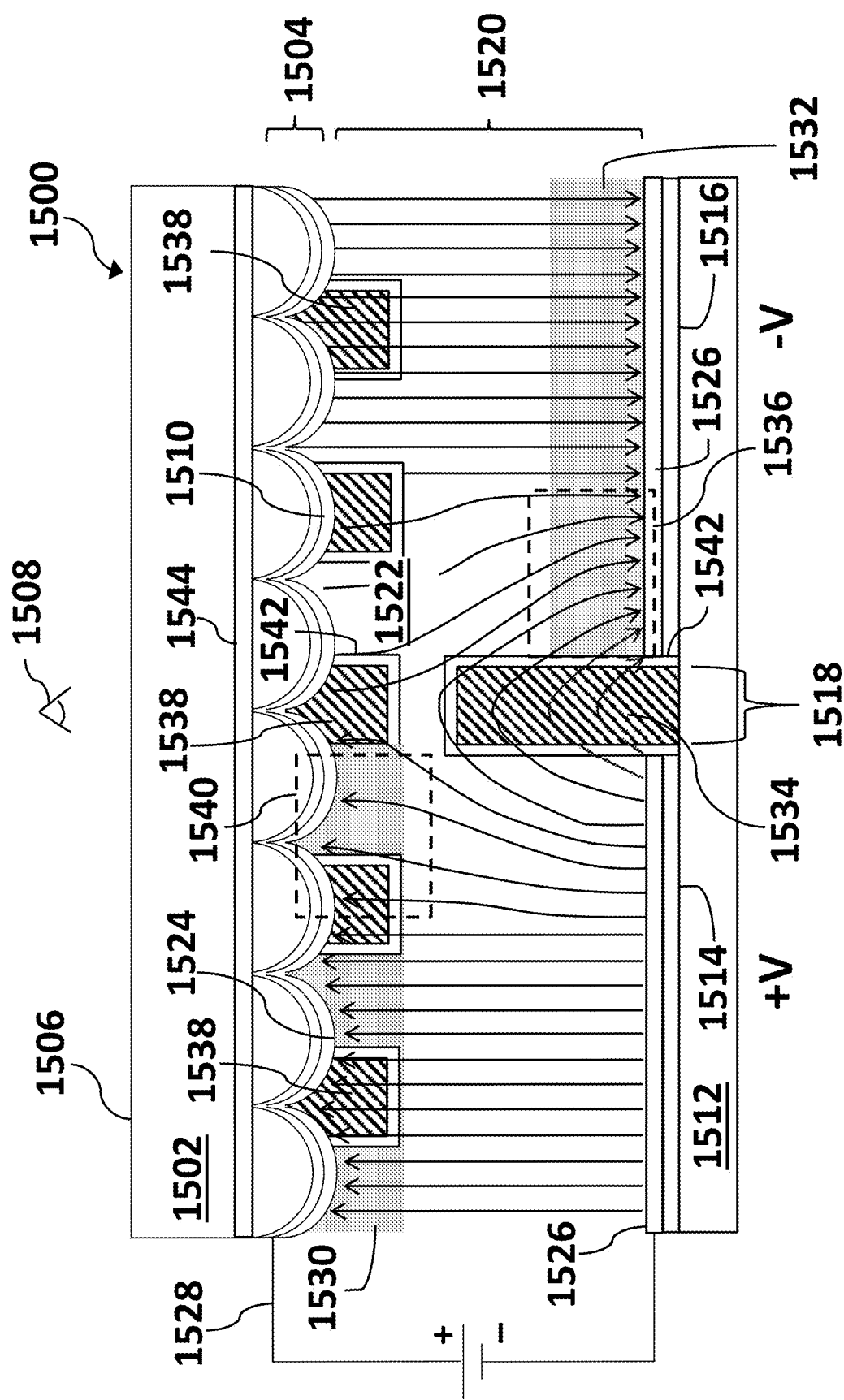
FIG. 15 schematically illustrates an embodiment of the disclosure having multiple partial walls.

FIG. 15 schematically illustrates an embodiment of the disclosure having multiple partial walls. Display 1500 comprises a transparent outward sheet 1502 with convex protrusions 1504, outward front surface 1506 facing viewer 1508, transparent front electrode 1510 located on the inward surface of protrusions 1504, rear support 1512, first rear pixel electrode 1514, second rear pixel electrode 1516, gap 1518 between said first and second rear pixel electrodes and cavity 1520 formed by the outward sheet 1502 and rear support 1512. Display 1500 further includes a fluid or air medium 1522. In an exemplary embodiment, at least one dielectric layer 1524 may be located on the surface of transparent front electrode 1510. In some embodiments, at least one dielectric layer 1526 may be located on the surface of rear electrodes 1514, 1516. Display embodiment 1500 may further comprise a voltage bias source 1528.

Suspended in medium 1522 may be pluralities of electrophoretically mobile particles comprising a positive charge polarity. In some embodiments, the particles may instead comprise a negative charge polarity. In other embodiments, pluralities of particles of both positive and negative charge may be suspended in medium 1522. An aggregation of particles is represented by shaded areas 1530, 1532 to denote where the particles may be attracted to and reside if attracted to a negative voltage bias (−V) at the front 1510 or rear pixel electrodes 1514, 1516.

In the embodiment of FIG. 15, partial walls are added to the rear of the cell closest to the location between adjacent pixel electrodes. As shown in FIG. 15, the rear partial walls 1534 is located between adjacent pixels 1514, 1516 to limit drift-induced lateral migration of the particles. In an exemplary embodiment, the rear electrodes and rear support may be planarized with a planarization layer. A planarization layer may comprise a dielectric. The wall may be formed on top of the planarization layer. Particle drift may most likely occur in region 1536 (denoted by a dotted line box) where the lateral component of the electric field may be the highest.

Display 1500 embodiment may further include a plurality of small walls, partitions or riffles 1538. Riffles 1538 extend inward into cavity 1520 from front sheet 1502 to limit particle diffusion in region 1540. In some embodiments, riffles 1538 may be in a regular array. In other embodiments, riffles 1538 may be in an irregular spaced array. In other embodiments, riffles 1538 may have varying widths. In other embodiments, riffles 1538 may have varying lengths. In some embodiments, riffles 1538 with a high spatial frequency may not be necessary to be aligned with rear walls 1534, rear TFT, rear passive matrix or other patterned electrode layers 1514, 1516. In some embodiments, the display may comprise a combination of riffles, partial walls and full walls.

In other embodiments, at least one dielectric layer 1542 may be located on the surface of partial walls 1534, 1538. The dielectric layers formed on partial walls 1534, 1538 from top sheet 1502 and bottom sheet 1512 may be comprise substantially the same material or may be different materials.

Display embodiment 1500 may further comprise a color filter layer 1544. Color filter layer 1544 may further comprise sub-pixels wherein each sub-pixel may comprise a color. The color of each sub-pixel may be selected from at least one of red, green, blue, cyan, magenta, yellow, white, clear or black. In an exemplary embodiment, each color filter sub-pixel may be substantially aligned with pixel electrodes 1514, 1516. In an exemplary embodiment, color filter layer 1544 may be located between array of convex protrusions 1504 and front sheet 1502. In other embodiments, color filter layer 1544 may be located on the outward side of sheet 1502 facing viewer 1508.

In the embodiments disclosed and illustrated herein, the walls have been depicted as rectangles. This is for illustrative purposes only. The walls may be of any size or shape. Walls that are in contact with the transparent front sheet may frustrate TIR and lower the reflectance of the display in the bright state. This may create locations on the front sheet where the optical activity is "dead" resulting in overall lower brightness of the display. Walls may be designed to mitigate lateral migration of the particles and limit the impact on the brightness. In some embodiments, at least one wall may only come in contact with one convex protrusion. In an exemplary embodiment, the walls come into contact with the fewest number of convex protrusions. In an exemplary embodiment, the refractive index of the walls is about the same as the refractive index of the convex protrusions. In certain exemplary embodiments, the walls may be located between adjacent protrusions.

Figure 16:
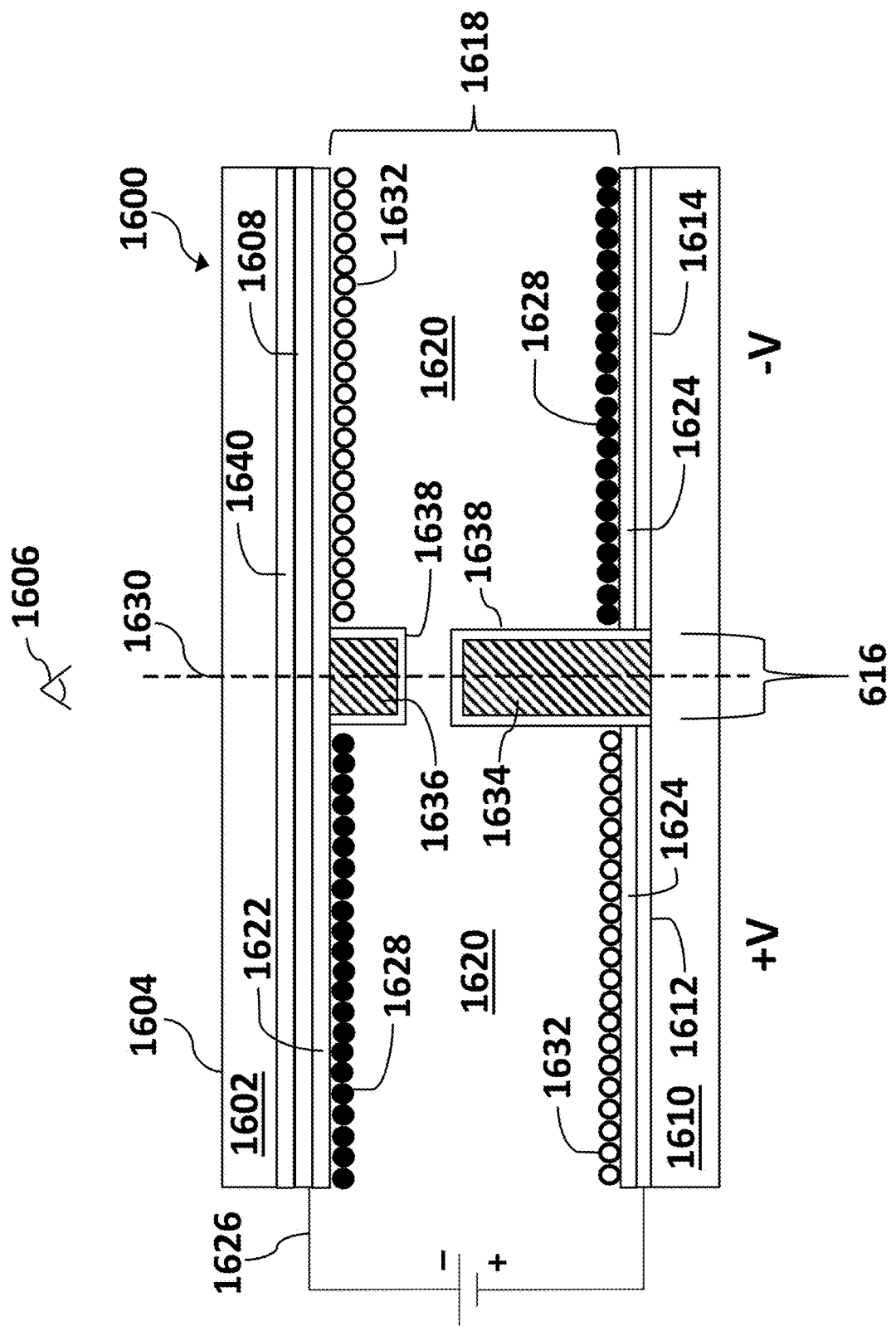
FIG. 16 schematically illustrates a cross-section of a portion of a reflective display 600 comprising partial walls.

FIG. 16 schematically illustrates a cross-section of a portion of a reflective display 1600 comprising partial partition walls. Display 1600 comprises a transparent outward sheet 1602 with outward front surface 1604 facing viewer 1606, transparent front electrode 1608 located on the inward surface of sheet 1604, rear support 1610, first rear pixel electrode 1612, second rear pixel electrode 1614, gap 1616 between the first 1612 and second 1614 rear pixel electrodes and cavity 1618 formed by the outward sheet 1602 and rear support 1610. Display 1600 further comprises a fluid or air medium 1620 residing in cavity 1618. Display 1600 may further comprise at least one dielectric layer 1622 located on the surface of front electrode layer 1608. Display 1600 may further comprise at least one dielectric layer 1624 located on the surface of rear electrode layers 1612, 1614. Display embodiment 1600 may further comprise a voltage bias source 1626.

Suspended in medium 1620 has a plurality of electrophoretically mobile particles 1628 of a positive charge polarity of one color and a plurality of electrophoretically mobile particles of a negative charge polarity 1632 and a second color. Particles 1628 may be attracted to a negative voltage bias (−V) at front electrode 1608 on the left side of dotted line 1630 or rear pixel electrode 1614 on right side of dotted line 1630 when the bias was reversed. This is represented by negatively charged particles 1628 located near rear pixel electrode 1614. The field lines may be different than what is illustrated in FIG. 16 due to the presence of the charge particles.

The reflective display embodiment 1600 in FIG. 16 may operate differently than the display embodiments in FIGS. 12-15. Display 1600 is not a TIR-based display. Instead, this display 1600 uses particles of different charge and color. By attracting a plurality of particles comprising a negative charge polarity to front electrode surface 1608, viewer 1606 may observe the color of the negatively charged particles 1632. By attracting a plurality of particles comprising a positive charge polarity to front electrode surface 1608, viewer 1606 may observe the color of the positively charged particles 1628. Two color images may be produced and observed by viewer 1606. By attracting different combinations of the particles with positive and negative charge polarity to the surface by the rear electrodes an image may be produced. Gray states may also be displayed and observed by viewer 1606. This may be done by driving a combination of positively charged particles 1628 and negatively charged particles 1632 to the front surface.

In order to mitigate lateral particle migration, multiple partial walls may be added. Partial walls 1634 may be added to the rear of the cell nearest the location between adjacent pixel electrodes 1612, 1614.

Additionally, partial walls may be added at the front of the display in cavity 1618. The embodiment illustrated in display 1600 further includes a second partial wall 1636 that extends inward from front sheet 1602 towards rear partial wall 1634. Wall 1636 may limit particle diffusion in regions near front electrode 1608. It may not be necessary that there is perfect alignment of the top wall 1636 with the rear wall 1634. Front partial walls 1636 may only need to extend out a small distance to disrupt particle diffusion. In one embodiment the gap between the rear and front walls may be small enough to prevent diffusion of particles to adjacent pixels. The combination of partial walls 1636, 1634 extending from the front and rear sheets, 1602, 1610, respectively, may decrease particle migration. One or more dielectric layers 1638 may be located on the surface of walls 1634, 1636.

Display embodiment 1600 may further comprise a color filter layer 1640. Color filter layer 1640 may further comprise sub-pixels wherein each sub-pixel may comprise a color. The color of each sub-pixel may be selected from at least one of red, green, blue, cyan, magenta, yellow, white, clear or black. In an exemplary embodiment, each color filter sub-pixel may be substantially aligned with pixel electrodes 1612, 1614. In an exemplary embodiment, color filter layer 1640 may be located between front electrode layer 1608 and front sheet 1602. In other embodiments, color filter layer 1640 may be located on the outward side of sheet 1602 facing viewer 1606.

Figure 17:
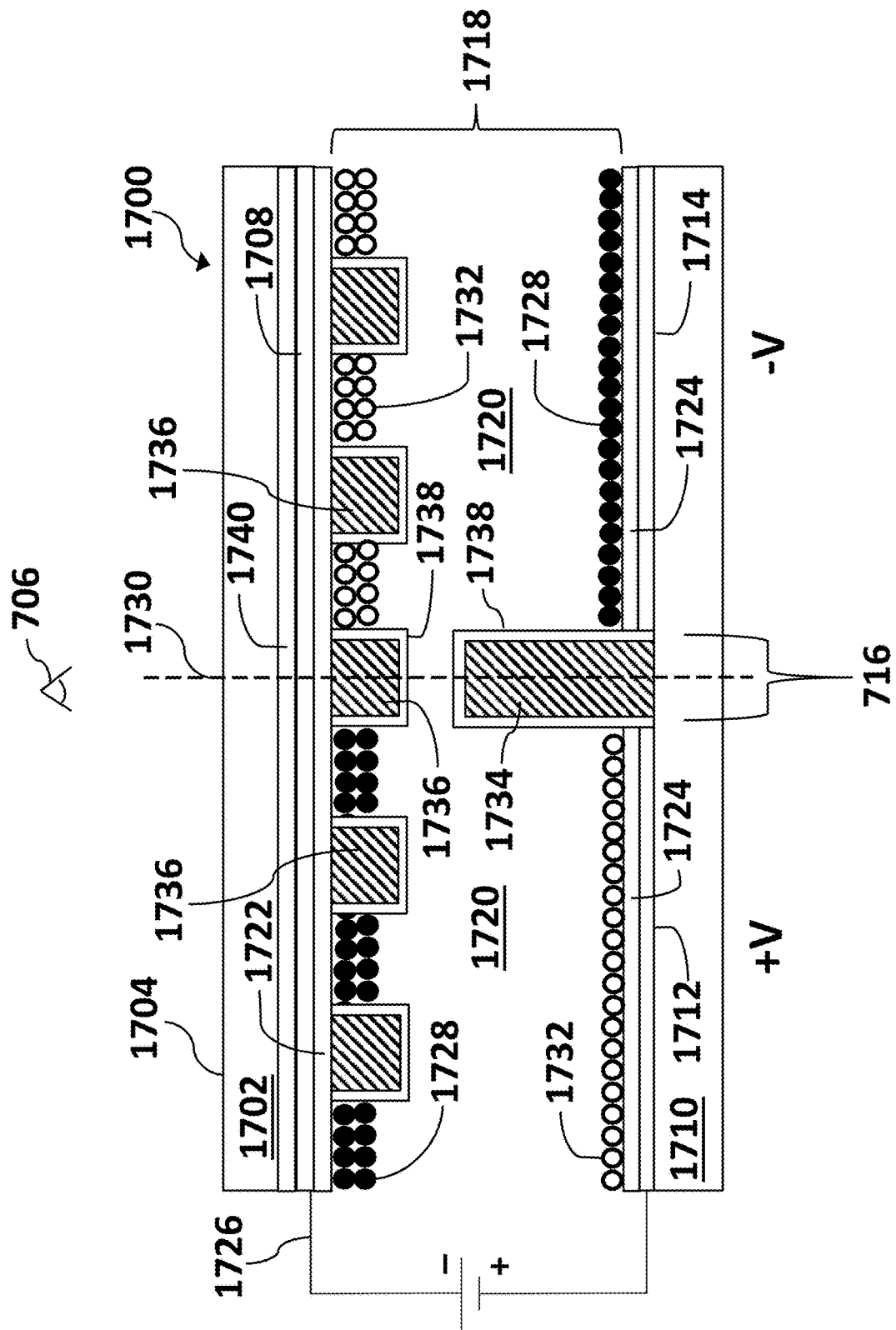
FIG. 17 schematically illustrates a cross-section of a portion of a reflective display 800 comprising partial walls.

FIG. 17 schematically illustrates a cross-section of a portion of a reflective display 1700 comprising partial partition walls according to one embodiment of the disclosure. Display 1700 comprises a transparent outward sheet 1702 with a front surface 1704 facing viewer 1706, transparent front electrode 1708 located on the inward surface of sheet 1702, rear support 1710, first rear pixel electrode 1712, second rear pixel electrode 1714, gap 1716 between first 1712 and second 1714 rear pixel electrodes and cavity 1718 formed by the outward sheet 1702 and rear support 1710. Display 1700 further contains a fluid or air medium 1720. One or more dielectric layers 1722 may be located on transparent front electrode 1708. One or more dielectric layers 1724 may be located on rear electrodes 1712, 1714. Display 1700 may further comprise a voltage bias source 1726.

Suspended in medium 1720 are pluralities of electrophoretically mobile particles comprising of a positive charge polarity of one color (e.g., dark particles) and electrophoretically mobile particles of a negative charge polarity of a second color (e.g., light particles). Positively charged particles 1728 of a first color are located near front electrode 1708 where a negative bias has been applied as shown to the left of dotted line 1730. On the right side of dotted line 1730 positively charged particles 1728 reside near rear pixel 1714 where a negative bias has been applied. Negatively charged particles 1732 of a second color are attracted to rear pixel electrode 1712 where a positive bias has been applied on left side of dotted line 1730. To the right of dotted line 1730, negatively charged particles 1732 are attracted to front electrode 1708 where a positive bias has been applied.

In order to mitigate lateral particle migration, multiple partial walls may be added in display embodiment 1700. In this embodiment, partial walls 1734 may be added to the rear of the display within cavity 1718 nearest the location between adjacent pixel electrodes 1712, 1714. Additionally, partial walls 1734 may be added at the front of the display approximately across from a rear wall. It is not necessary that the front and rear walls be perfectly aligned.

Display 1700 further includes a plurality of small walls or riffles 1736 that extend inward into cavity 1718 from front sheet 1702. These are to limit particle diffusion at regions near front sheet 1702. In some embodiments the riffles 1736 may be in a regular array. In other embodiments, riffles 1736 may be in an irregular spaced array. In some embodiments, riffles 1736 may have varying widths. In other embodiments, riffles 1736 may have varying lengths. In some embodiments, riffles 1736 may not be aligned with rear walls 1734, the rear TFT, passive matrix or other patterned electrode layers 1712, 1714. In some embodiments, one or more dielectric layers 1738 may be located on the surface of walls 1734, 1736.

Display 1700 may further comprise a color filter layer 1740. Color filter layer 1740 may further comprise sub-pixels wherein each sub-pixel may comprise a color. The color of each sub-pixel may be selected from at least one of red, green, blue, cyan, magenta, yellow, white, clear or black. In an exemplary embodiment, each color filter sub-pixel may be substantially aligned with pixel electrodes 1712, 1714. In an exemplary embodiment, color filter layer 1740 may be located between front electrode layer 1708 and front sheet 1702. In other embodiments, color filter layer 1740 may be located on the outward side of sheet 1702 facing viewer 1706.

In some embodiments, the front partial walls only need to extend out a small distance to disrupt particle diffusion. In some embodiments, the gap between the rear and front walls may be small enough to prevent diffusion of particles to adjacent pixels. The combination of partial walls extending from the front and rear sheets, 1702 and 1710, respectively, may decrease particle migration.

In another embodiment, dual particle displays 1600 and 1700 may optionally have walls located on the sheet comprising the pixelated electrodes. Thus, there may be no opposing walls.

In some TIR and dual particle-based display embodiments with both front and rear partial walls, the walls nearest adjacent pixelated electrodes may be longer in length than the opposing walls. In other embodiments, the front and rear walls may be approximately the same length. In other display embodiments with both front and rear walls, the walls nearest adjacent pixelated electrodes may be shorter in length than the opposing walls. In some embodiments, the partial walls may comprise a length in the range of about 1-40 µm. In other embodiments, the partial walls may comprise a length in the range of about 5-30 µm. In still other embodiments, the partial walls may comprise a length in the range of about 5-25 µm. In an exemplary embodiment, the partial walls may comprise a length in the range of about 10-25 µm.

In some TIR and dual particle-based display embodiments described herein the front and rear partial walls may be approximately the same width. In other embodiments, the rear walls may be narrower in width than the front walls. In other embodiments, the front walls may be narrower in width than the rear walls. In some embodiments, the partial walls may comprise a thickness in the range of about 0.1-30 µm. In other embodiments, the partial walls may comprise a thickness in the range of about 1-20 µm. In still other embodiments, the partial walls may comprise a thickness in the range of about 1-10 µm. In an exemplary embodiment, the partial walls may comprise a thickness in the range of about 3-10 µm.

In some TIR and dual particle-based display embodiments described herein the partial walls may be square in shape. In other embodiments, the partial walls may be rectangular in shape. In other embodiments, the partial walls may be trapezoidal in shape. In other embodiments, the partial walls may be triangular in shape. In other embodiments, the partial walls may be oval in shape. In other embodiments, the partial walls may be tapered or other rounded shape. In other embodiments, the partial walls may be prism shaped. It should be noted that while different sizes and shapes are presented herein, the disclosed principles are not exclusive to these exemplary embodiments and other shapes and sizes may be applied without departing from the disclosed principles.

In certain embodiments, full walls substantially bridge the rear support to the front sheet to form individual wells or cells such that there are no gaps within the walls between the wells. Each well may segregate one pixel. In certain embodiments, a pixel may comprise a plurality (e.g., three) of sub-pixels.

Figure 18:
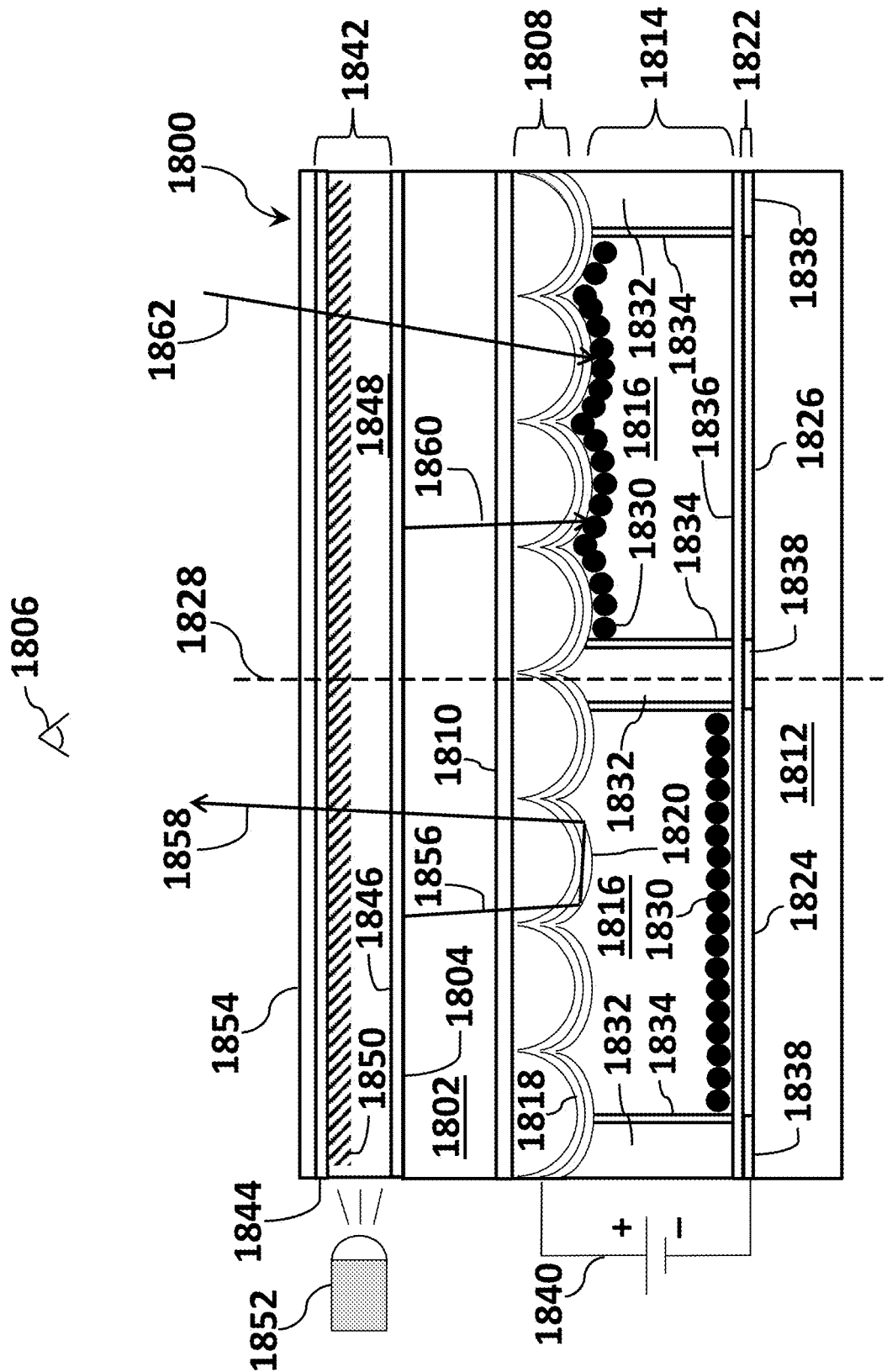
FIG. 18 schematically illustrates a cross-section of a portion of one embodiment of a reflective display comprising full walls.

FIG. 18 schematically illustrates a cross-section of a portion of one embodiment of a reflective display comprising full walls. Display embodiment 1800 in FIG. 18 comprises a transparent front sheet 1802 further comprising a front or outer surface 1804 facing viewer 1806. Display embodiment 1800 may further comprise an array of convex protrusions 1808 on the inward surface of sheet 1802. Protrusions 1808 may have a high refractive index. Protrusions 1808 may have a refractive index in the range of about 1.5-1.9. An optional color filter layer 1810 may be located between sheet 1802 and protrusions 1808. In other embodiments, color filter layer 1810 may be located on the outward surface of sheet 1802. In an exemplary embodiment, color filter layer 1810 may comprise one or more of a white, black, clear, red, green, blue, cyan, magenta or yellow sub-filters.

Display embodiment 1800 may further comprise a rear support sheet 1812 where front sheet 1802 and rear sheet form a cavity 1814. Within cavity 1814 may be air or other low refractive index medium 1816. In an exemplary embodiment, medium 1816 may have a refractive index in the range of about 1-1.5. On the surface of convex protrusions 1808 is transparent front electrode layer 1818 and optional front dielectric layer 1820 located on the surface of layer 1818. Display 1800 comprises a rear electrode layer 1822 on the inward side of rear sheet 1812. In an exemplary embodiment, rear electrode layer 1822 may comprise one or more pixel electrodes. Two pixel electrodes, 1824, 1826, are shown for illustrative purposes. Pixel electrode 1824 is located to the left of dotted line 1828 while a second pixel electrode 1826 is located to the right of dotted line 1828. Display 1800 in FIG. 18 may comprise a plurality of electrophoretically mobile particles 1830 suspended in medium 1816. Particles 1830 may comprise a positive or negative charge polarity. For illustrative purposes only, particles 1830 in FIG. 18 comprise a positive charge polarity.

Display 1800 may also comprise one or more full walls 1832 located in cavity 1814. Walls may completely bridge rear support 1812 to front sheet 1802. In some embodiments, full walls 1832 may be formed on top of the front transparent electrode layer 1818. In an exemplary embodiment, as illustrated in display embodiment 1800 in FIG. 18, full walls 1832 may be formed on top of front electrode layer 1818 and dielectric layer 1820. In some embodiments, full walls 1832 formed on top of front electrode layer 1818 may comprise one or more dielectric layers 1834. In some embodiments, walls 1832 may be coated with an electrode layer and one or more dielectric layers.

Display 1800 may comprise one or more dielectric layers 1836 on the surface of rear electrode layer 1822. One or more dielectric layers may located on individual pixel electrodes 1824, 1826. Rear electrode 1822 may comprise a planarization material 1838 to planarize and smooth rear electrode layer 1822. A smooth rear electrode layer 1822 may make it easier to completely form full walls 1832 and make it easier to manufacture the display.

Display 1800 may comprise a bias (e.g., voltage) source 1840. Voltage source 1840 may be used to create a bias between front electrode 1818 and rear electrode layer 1822. A bias may be applied to move electrophoretically mobile particles 1830 within cavity 1814.

Display 1800 may comprise an optional directional front light system 1842. Front light system 1842 may comprise multiple layers. Front light system 1842 may comprise a light guide wherein the light guide may comprise a first outer layer 1844, bottom layer 1846 and central core layer 1848. Layers 1844, 1846, 1848 may be adhered by one or more optically clear adhesives. Front light system 1842 may comprise one or more light extractor elements 1850 (denoted as cross hatched lines). Front light system 1842 may comprise a plurality of light extractor elements. Front light system 1842 may comprise a light source 1852. Light source 1852 may inject light into one or more of layers 1844, 1846, 1848. Light extractor elements 1850 may aid in re-directing light in a substantially perpendicular direction towards the front surface 1804 of transparent front sheet 1802. Front light source 1852 (or any other light source) may be positioned to illuminate an edge of light system 1842. For example, light rays may be transmitted to an edge of light system 1842.

Display 1800 may comprise a light diffuser layer 1854. In some embodiments, light diffuser layer 1854 may be located on the outer surface of directional front light system 1842 facing viewer 1806. In other embodiments, light diffuser layer may be located on the outer or inner surface of front sheet 1802.

In an exemplary mode, display 1800 may be operated in the following manner. Electrophoretically mobile particles 1830 may be moved away from surface of convex protrusions 1808 and out of the evanescent wave region by application of a bias of opposite charge as particles 1830 at rear electrode 1822. This is illustrated in FIG. 18 to the left of dotted line 1828. Particles have been moved toward rear pixel electrode 1824. Light may then be totally internally reflected at the interface of dielectric layer 1820 and low refractive index medium 1816. This is schematically represented by incident light ray 1856. Incident light ray may then be reflected and exit display 1800 towards viewer 1806. This is schematically represented by reflected light ray 1858. This creates a bright or light state of the display. A light or bright state of the display illustrated in FIG. 18 may also be formed from incident ambient light rays. For example, in some instances on bright sunny days or in a well-lit office, a light from a front light system may not be necessary. Ambient light may be sufficient to view the display. Display embodiment 1800 may further comprise an ambient light sensor (not shown).

A dark state of the display may be formed by moving electrophoretically mobile particles 1830 into the evanescent wave region near the surface of convex protrusions 1808. By application of a bias by voltage source 1840 of opposite charge as particles 1830, particles may be moved near protrusions 1808. The dark state is schematically illustrated to the right of dotted line 1828. Movement of particles 1830 into the evanescent wave region may absorb light rays and frustrate total internal reflection of light to create a dark state. This is represented by incident light rays 1860, 1862. Light ray 1860 illustrates emission by front light system 1842. Light ray 1862 illustrates incident ambient light.

Figure 19:
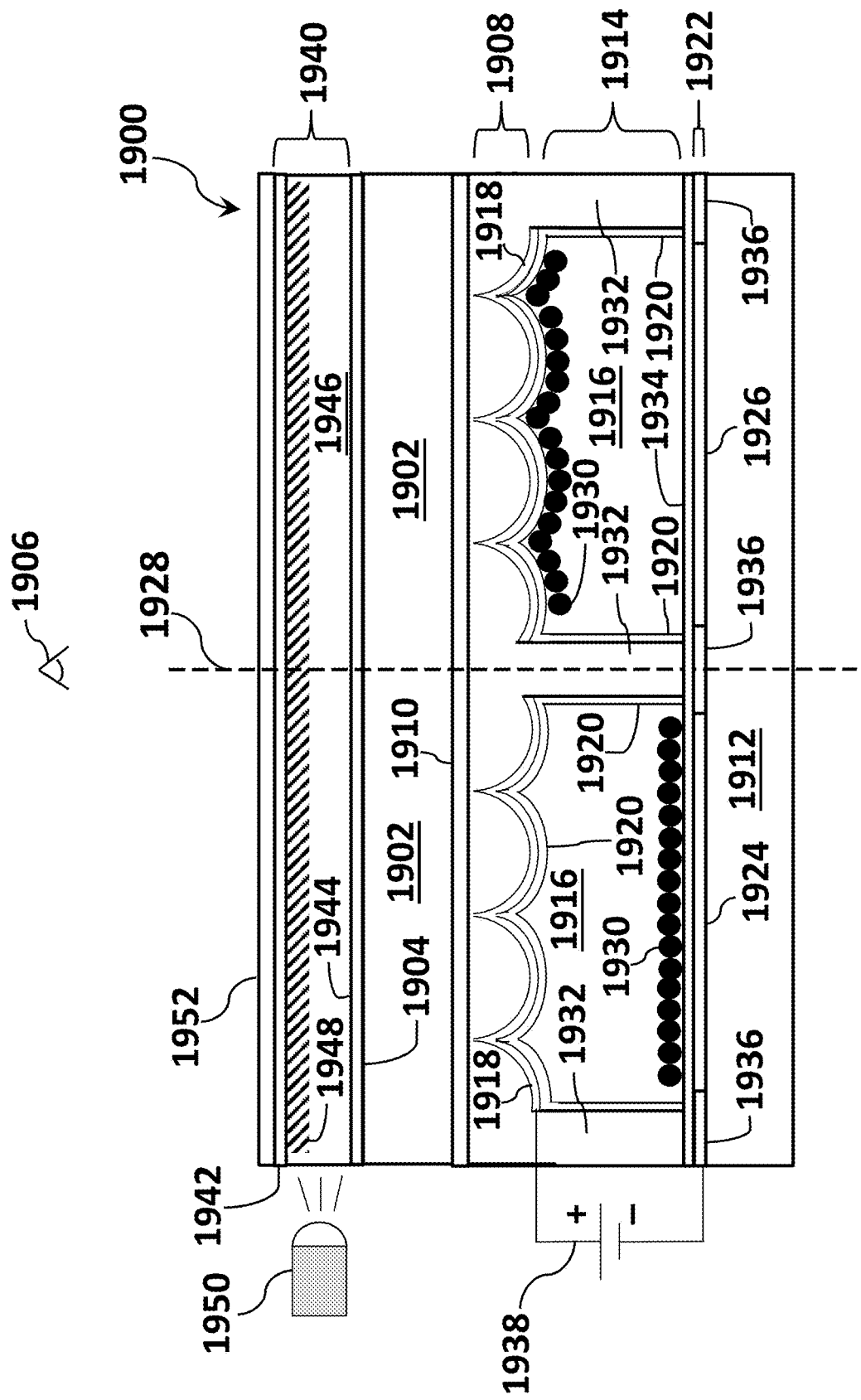
FIG. 19 schematically illustrates a cross-section of a portion of one embodiment of a reflective display comprising full walls.

FIG. 19 schematically illustrates a cross-section of a portion of one embodiment of a reflective display comprising full walls. Display embodiment 1900 in FIG. 19 comprises a transparent front sheet 1902 further comprising a front or outer surface 1904 facing viewer 1906. Display embodiment 1900 may include an array of convex protrusions 1908 on the inward surface of sheet 1902. Protrusions 1908 may have a high refractive index. Protrusions 1908 may have a refractive index in the range of about 1.5-1.9. An optional color filter layer 1910 may be located between sheet 1902 and protrusions 1908. In other embodiments, color filter layer 1910 may be located on the outward surface of sheet 1902. Color filter layer 1910 may comprise one or more of a white, black, clear, red, green, blue, cyan, magenta or yellow sub-filters.

Display embodiment 1900 may further comprise a rear support sheet 1912 where front sheet 1902 and rear sheet form a cavity 1914. Within cavity 1914 may be air or other low refractive index medium 1916. In an exemplary embodiment, medium 1916 may have a refractive index in the range of about 1-1.5. The surface of convex protrusions 1908 may include a transparent front electrode layer 1918. Display embodiment 1900 may comprise an optional front dielectric layer 1920 located on the surface of layer 1918. Display 1900 in FIG. 19 may comprise a rear electrode layer 1922 on the inward side of rear sheet 1912. In an exemplary embodiment, rear electrode layer 1922 may comprise one or more pixel electrodes. Two pixel electrodes, 1924, 1926, are shown for illustrative purposes. Pixel electrode 1924 is located to the left of dotted line 1928 while a second pixel electrode 1926 is located to the right of dotted line 1928. Display 1900 in FIG. 19 may comprise a plurality of electrophoretically mobile particles 1930 suspended in medium 1916. Particles 1930 may comprise a negative or positive charge polarity. For illustrative purposes only, particles 1930 in FIG. 19 comprise a positive charge polarity. Display embodiment 1900 may further comprise an ambient light sensor (not shown).

Displays 1800 (FIG. 18) and 1900 (FIG. 19) may comprise a plurality of light reflecting particles. The light reflective particles may comprise a white reflective particle such as titanium dioxide ($TiO_2$). The light reflective particles may be around 200-300 nm. This is a typical size of $TiO_2$ particles used in the paint industry to maximize light reflectance properties. Particles of larger or smaller sizes may also be used. The light reflective particles may further comprise a coating (not shown). The coating on the light reflecting materials may comprise an organic material or an inorganic material such as a metal oxide. The coating may comprise of an effective refractive index that is substantially similar to the refractive index of medium 1816, 1916. In some embodiments, the difference between the refractive indices of the coating on the light reflecting particles and medium 1816, 1916 may be about 40% or less. In other embodiments, the difference between the refractive indices of the coating on the light reflecting particles and medium 1816, 1916 may be about 0.5-40%.

Display 1900 of FIG. 19 may comprise one or more full walls 1932 located in cavity 1914. In this embodiment, walls may be formed as continuous part of the protrusions 1908. This is in contrast to display embodiment 1800 in FIG. 18 where walls 1832 and protrusions 1808 are discontinuous and are formed separately. In an exemplary embodiment, walls 1932 and protrusions 1908 may be a continuous sheet or material. In some embodiments, front sheet 1902, convex protrusions 1908 and walls 1932 may be a continuous sheet or material. The continuous sheet or material may comprise a polymer. Walls 1932 may completely bridge front sheet 1902 or protrusions 1908 to rear support sheet 1912. Continuous walls 1932 and protrusions 1908 may be formed together into a continuous structure using one or more methods of embossing, thermal embossing, injection molding, photolithography, micro-fabrication and micro-replication from a metal shim master. Walls 1932 may be included in a master with protrusions 1908 so they may be molded and replicated the same time.

In some embodiments, a transparent front electrode layer 1918 may be formed on both the surface of convex protrusions 1908 and walls 1932. In other embodiments, front electrode layer 1918 may only be deposited on protrusions 1908. In still other embodiments, at least one optional dielectric layer 1920 may be located on the surface of front electrode layer 1918 where front electrode 1918 is located on both the protrusions 1908 and walls 1932. In an exemplary embodiment, at least one optional dielectric layer 1920 may be located on the surface of walls 1932 and on the surface of front electrode layer 1918 wherein front electrode layer 1918 is located only the surface of the protrusions 1908.

Display 1900 may comprise one or more dielectric layers 1934 on the surface of rear electrode layer 1922. The one or more dielectric layers may be positioned on individual pixel electrodes 1924, 1926. Rear electrode 1922 may comprise a planarization material 1936 to planarize and smooth rear electrode layer 1922. Smooth rear electrode layer 1922 may make it easier for walls 1932 to completely bridge to rear layer 1912 and make it easier to manufacture the display.

Display 1900 may also comprise a voltage source 1938. Voltage source 1938 may be used to create a bias between front electrode 1918 and rear electrode layer 1922. A bias may be applied to move electrophoretically mobile particles 1930 within cavity 1914 into and out of the evanescent wave region.

In certain embodiments, display 1900 may comprise an optional directional front light system 1940. Front light system 1940 may comprise multiple layers. Front light system 1940 may comprise a light guide wherein the light guide may comprise a first outer layer 1942, bottom layer 1944 and central core layer 1946. Layers 1942, 1944, 1946 may be adhered together by one or more optically clear adhesives. Front light system 1940 may comprise one or more light extractor elements 1948 (denoted as cross hatched lines). Front light system 1940 may comprise a light source 1950. Light source 1950 may inject light into one or more of layers 1942, 1944, 1946. Light extractor elements 1948 may aid in re-directing light in a substantially perpendicular direction towards front surface 1904 of transparent front sheet 1902.

Display 1900 is shown with light diffuser layer 1952. In some embodiments, light diffuser layer 1952 may be located on the outer surface of directional front light system 1940 facing viewer 1906. In other embodiments, light diffuser layer 1952 may be located on the outer or inner surface of front sheet 1902.

Display embodiment 1900 includes continuous walls 1932 and protrusions 1908 which may be operated in a similar manner as previously described in relation to FIG. 18.

Figure 20A:
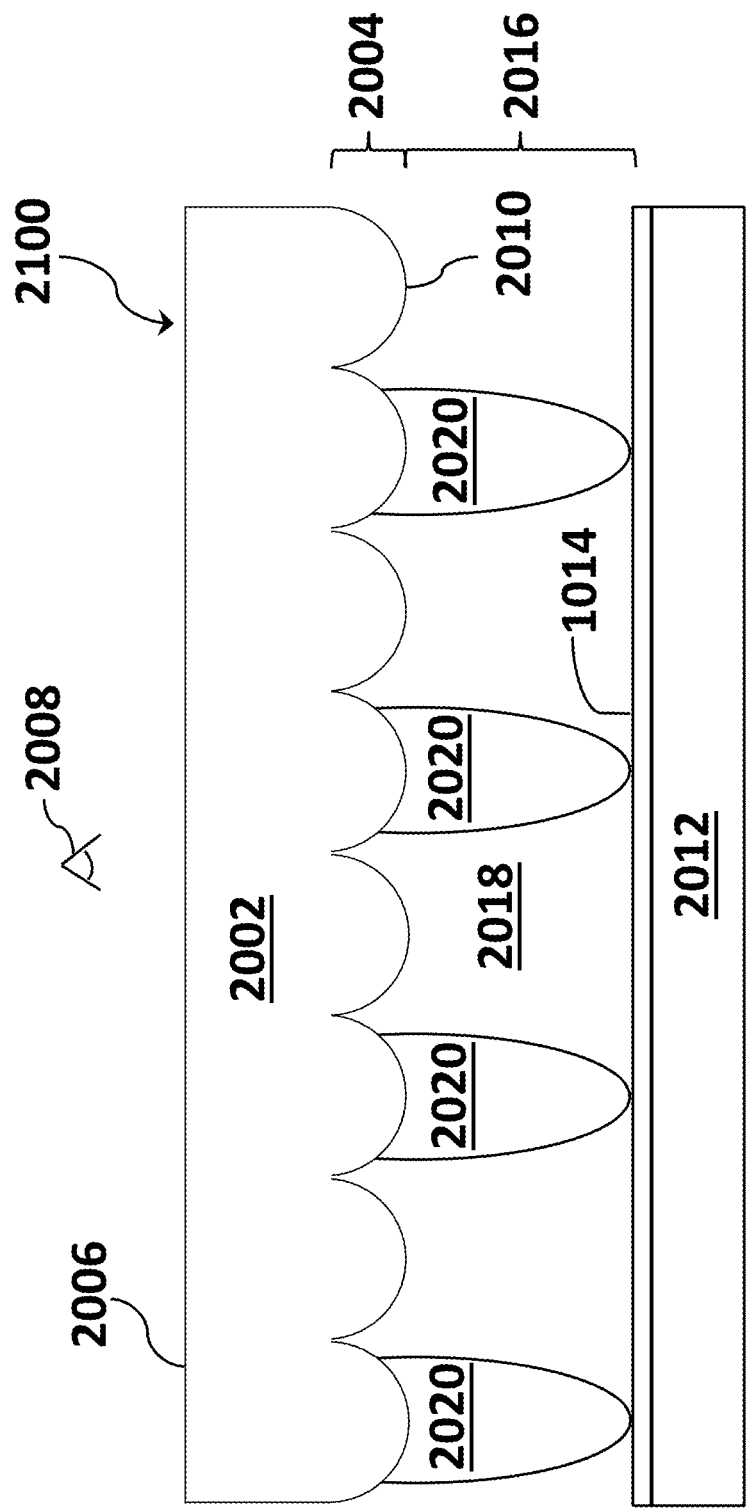
FIG. 20A schematically illustrates a cross-section of a portion of a TIR-based display with rounded walls.

FIG. 20A schematically illustrates a cross-section of a portion of a TIR-based display 2000 with rounded walls. Display 2000 comprises a transparent outward sheet 2002 with plurality of convex protrusions 2004, front surface 2006 facing viewer 2008, transparent front electrode 2010 located on the inward surface of protrusions 2004, rear support 2012, rear electrode 2014 and cavity 2016 formed by the outward sheet 2002 and rear support 2012. Display 2000 further includes a fluid or air medium 2018. Display 2000 may further comprise electrophoretically mobile particles suspended in medium 2018. A front light system, voltage bias source and one or more dielectric layers on front electrode 2010, rear electrode 2014 or walls 2020 and a voltage bias source have been omitted for simplicity. Display 2000 comprises walls 2020 with a rounded cross-section. In an exemplary embodiment, the rounded cross-section may be in the shape of a pendant drop. The rounded cross-section of the walls allows under certain lighting conditions for incident light to be totally internally reflected back towards viewer 2008. This may enhance the brightness of the display as opposed to using rectangular walls. To prevent shorting between the front 2010 and rear 2014 electrodes, a dielectric layer (not shown) may be added to the surface of rear electrode 2014.

FIG. 20B schematically illustrates a cross-section of a portion of a TIR-based display 2030 with rounded walls and base. Display embodiment 2030 in FIG. 20B is similar to display 2000 in FIG. 20A except that the display further comprises bases 2032 for walls 2020 with a rounded cross-section. In an exemplary embodiment, base 2032 has a refractive index substantially the same as the rounded walls 2020. To prevent shorting, display 2030 in FIG. 20B may further comprise a dielectric layer (not shown) located on the surface of one or more of the rear electrode layer 2014, walls 2020 and base 2032. The base may be located on top of the dielectric layer such that the dielectric layer may be interposed between the rear electrode 2014 and base 2032. In an exemplary embodiment, base material 2032 that is in contact with the wall 2020 has a lower refractive index than the rounded wall to limit frustration of TIR. Base material 2032 may have a refractive index that is about 0.2 or less than the refractive index of medium 2018.

FIG. 20C schematically illustrates a cross-section of a portion of a TIR-based display 2060 with rounded walls. Display 2060 in FIG. 20C is similar to display 2000 in FIG. 20A except that display 2060 further comprises inverted walls 2062 with a rounded cross-section. In certain embodiments, the top of inverted walls 2062 may contact hemispherical portions while in other embodiments they may not. Walls 2062 are upside down or inverted when compared to walls 2020 in FIG. 20A. The tip of wall 2062 may come in contact with the surface of the convex protrusions 2004. This may limit the amount of surface area that is in contact with the convex protrusions which further limits the amount of frustration of TIR leading to a brighter display. The embodiment in FIG. 20C may further include a dielectric layer (not shown) on the surface of walls 2062. The dielectric layer may prevent shorting of the display by walls 2062. Walls 2062 may be of other shapes such as prisms to limit the contact with the layer of protrusions 2004. Any of the walls illustrated in FIGS. 20A-C may be formed from materials previously listed herein.

In some embodiments, walls 2020, 2062 may have a refractive index similar to medium 2018 in the range of about 1-1.5. In other embodiments, walls 2020, 2062 may have a refractive index similar to front sheet 2002 and/or in the range of about 1.5-1.9.

Figure 21:
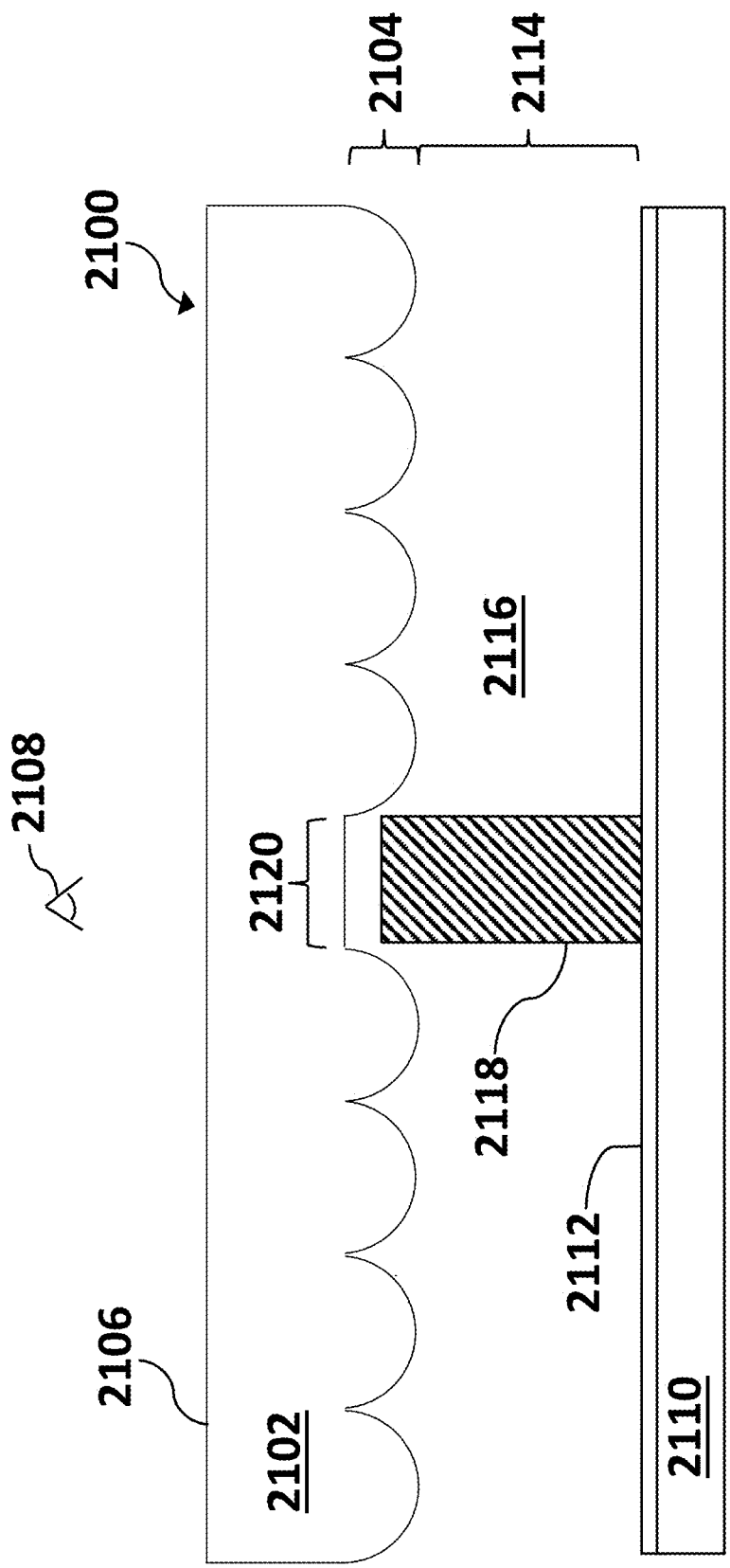
FIG. 21 schematically illustrates a cross-section of an embodiment to assemble a TIR-based display with a full wall.

FIG. 21 schematically illustrates a cross-section of an embodiment to assemble a TIR-based display with a full wall. In this embodiment of a method, display 2100 comprises of a front sheet 2102 that further comprises a layer of a plurality of convex protrusions 2104 and front surface 2106 facing viewer 2108. Display embodiment 2000 further comprises a rear sheet 2110 and rear electrode layer 2112. A gap 2114 may be formed between the front and rear sheets where a low refractive index medium 2116 may be located. A front electrode layer, voltage source, front light, electrophoretically mobile particles, dielectric layers and other components of the display are not shown for clarity of illustration. Within gap 2114 may be walls 2118. In an exemplary embodiment, front sheet 2102 may comprise a slit or trench 2120 where the top of wall 2118 may nestle or fit into to form a substantially sealed full wall. The full wall may completely bridge the rear sheet to the front sheet. The creation of an array of full walls in a reflective image display, such as a TIR-based display, may be formed this way. This may further aid in aligning front sheet 2102 to rear sheet 2110 where rear sheet may comprise an array of pixel electrodes. This may also further aid in aligning color filter sub-pixels on a front sheet to the pixel electrodes on a rear sheet. In other embodiments, walls 2118 may be formed with front sheet 2102 and may be continuous with front sheet 2102. A slit or trench may be formed at the rear of the display near rear electrode layer 2112 where walls may fit or nestle into.

In other embodiments, the front sheet may not comprise a layer of convex protrusions such as that found in display embodiments 1600, 1700 in FIGS. 16-17. Front sheets 1602 and 1702 may comprise a slit or trench such that walls may fit into to form a complete wall that bridges the rear sheet to the front sheet.

Figure 22A:
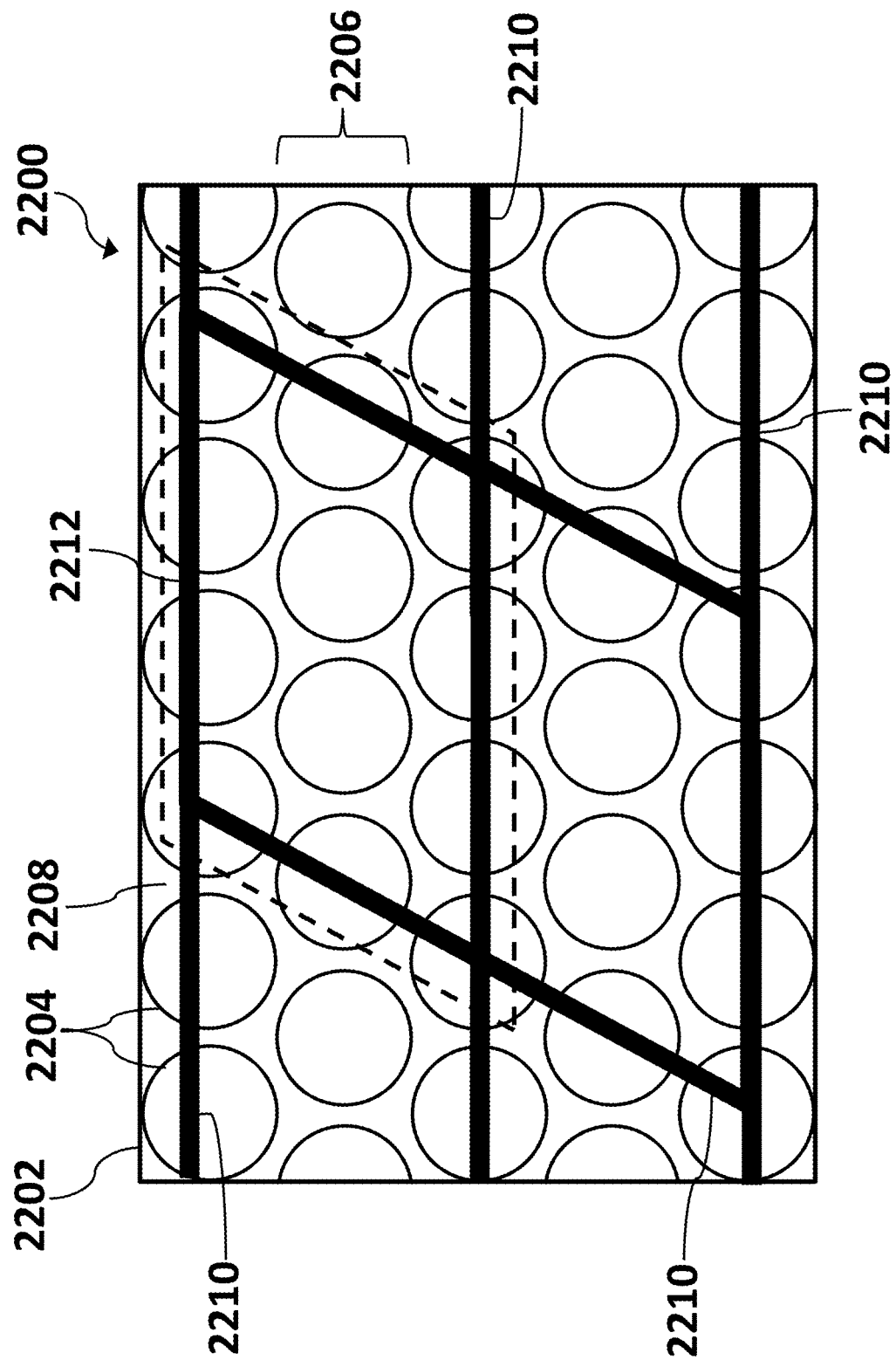
FIG. 22A schematically illustrates a portion of a front sheet comprising walls on the surface of convex protrusions.

In certain embodiments, the walls may be arranged with respect to the convex protrusions in multiple ways. FIG. 22A schematically illustrates a portion of a front sheet comprising walls on the surface of convex protrusions. Wall design embodiment 2200 in FIG. 22A is a portion of a front sheet 2202 comprising of an array of convex protrusions 2204. This view is a perpendicular view of a sheet 2202 of protrusions 2204. Previously described herein, such as in FIGS. 7-15, 18-21, the view was a cross section of a sheet of protrusions. Protrusions 2204 are hemispherically shaped for illustrative purposes, though they may be other shapes. Protrusions of other shapes and form may be contemplated without departing from the principles disclosed herein. Protrusions 2204 are arranged in rows 2206 and are in a close packed arrangement with space 2208 in between. Though other arrangements are possible, the close packed arrangement is preferred to maximize the density of protrusions on sheet 2202. Walls 2210 are denoted by thick black lines. In an exemplary embodiment, walls 2210 may be formed on rows of protrusions 2204 (as illustrated in FIG. 22A). Walls 2210 may be used to form compartments or wells to confine electrophoretically mobile particles (not shown for clarity).

An example of a compartment 2212 is highlighted by a dotted line. Compartment 2212 in FIG. 22A is in the shape of a parallelogram but may comprise other shapes. Compartments 2212 may include one or more convex protrusions. This is illustrated in FIG. 22A where compartment 2212 includes two central protrusions and ten partial protrusions 2204 over which wall 2210 is formed and surrounds. In some embodiments, walls 2210 that are formed on protrusions 2204 may be partial walls. In an exemplary embodiment, walls 2210 that are formed on protrusions 2204 may be full walls. In some embodiments, walls 2210 that are formed on protrusions 2204 may comprise a combination of both partial and full walls.

Figure 22B:
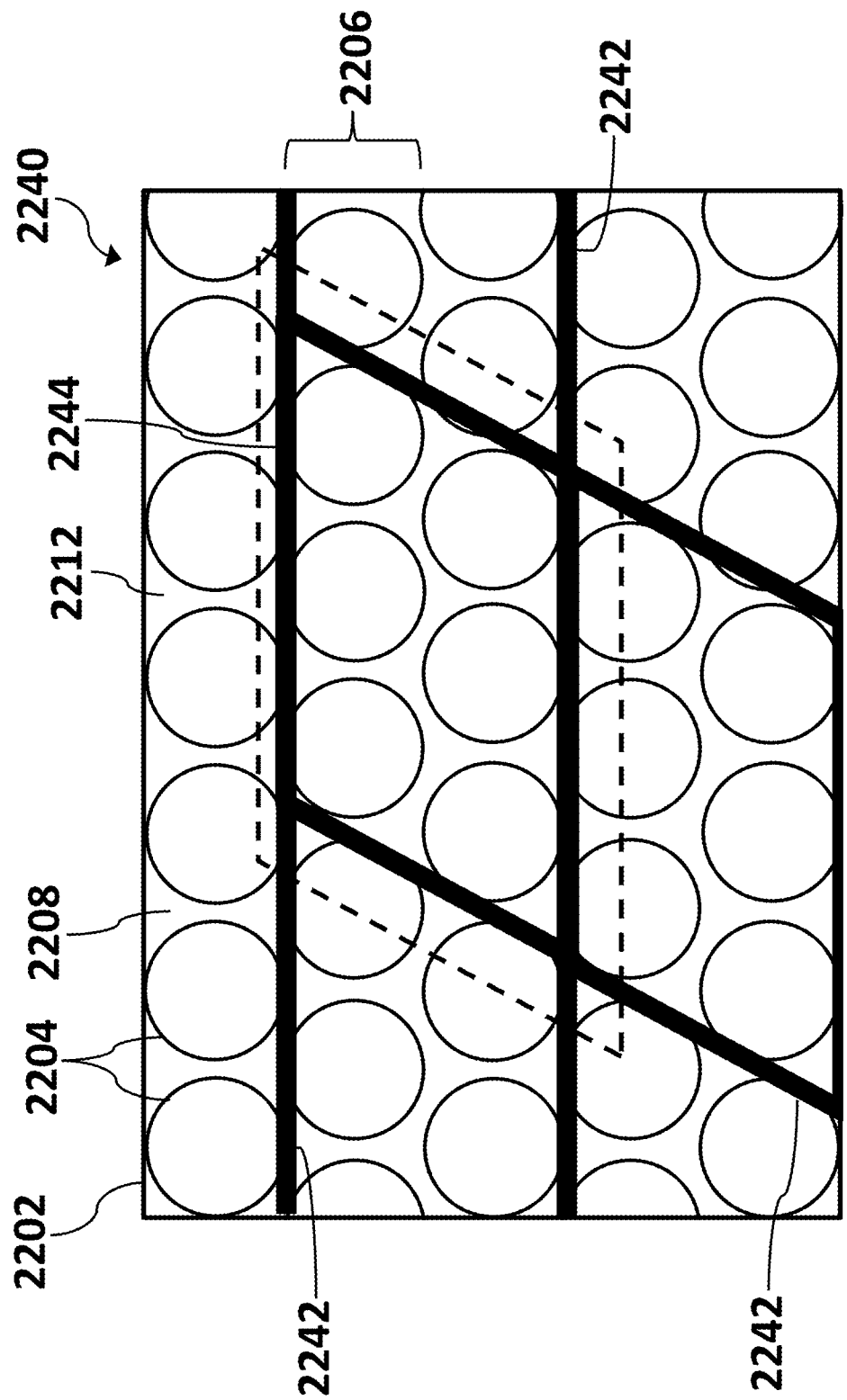
FIG. 22B schematically illustrates a portion of a front sheet comprising walls between rows of convex protrusions.

FIG. 22B schematically illustrates a portion of a front sheet comprising walls between rows of convex protrusions. Wall design embodiment 2240 in FIG. 22B comprises walls 2242 that lie between rows of protrusions 2206. In this embodiment, the walls are substantially located in the space between protrusions 2204. Walls 2242 may be formed on the edges of protrusions 2242 in the space between rows 2206. Depending on the distance between the protrusions, walls 2242 may touch or may not touch adjacent protrusions 2204. Walls 2242 located between rows may form compartments 2244 (denoted by dotted line box). Compartments 2244 comprising walls between rows of protrusions 2206 may enclose one or more protrusions 2204. Walls 2242 located between rows 2206 of protrusions may be partial walls, full walls or a combination of full and partial walls.

Figure 22C:
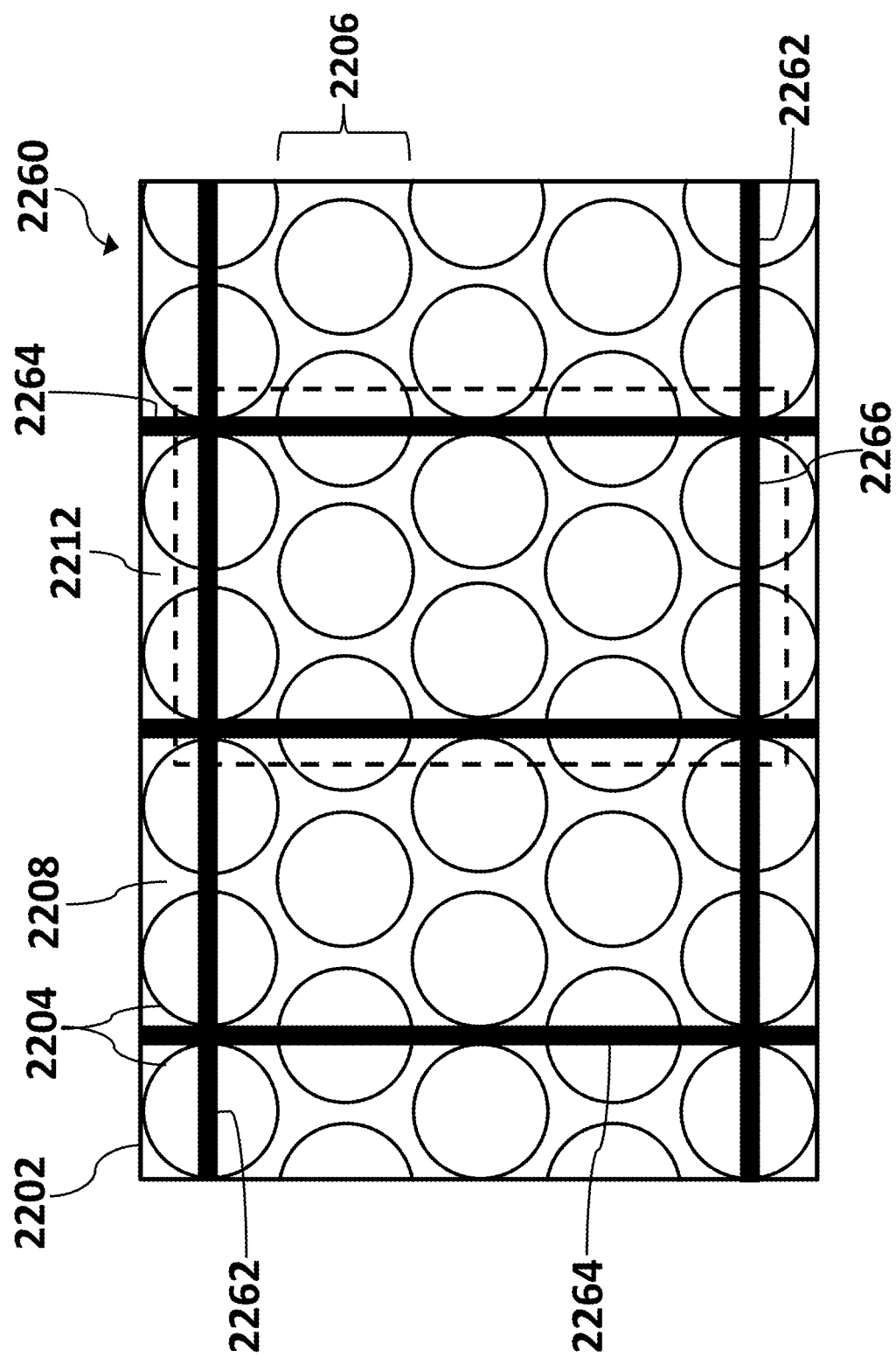
FIG. 22C schematically illustrates a portion of a front sheet comprising walls on the surface of the convex protrusions and between rows of convex protrusions.

FIG. 22C schematically illustrates a portion of a front sheet comprising walls on the surface of the convex protrusions and between rows of convex protrusions. Wall design embodiment 2260 in FIG. 22C comprises walls 2262 that lie on protrusions 2204 and walls 2264 that lie between rows of protrusions 2206. Walls 2264 that lie between rows 2206 may also touch protrusions 2204 on both sides of the wall. Walls 2264 located between rows may form compartments 2266 (denoted by dotted line box). Compartments 2266 comprising walls between rows of protrusions 2206 may enclose one or more protrusions 2204. In the example in FIG. 22C, the compartment is rectangular shaped. Walls 2262 formed on protrusions 2204 and walls 2264 located between rows 2206 of protrusions may be partial walls, full walls or a combination of full and partial walls. Compartments 2266 formed by walls 2262, 2264 may form one or more of square shaped compartments (as illustrated in FIG. 22C), rectangular shaped compartments, hexagonal shaped compartments, rhombus shaped compartments, parallelogram shaped compartments or any other shape of compartment 2266. It should be noted that the shape and/or form of the compartments are provided for illustration purposes and are not limiting the disclosure. Other shapes and forms may be used without departing from the disclosed principles.

Any of the wall design embodiments illustrated in FIGS. 22A-C may be formed from materials previously listed herein. Any of the wall design embodiments illustrated in FIGS. 22A-C may be formed by processes previously listed herein, such as embossing or micro-replication.

Figure 23A:
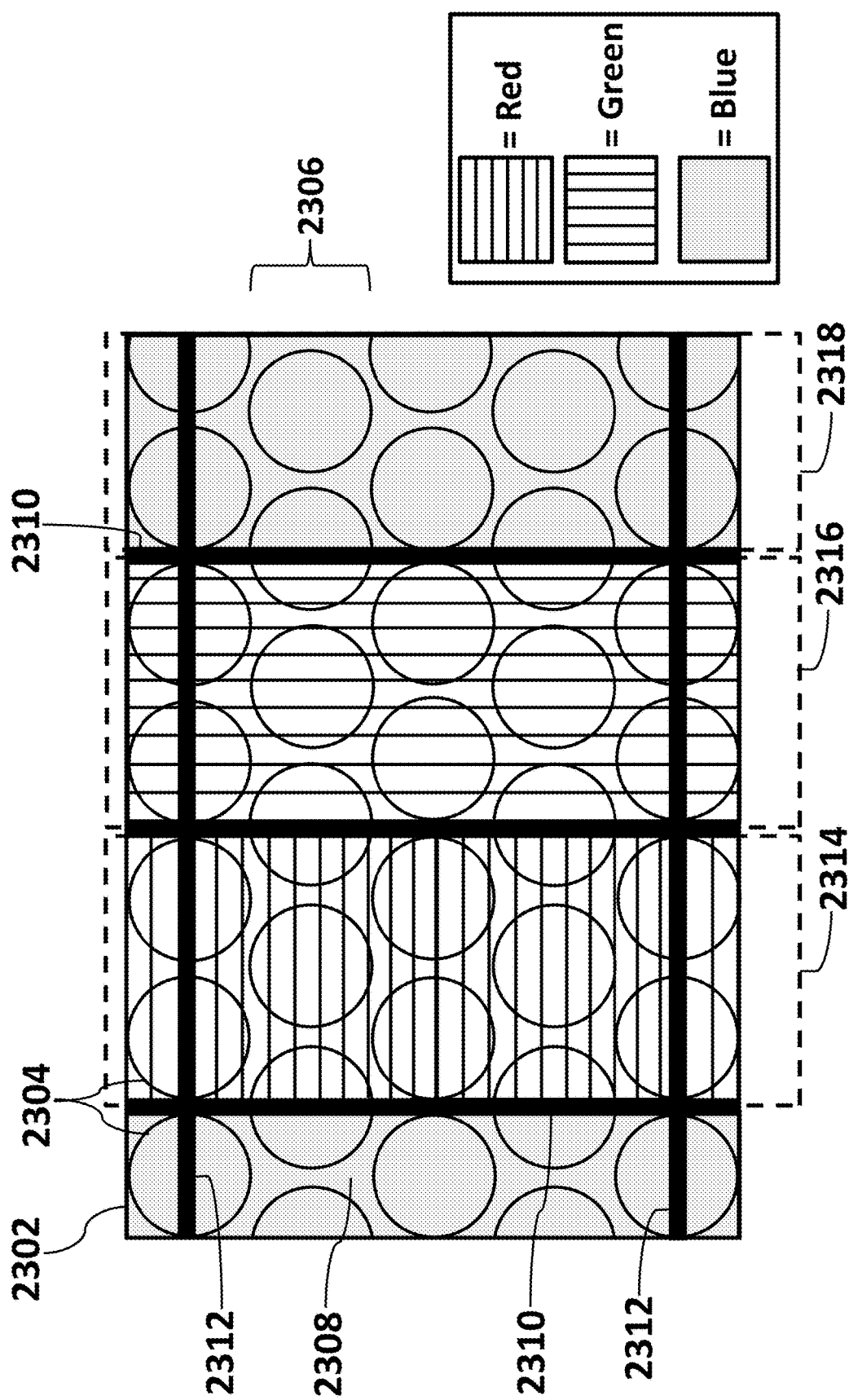
FIG. 23A schematically illustrates a portion of a front sheet comprising walls and color filter sub-pixels on the surface of convex protrusions that may be integrated into a reflective image display.

FIG. 23A schematically illustrates a portion of a front sheet comprising walls and color filter sub-pixels on the surface of convex protrusions that may be integrated into a reflective image display. Design embodiment 2300 in FIG. 23A illustrates how walls may be aligned with respect to one or more of the convex protrusions on the inward surface of sheet 2302, color filter sub-pixels and rear thin film transistor array in a TIR-based image display. This view is a perpendicular view of a sheet 2302 of protrusions 2304 as similarly illustrated in FIGS. 22A-C. Embodiment 2300 comprises a transparent sheet 2302 which further includes an array of convex protrusions 2304. Protrusions 2304 are arranged in rows 2306 in a close packed arrangement. There is space 2308 between protrusions 2304. In other embodiments, protrusions 2304 may touch. Embodiment 2300 further comprises walls 2310, 2312. Walls 2310 are aligned in vertical direction while walls 2312 are arranged in a horizontal direction. In this embodiment, walls are arranged in rectangular shaped compartments. In an exemplary embodiment, the compartments further comprise a substantially aligned color filter sub-pixel. In some embodiments, a color filter sub-pixel layer may be formed on the outward side of sheet 2302 or opposite side of sheet 2302 from where the rows of convex protrusions 2306 are formed. In an exemplary embodiment, a color filter sub-pixel layer may be located between sheet 2302 and rows of convex protrusions 2306 as illustrated in FIGS. 18-19.

The compartments with color filter sub-pixels are denoted by dotted line boxes 2314, 2316, 2318. Dotted line box 2314 denoting a compartment comprises horizontal lines. This represents a single red color filter sub-pixel. Dotted line box 2316 with vertical lines represents a single green color filter sub-pixel. Dotted line box 2318 denoting a shaded region represents a single blue color filter sub-pixel. In other embodiments, walls may form compartments each substantially aligned with a single color filter sub-pixel comprising one of colors red, green, blue, cyan, magenta, yellow, white, clear or black. In an exemplary embodiment, a single rear thin film transistor may be substantially aligned with a single color filter sub-pixel that may further be aligned with a single compartment formed by walls.

Figure 23B:
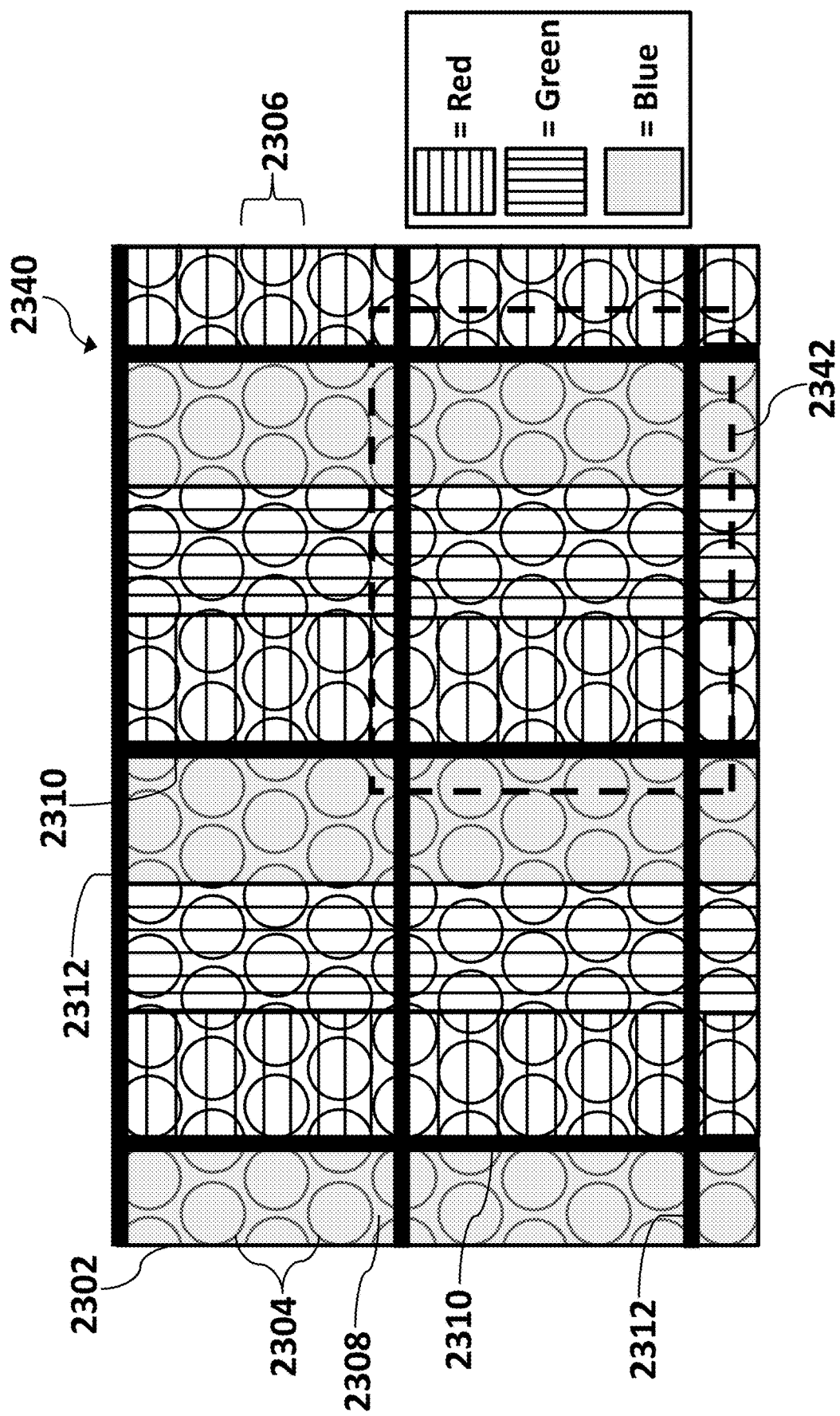
FIG. 23B schematically illustrates a portion of a front sheet comprising walls and color filter sub-pixels on the surface of convex protrusions that may be integrated into a reflective image display.

FIG. 23B schematically illustrates a portion of a front sheet comprising walls and color filter sub-pixels on the surface of convex protrusions that may be integrated into a reflective image display. Design embodiment 2340 in FIG. 23B illustrates how walls may aligned with respect to one or more of the convex protrusions on inward surface of sheet 2302, more than one color filter sub-pixels and rear thin film transistors. This view is a perpendicular view of a sheet 2302 comprising protrusions 2304 as similarly illustrated in FIG. 23B. Protrusions 2304 are arranged in rows 2306 in a close packed arrangement. There may be space 2308 between protrusions 2304. In other embodiments, protrusions 2304 may touch. Embodiment 2340 further comprises walls 2310 are aligned in vertical direction while walls 2312 are arranged in a horizontal direction. In this embodiment, walls are arranged in rectangular shaped compartments. Compartment 2342 (denoted by a dotted line) highlights a compartment. In an exemplary embodiment, the compartments formed by walls further comprise more than one substantially aligned color filter sub-pixel. In some embodiments, a color filter sub-pixel layer may be formed on the outward side of sheet 2302 or opposite side of sheet 2302 from where the rows of convex protrusions 2306 are formed. In an exemplary embodiment, a color filter sub-pixel layer may be located between sheet 2302 and rows of convex protrusions 2306 as illustrated in FIGS. 18-19.

In the exemplary embodiment of FIG. 23B, compartment 2342 comprises three color filter sub-pixels. Each sub-pixel is hatched differently for illustrative purposes. A first color filter sub-pixel within compartment 2342 is represented by horizontal lines (represents a red color filter sub-pixel), a second color filter sub-pixel represented by vertical lines (represents a green color filter sub-pixel) and a third color filter sub-pixel is represented by a shaded region (represents a blue color filter sub-pixel) as described in FIG. 23A. Here, three color filter sub-pixels are aligned with a compartment. In exemplary embodiments, single compartment formed by walls may be substantially aligned with two or more color filter sub-pixels. The two or more color filter sub-pixels may include one of colors red, green, blue, cyan, magenta, yellow, white, clear or black. A single rear thin film transistor may be substantially aligned with a single color filter sub-pixel that may further be aligned with one or more color filter sub-pixels and further aligned with a single compartment formed by walls. In another embodiment, a single compartment formed by walls may be substantially aligned with a group of color filter sub-pixels wherein two or more of the color filter sub-pixels may be of the same color in a reflective image display. For example, a single compartment formed by walls may be substantially aligned with a group of four sub-pixels comprising one red, two green and one blue color filter sub-pixels. Each color filter sub-pixel may be substantially aligned with a single thin film transistor.

Figure 23C:
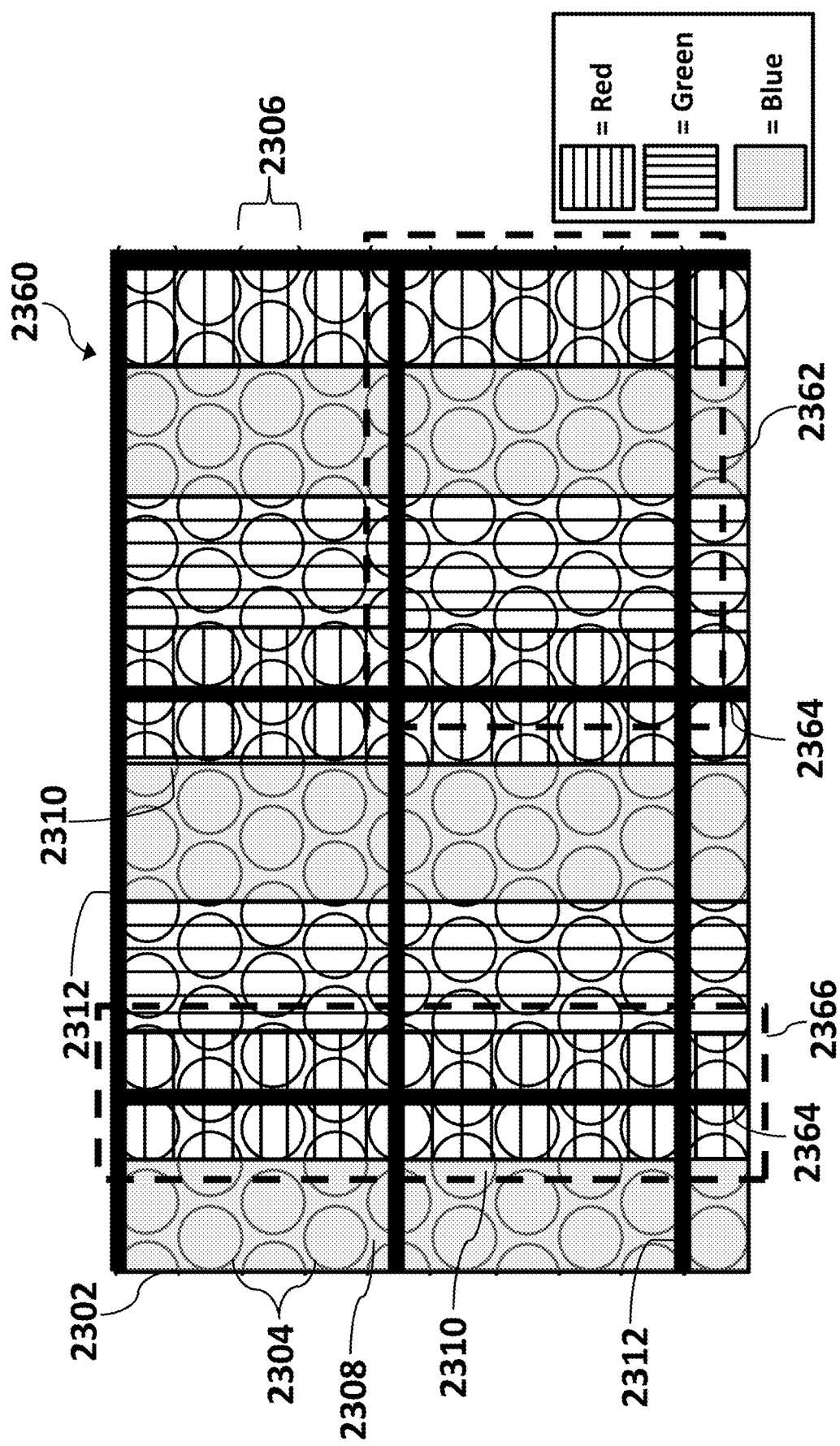
FIG. 23C schematically illustrates a portion of a front sheet comprising walls and color filter sub-pixels on the surface of convex protrusions that may be integrated into a reflective image display.

FIG. 23C schematically illustrates a portion of a front sheet comprising walls and color filter sub-pixels on the surface of convex protrusions that may be integrated into a reflective image display. Design embodiment 2360 in FIG. 23C illustrates how, in some embodiments, walls may not be substantially aligned with respect to one or more of the convex protrusions, more than one color filter sub-pixels and rear thin film transistors. A group of color filter sub-pixels 2362 are highlighted by a dotted line box showing how walls may be formed in some embodiments to fully enclose sub-pixels and partially enclose sub-pixels in an image display. Embodiment 2360 illustrates how walls 2364 may lie on top of a color filter sub-pixel. Walls may further lie on rows 2306 of convex protrusions 2304 or between rows 2306 of convex protrusions. In this illustration, walls lie on a red sub-pixel (horizontal lines) as highlighted by dotted line 2366. Furthermore, a rear TFT may be aligned with the red sub-pixel but may not be aligned with a wall or compartment. A TFT may form a bias with the front electrode in order to move particles to the surface of protrusions 2304 near a color filter sub-pixel on both sides of a wall and in separate compartments.

Figure 23D:
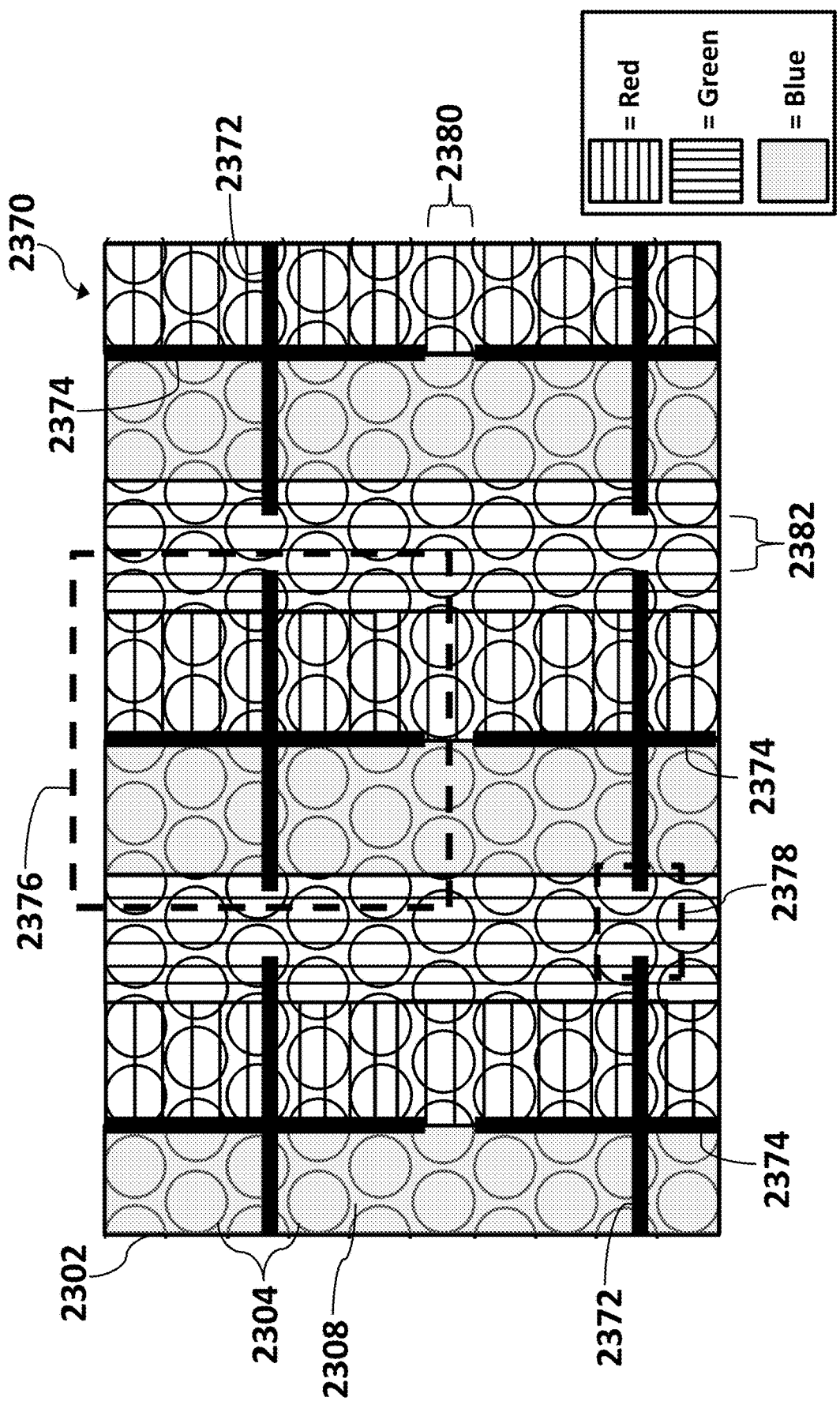
FIG. 23D schematically illustrates a portion of a front sheet comprising full walls with interruptions and color filter sub-pixels on the surface of convex protrusions that may be integrated into a reflective image display.

FIG. 23D schematically illustrates a portion of a front sheet comprising full walls with interruptions and color filter sub-pixels on the surface of convex protrusions that may be integrated into a reflective image display. Design embodiment 2370 in FIG. 23D illustrates how, in some embodiments, full walls that bridge the array of convex protrusions to a rear sheet may comprise gaps or interruptions in one or more directions. Embodiment 2370 in FIG. 23D comprises horizontal direction full walls 2372 and vertical direction full walls 2374. In other embodiments, the walls may be aligned in other directions. Horizontal full walls 2372 and vertical full walls 2374 may cross as highlighted by dotted line box 2376. The full walls may comprise gaps 2378 as highlighted by a dotted line box. In some embodiments, gaps in full walls may only be present in one direction 2380. In other embodiments, gaps in full walls may be present in other directions 2382. In still other embodiments, gaps in full walls may be present in two or more directions as illustrated in embodiment 2370 in FIG. 23D. The full walls with gaps may be placed between adjacent color filter sub-pixels to form a border. This is illustrated by vertical walls 2374 located between blue and red color filter sub-pixels. The full walls with gaps may be located between any adjacent color filter sub-pixels in a controlled or random fashion. In other embodiments, full walls with gaps may not be located between adjacent color filter sub-pixels. In some embodiments, full walls with gaps may be located on rows of convex protrusions or between rows of convex protrusions or a combination thereof. Full walls help to maintain a substantially constant gap distance between the front electrode layer on the surface of the convex protrusions in the front sheet and the rear electrode layer on the rear support sheet. This helps to allow for predictable switching behavior of the electrophoretically mobile particles into and out of the evanescent wave region. The walls may also restrict and minimize drift of the electrophoretically mobile particles to allow for substantially uniform distribution of particles throughout the display. The gaps in the walls allows for more efficient filling of the display with a liquid or air medium comprising electrophoretically mobile particles.

Figure 24:
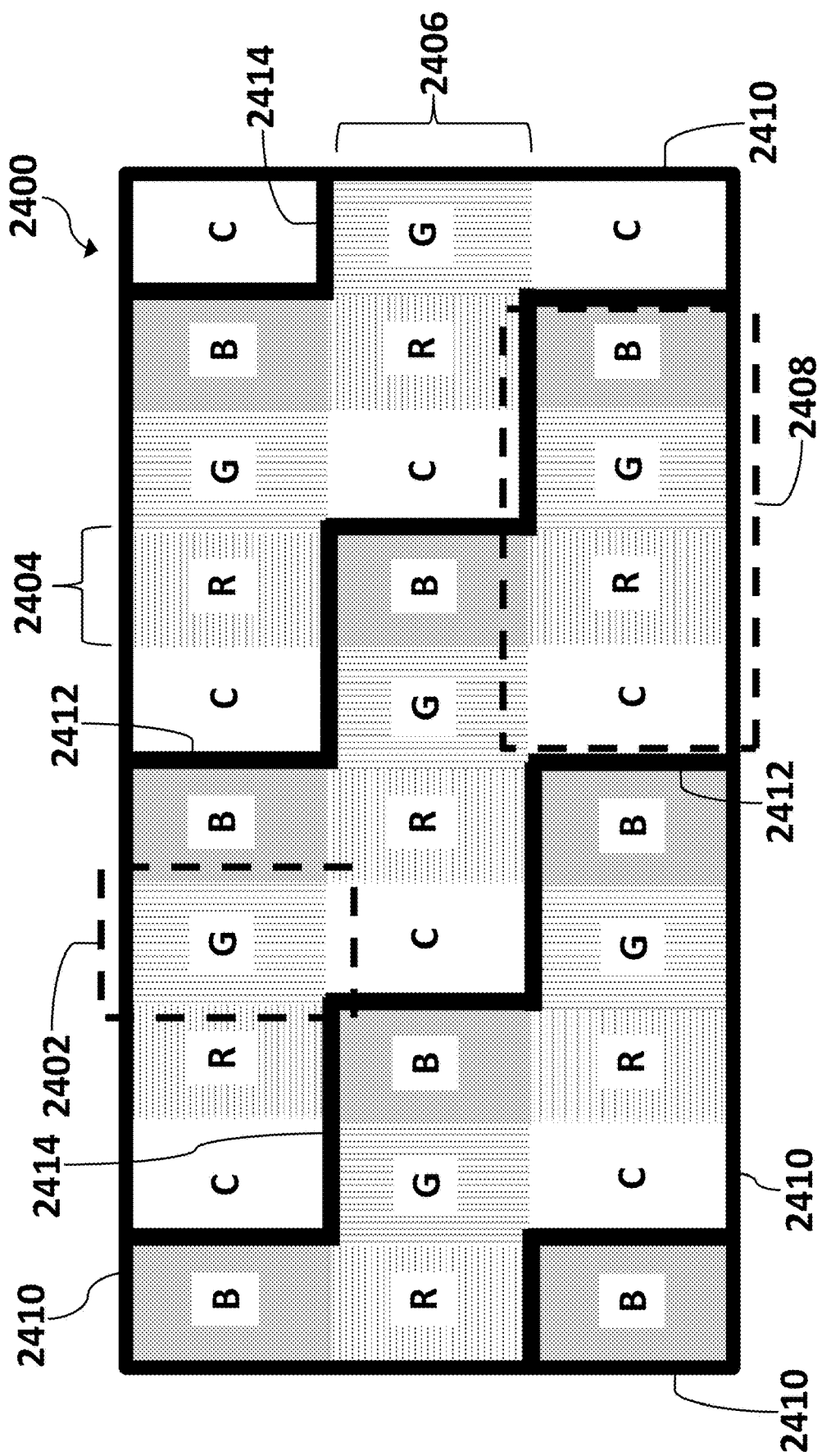
FIG. 24 schematically illustrates a portion of a color filter sub-pixel array comprising walls that are positioned between specific sub-pixel colors that may be integrated into a reflective image display.

FIG. 24 schematically illustrates a portion of a color filter sub-pixel array comprising walls that are positioned between specific sub-pixel colors that may be integrated into a reflective image display. Design embodiment 2400 in FIG. 24 illustrates how, in some embodiments, walls may be positioned between specific color filter sub-pixels (it should be noted that the array of convex protrusions that are typically placed between the color filter sub-pixel array and the walls have been omitted for clarity).

Display 2400 comprises an array of color filter sub-pixels 2402. The color filter sub-pixels may be arranged in specific orders such as clear (C), red (R), green (G) blue (B) as illustrated in FIG. 24 and highlighted by dotted line box 2408. Any specific arrangement of colors may be used depending on the application and desired optical effects required. In some embodiments, the color filter sub-pixels may be arranged in columns 2404 and rows 2406 as illustrated in FIG. 24. In an exemplary embodiment, a reflective image display may comprise perimeter full wall 2410. Perimeter full wall 2410 shown in FIG. 24 substantially completely surrounds the active area of the display. A perimeter wall may be used to act as a barrier to prevent the air or liquid medium comprising electrophoretically mobile particles from contacting edge seal material during filling. Perimeter wall 2410 may also act as a barrier to prevent contamination from the edge seal into the medium comprising electrophoretically mobile particles. A perimeter full wall may be used in any of the reflective display embodiments described herein comprising full walls, partial walls or a combination of full and partial walls.

In some embodiments, the walls may be positioned such that they lie intentionally between specific colored sub-pixels in a regular manner throughout the display. Embodiment 2400 in FIG. 24 illustrates this. Vertically positioned walls 2412 may lie between blue (B) and clear (C) sub-pixels only. Horizontally aligned walls 2414 in FIG. 24 may be positioned between clear (C) and green (G) sub-pixels and between red (R) and blue (B) sub-pixels only. In other embodiments, other specific arrangements of walls positioned between two or more color filter sub-pixels are possible. In other embodiments, walls may be positioned such that they lie intentionally between specific colored sub-pixels in an irregular manner throughout the display. Walls positioned between specific color filter sub-pixels in a regular or irregular manner may be used in any of the reflective display embodiments described herein comprising full walls, partial walls or a combination of full and partial walls.

Any of the front sheet, convex protrusions, color filter sub-pixels and wall designs described herein and illustrated in FIGS. 23-24 may be utilized and integrated into the TIR-based image displays described herein and illustrated in FIGS. 7-15, 18-19 and non-TIR-based displays illustrated in FIGS. 16-17.

In any of the full or partial wall TIR and dual particle-based display embodiments described herein, the walls may comprise a color. The colors may be formed by dyes or pigments dispersed in the material comprising the walls. In one embodiment, the walls may comprise a black color. In other embodiments, the walls may comprise a white color. In an exemplary embodiment, the walls may be transparent. Walls may be optically opaque, colored or isolating improving the color saturation or purity between neighboring pixels. Walls may also be electrically isolating reducing the electrical field crosstalk between pixels and thereby improving the grayscale and/or color saturation of the display. In some embodiments, walls may comprise a refractive index in the range of about 1-2.2. In an exemplary embodiment, walls may comprise a refractive index in the range of about 1.5-2.2.

Figure 25:
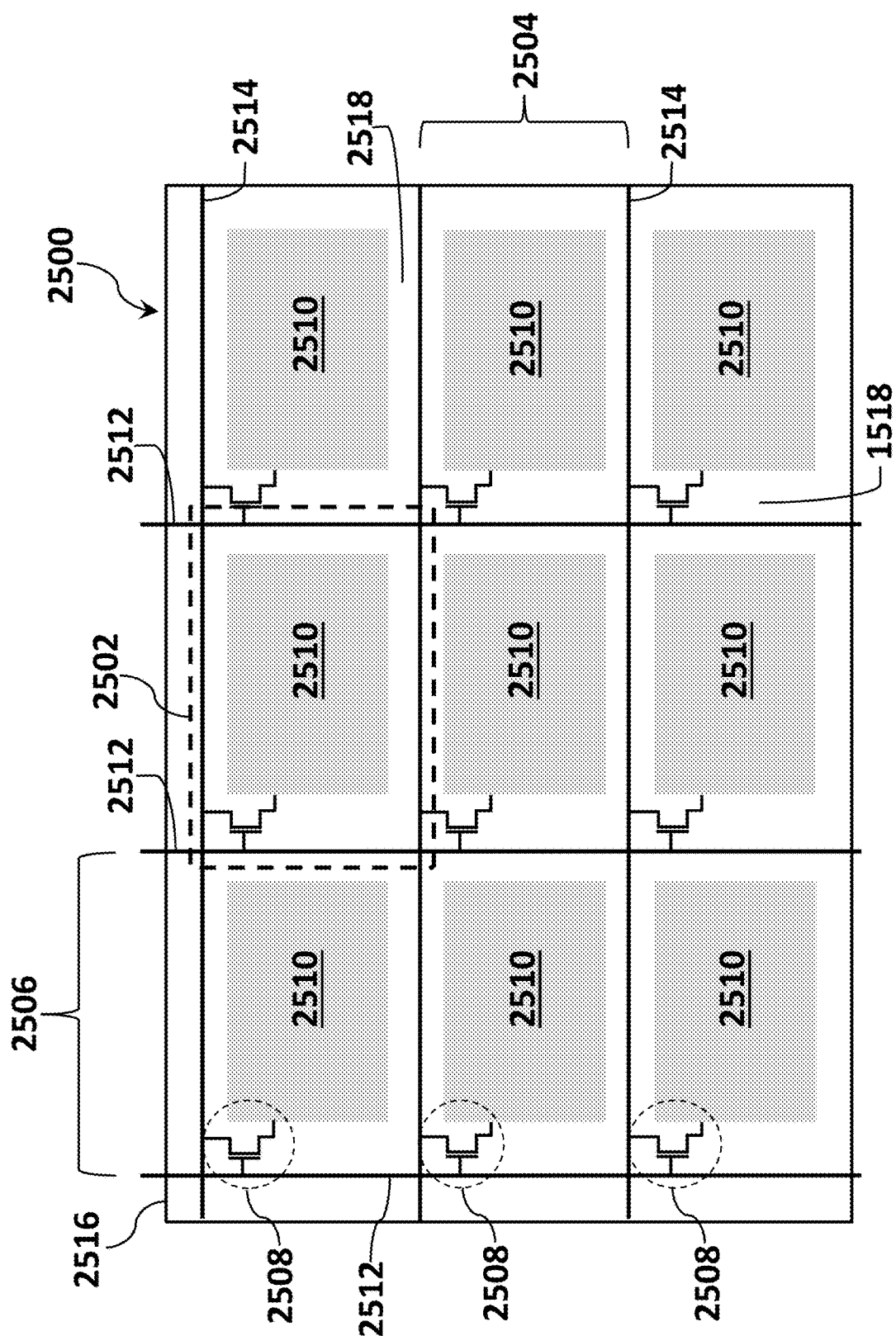
FIG. 25 schematically illustrates an embodiment of a TFT array to drive a display.

FIG. 25 schematically illustrates an embodiment of a TFT array to drive a display. The TFT array is similar to the arrays used to drive conventional LCD displays. The TFT embodiment may be used to drive any of the display embodiments described herein comprising full walls, partial walls or both full and partial walls. The arrangement of particles in a cavity (e.g., particles 1430, 1432 in FIG. 14; particles 1628, 1632 in FIG. 16; particles 1830 in FIG. 18; particles 1930 in FIG. 19) may be controlled by TFT array embodiment 2500 in FIG. 25. In an exemplary embodiment, TFT array 2500 may be used as the rear electrode layer (e.g., electrodes 1414, 1416 in FIG. 14; electrodes 1612, 1614 in FIG. 16; electrode layer 1822 in FIG. 18; electrode layer 1922 in FIG. 19).

TFT array 2500 may comprise an array of pixels 2502 to drive the display embodiments described herein. A single pixel 2502 is highlighted by a dotted line box in FIG. 25. Pixels 2502 may be arranged in rows 2504 and columns 2506 as illustrated in FIG. 25 but other arrangements may be possible. In an exemplary embodiment, each pixel 2502 may comprise a single TFT 2508. In array embodiment 2500, each TFT 2508 may be located in the upper left of each pixel 2502. In other embodiments, the TFT 2508 may be placed in other locations within each pixel 2502. Each pixel 2502 may further comprise a conductive layer 2510 to address each pixel of the display. Layer 2510 may comprise ITO, aluminum, copper, gold, Baytron™, or conductive nanoparticles, silver wires, metal nanowires, graphene, nanotubes, or other conductive carbon allotropes or a combination of these materials dispersed in a polymer. TFT array embodiment 2500 may further comprise column 2512 and row 2514 wires. Column wires 2512 and row wires 2514 may comprise a metal such as aluminum, copper, gold or other electrically conductive metal. Column 2512 and row 2514 wires may comprise ITO. The column 2512 and row 2514 wires may be attached to the TFTs 2508. Pixels 2502 may be addressed in rows and columns. TFTs 2508 may be formed using amorphous silicon or polycrystalline silicon. The silicon layer for TFTs 2508 may be deposited using plasma-enhanced chemical vapor deposition (PECVD). In an exemplary embodiment, each pixel may be substantially aligned with a single color filter (e.g., color filter layer 1444 in FIG. 14; color filter layer 1640 in FIG. 16; color filter layer 1810 in FIG. 18; color filter layer 1910 in FIG. 19). Column 2512 and row 2514 wires may be further connected to integrated circuits and drive electronics to drive the display.

The components of TFT array 2500 may be mounted on sheet 2516. In an exemplary embodiment, sheet 2516 may be glass. In some embodiments, sheet 2516 may comprise glass of thickness in the range of about 20-2000 μm. In an exemplary embodiment, sheet 2516 may comprise glass of thickness in the range of about 20-250 μm. In some embodiments, sheet 2516 may comprise a flexible glass such as SCHOTT AF 32® eco or D 263® T eco ultra-thin glass. In other embodiments, sheet 2516 may comprise a transparent polymer such as polycarbonate or an acrylic such as poly (methyl methacrylate).

TFT array 2500 is generally opaque except for areas between pixels. In an exemplary embodiment, regions 2518 may be transparent. Transparent regions 2518 play an important role in the invention described herein. Regions 2518 between the pixels allow for UV light to pass through to cure a photoresist material. In an exemplary embodiment, TFT array 2500 may act as a photolithographic mask to assemble self-aligned pixel walls.

Figure 26A:
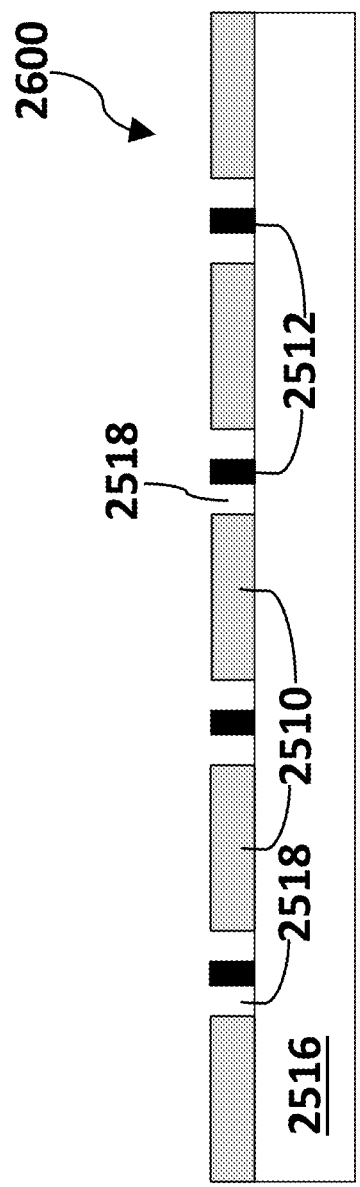
FIG. 26A schematically illustrates a cross-section of a TFT array on a transparent sheet.

FIG. 26A schematically illustrates a cross-section of a TFT array on a transparent sheet. TFT cross-section 2600 in FIG. 26A illustrates transparent regions 2518 between conductive layers 2510 or pads and column wires 2512 on transparent sheet 2516. Regions 2518 may allow for UV curing light to pass through. There may also be transparent regions between conductive layers 2510 and row wires 2514.

Figure 26B:
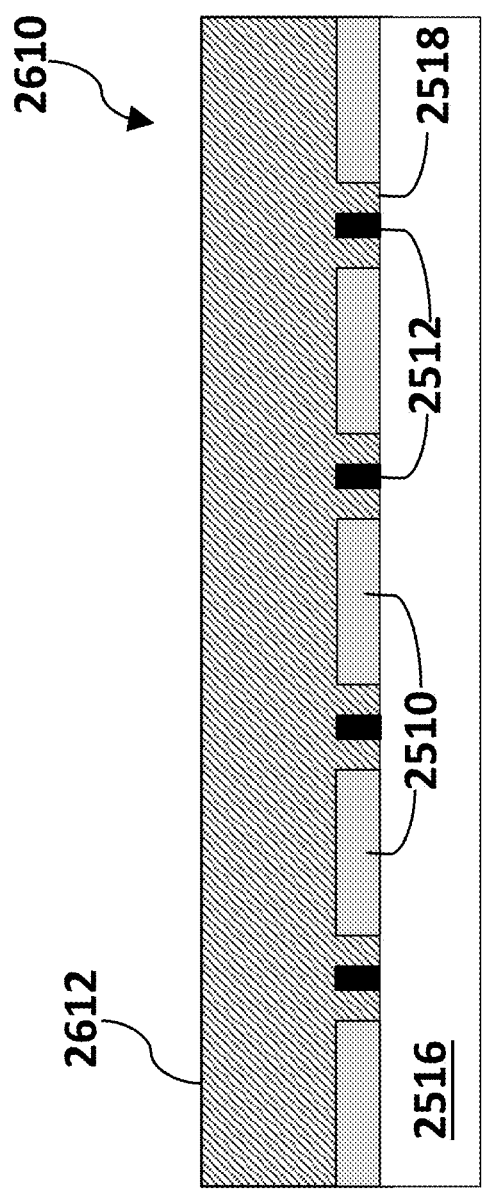
FIG. 26B schematically illustrates a cross-section of a TFT array on a transparent sheet comprising a photoresist layer.

The first step to creating self-aligned pixel walls is to coat the top surface of TFT array 2500 is with a layer of photoresist material. FIG. 26B schematically illustrates a cross-section of a TFT array on a transparent sheet comprising a photoresist layer. Cross-section 2610 in FIG. 26B comprises photoresist material 2612. In an exemplary embodiment, photoresist material 2612 is a negative photoresist material. Negative photoresist layer 2612 may fill in transparent spaces 2518 between conductive layer 2510 and column wires 2512. In an exemplary embodiment, photoresist 2612 may comprise a photo-curable polymer. In some embodiments, photoresist may comprise one or more of Norland Optical Adhesives (NOA line of products, Norland Products, Inc., Cranbury, N.J., USA) such as NOA 86 or NOA89.

Figure 26C:
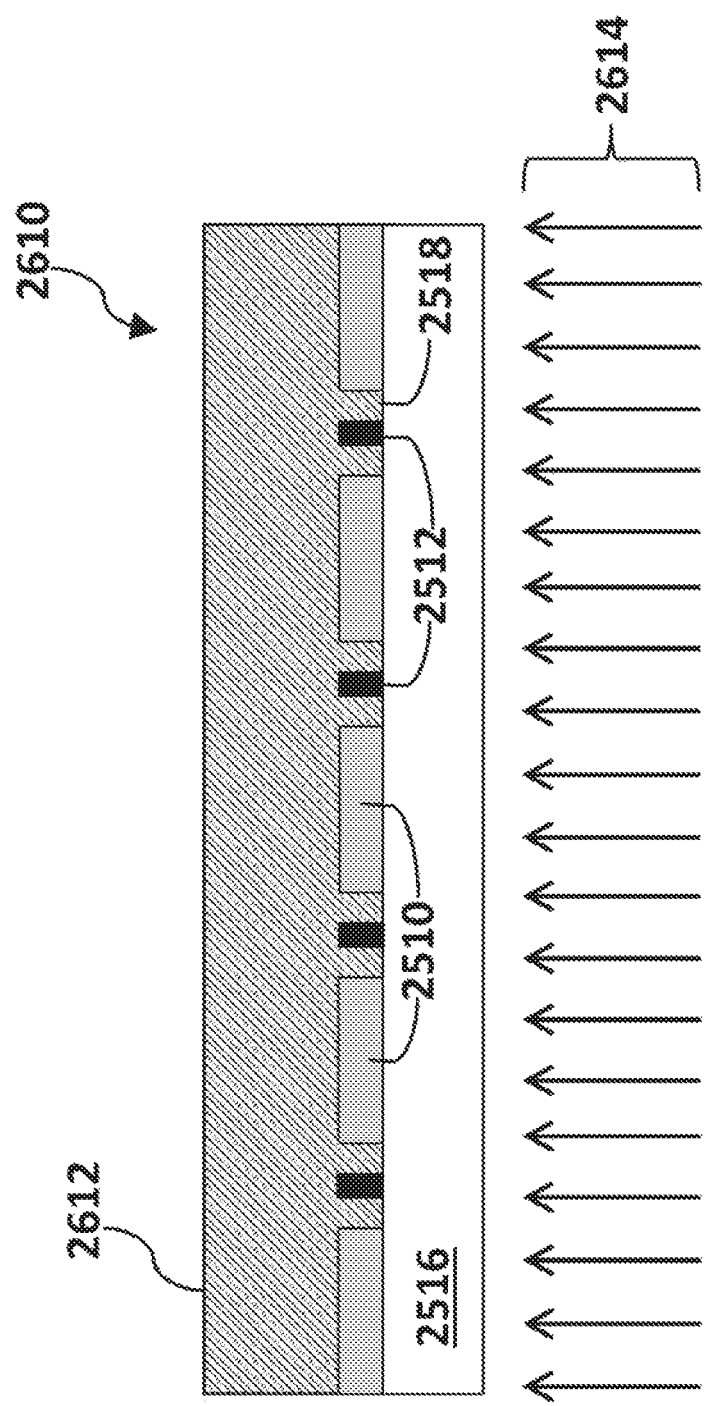
FIG. 26C schematically illustrates a cross-section of a TFT array on a transparent sheet comprising a photoresist layer exposed to UV light.

FIG. 26C schematically illustrates a cross-section of a TFT array on a transparent sheet comprising a photoresist layer exposed to UV light. Photoresist layer 2612 may be exposed to a high intensity light source such as ultra-violet (UV) light or near UV light 2614 through the backside of transparent layer 2516. The UV light may be partially collimated and perpendicular to photoresist layer 2612. UV light 2614 may pass through the transparent regions 2518 between conductive layers 2510 and column wires 2512 and row wires 2514. UV light 2614 that passes through transparent regions 2518 in between the pixels may cure the exposed photoresist 2612. All other light rays 2614 not passing through transparent regions 2518 may be reflected. Resist 2612 may then be developed and rinsed with a chemical solution (i.e. developer) such that the regions not exposed to the high intensity light 2614 are washed, rinsed or stripped away and removed to leave a patterned array of pixel walls.

Figure 26D:
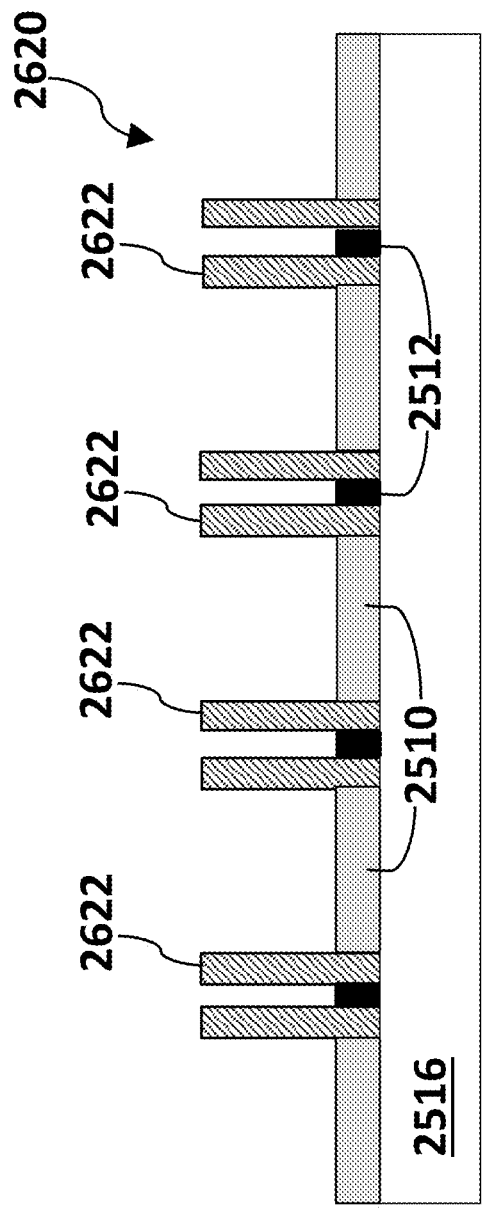
FIG. 26D schematically illustrates a cross-section of a TFT array on a transparent sheet comprising self-aligned pixel walls.

FIG. 26D schematically illustrates a cross-section of a TFT array on a transparent sheet comprising self-aligned pixel walls. TFT array with self-aligned pixel walls 2620 comprises pixel walls 2622 between conductive layers 2510. Photoresist 2612 may be cured with UV light 2614 and developed to leave aligned pixel walls 2622. The technique to assemble self-aligned pixel walls illustrated in FIGS. 26A-D may be carried out on rigid and flexible TFT array backplanes. In one embodiment of a display assembly method, the backplane with aligned pixel walls may then be filled with electrophoretic particles (e.g., 1328 in FIG. 13; 1530 in FIG. 15; 1628 in FIG. 16; 1830 in FIG. 18; 1930 in FIG. 19), low refractive index medium (e.g., 1322 in FIG. 13; 1522 in FIG. 15; 1620 in FIG. 16; 1816 in FIG. 18; 1916 in FIG. 19) and any other additives. Top sheet (e.g., 1302 in FIG. 13; 1502 in FIG. 15; 1602 in FIG. 16; 1802 in FIG. 18; 1902 in FIG. 19) may then be placed on top to seal the display. An optically clear adhesive may be used to adhere a top sheet to pixel walls 2622. Compartments may be formed by the self-aligned pixel walls when a top sheet is added.

Figure 27A:
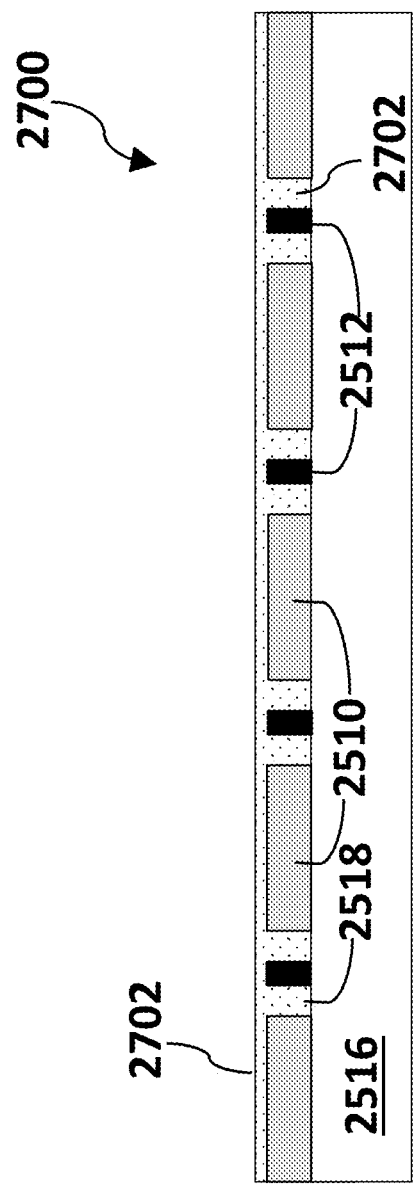
FIG. 27A schematically illustrates a cross-section of a TFT array on a transparent sheet comprising a planarization layer.

The transparent regions between pixels on a TFT backplane are often at a lower height than the opaque regions. This may impact the uniformity of the photoresist coating. One method is to apply a planarization layer on the TFT backplane before coating with photoresist. This process flow is illustrated in FIGS. 27A-D. FIG. 27A schematically illustrates a cross-section of a TFT array on a transparent sheet comprising a planarization layer. Cross-section 2700 comprises planarization layer 2702. Layer 2702 may fill gaps 2518 between conductive layers 2510 and column electrodes 2514 and row electrodes 2514 to create a substantially smooth and uniform surface to apply a photoresist layer. Planarization layer 2702 may comprise a photochemically or thermally curable polymer. In an exemplary embodiment, planarization layer 2702 may also act as a dielectric layer.

Figure 27B:
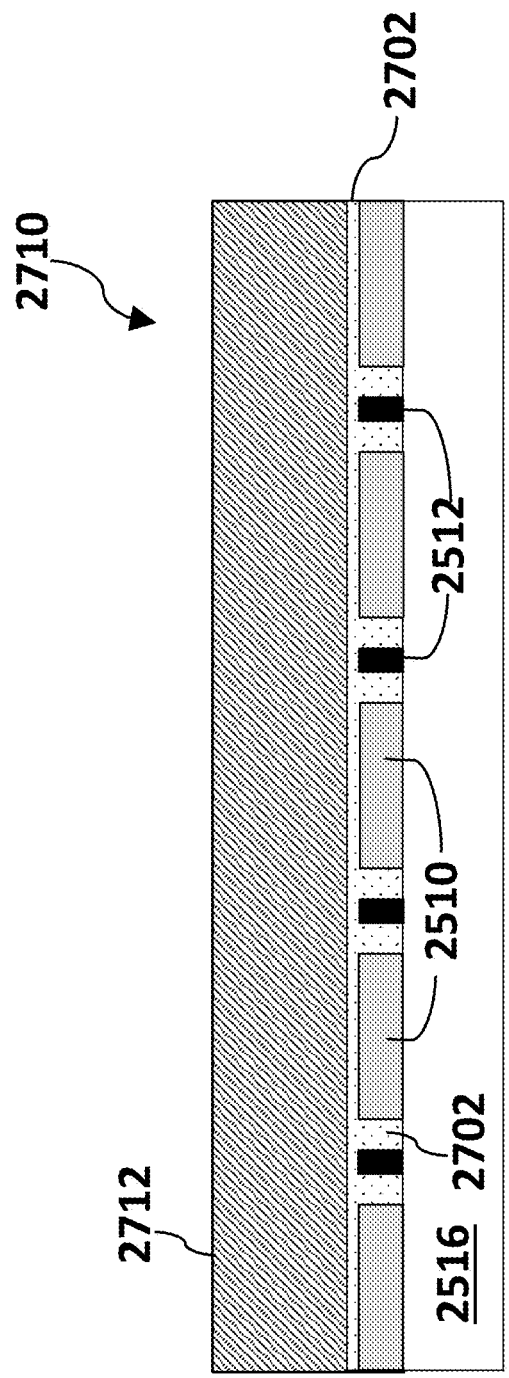
FIG. 27B schematically illustrates a cross-section of a TFT array on a transparent sheet comprising a planarization layer and a photoresist layer.

FIG. 27B schematically illustrates a cross-section of a TFT array on a transparent sheet comprising a planarization layer and a photoresist layer. Cross-section 2710 comprises photoresist material 2712. In an exemplary embodiment, photoresist material 2712 is a negative photoresist material. Negative photoresist layer 2712 may be coated on top of planarization layer 2702. In an exemplary embodiment, photoresist 2712 may comprise a photo-curable polymer. In some embodiments, photoresist 2712 may comprise one or more of Norland Optical Adhesives (NOA line of products, Norland Products, Inc., Cranbury, N.J., USA) such as NOA 86 or NOA89.

Figure 27C:
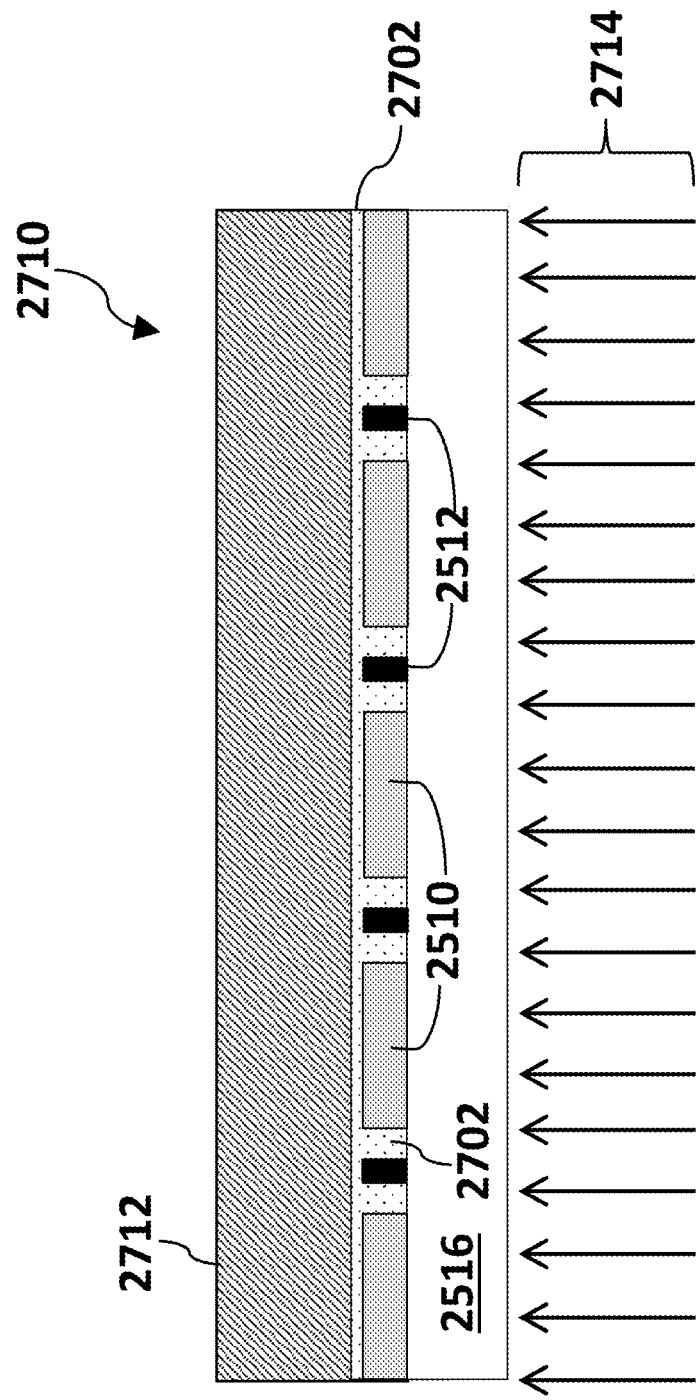
FIG. 27C schematically illustrates a cross-section of a TFT array on a transparent sheet comprising a planarization layer and a photoresist layer exposed to UV light.

FIG. 27C schematically illustrates a cross-section of a TFT array on a transparent sheet comprising a planarization layer and a photoresist layer exposed to UV light. Photoresist layer 2712 may be exposed to a high intensity light source such as ultra-violet (UV) light or near UV light 2714 through the backside of transparent layer 2516. The UV light may be partially collimated and perpendicular to photoresist layer 2712. UV light 2714 may pass through the transparent regions 2518 between conductive layers 2510 and column wires 2512 and row wires 2514. UV light 2714 that passes through transparent regions 2518 in between the pixels may cure the exposed photoresist 2712. All other light rays 2714 not passing through transparent regions 2518 may be reflected. Resist 2712 may then be developed and rinsed with a chemical solution (i.e. developer) such that the regions not exposed to the high intensity light 2714 are washed, rinsed or stripped away and removed to leave a patterned array of pixel walls.

Figure 27D:
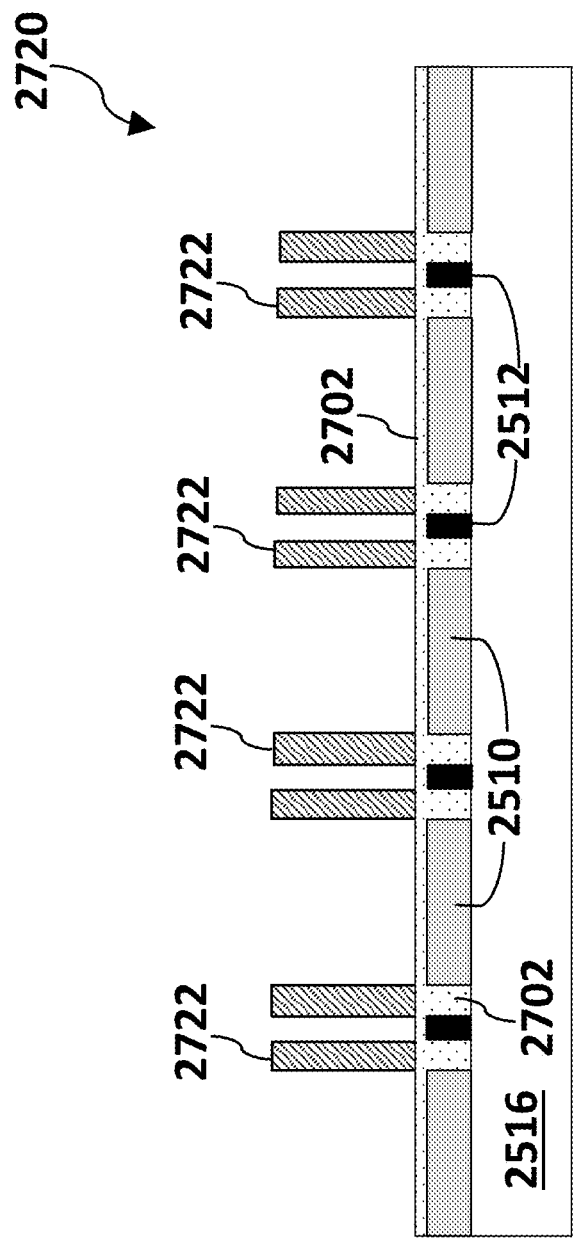
FIG. 27D schematically illustrates a cross-section of a TFT array on a transparent sheet comprising a planarization layer and self-aligned pixel walls.

FIG. 27D schematically illustrates a cross-section of a TFT array on a transparent sheet comprising a planarization layer and self-aligned pixel walls. TFT array with self-aligned pixel walls 2720 comprises pixel walls 2722 on a planarization layer 2702. Photoresist 2712 may be cured with UV light 2714 and developed to leave aligned pixel walls 2722. The technique to assemble self-aligned pixel walls illustrated in FIGS. 27A-D may be carried out on rigid and flexible TFT array backplanes with a planarization layer. In one embodiment of a display assembly method, the backplane with aligned pixel walls on a planarization layer may then be filled with electrophoretic particles (e.g., 1328 in FIG. 13; 1530 in FIG. 15; 1628 in FIG. 16; 1830 in FIG. 18; 1930 in FIG. 19), low refractive index medium (e.g., 1322 in FIG. 13; 1522 in FIG. 15; 1620 in FIG. 16; 1816 in FIG. 18; 1916 in FIG. 19) and any other additives. Top sheet (e.g., 1302 in FIG. 13; 1502 in FIG. 15; 1602 in FIG. 16; 1802 in FIG. 18; 1902 in FIG. 19) may then be placed on top to seal the display. An optically clear adhesive may be used to adhere a top sheet to pixel walls 2722. Compartments may be formed by the self-aligned pixel walls when a top sheet is added.

Figure 27E:
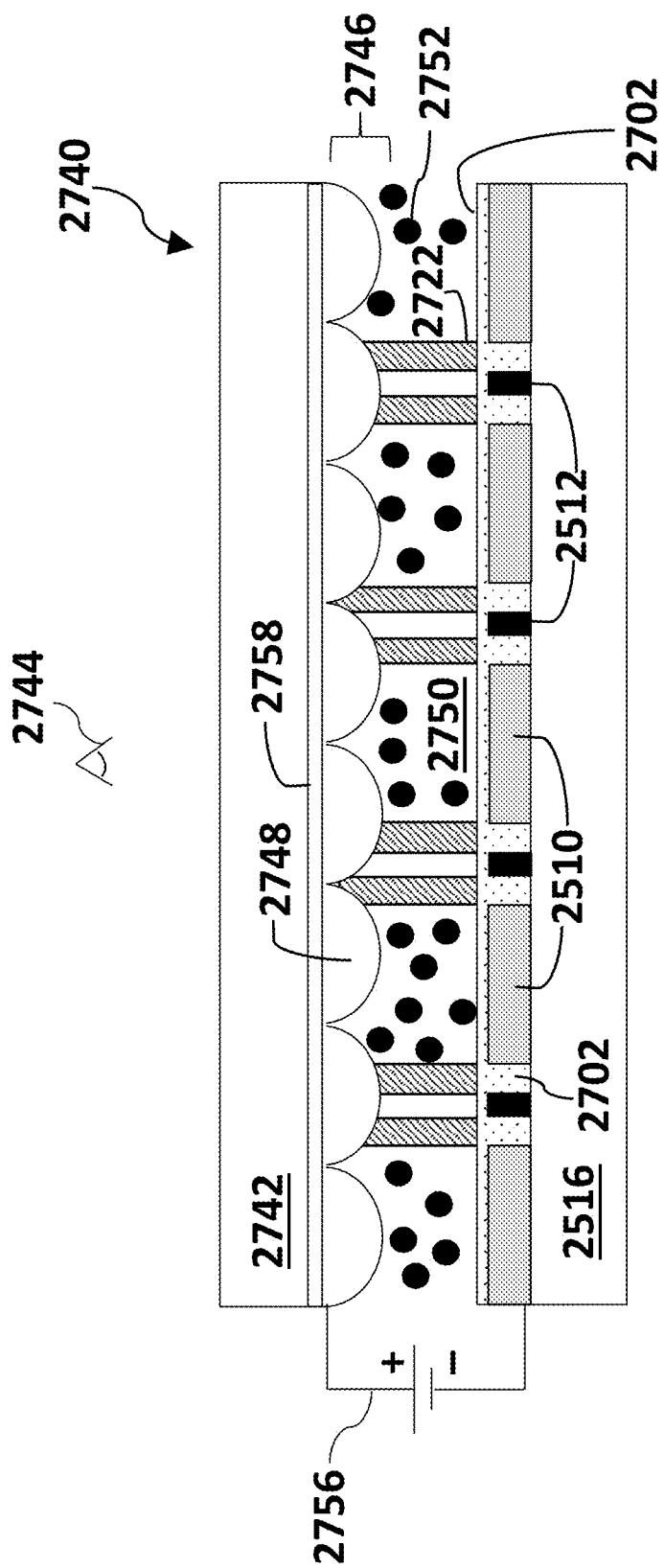
FIG. 27E schematically illustrates a cross-section of a portion of a TIR-based reflective image display comprising self-aligned pixel walls.

FIG. 27E schematically illustrates a cross-section of a portion of a TIR-based reflective image display comprising self-aligned pixel walls. Display embodiment 2740 in FIG. 27E comprises front sheet 2742 facing viewer 2744 further comprising a plurality 2746 of individual convex protrusions 2748. Display 2740 includes rear support 2516 which further comprises conductive layer 2510, column wires 2512, planarization layer 2702, self-aligned pixel walls 2722. Display 2740 comprises medium 2750, electrophoretically mobile particles 2752, voltage source 2756 and color filter sub-pixel layer 2758. Pixel walls 2722 form compartments comprising medium 2750 and particles 2752 aligned with a single pixel 2510. While not shown, display 2740 may further comprise other components as described herein such as a directional front light system, electrode layers, one or more dielectric layers, but have been omitted for clarity of display.

Self-aligned pixel walls may be formed in already assembled displays, such as displays 1300, 1400, 1500, 1600, 1700, 1800, 1900. A display, such as display 1200, may comprise a TFT backplane array that acts as a mask. A photo-polymerizable material may be added to medium 1222 further comprising electrophoretically mobile particles 1224, 1226. UV light may then be exposed through the backside of the TFT, curing the photo-polymerizable material inside the medium. This may create a self-aligned wall structure inside the display after the display has been assembled. In an exemplary embodiment, self-aligned pixel walls in formed using a TFT backplane photomask may be formed by processes and methods described in U.S. Pat. No. 5,668,651A (Sharp Kabushiki Kaisha, Osaka, Japan) and PCT applications WO 2016/206771 A1, WO 2016/206772 A1 and WO 2016/206774 A1 (Merck Patent GMBH, Darmstadt, Germany).

In an exemplary embodiment, the method to form self-aligned pixel walls using a TFT array photomask may be used in reflective liquid crystal (LC) displays. In some embodiments, the method to form self-aligned pixel walls using a TFT array photomask may be used in multi-particle electrophoretic displays comprising a plurality of particles of a first color and first charge polarity and a second plurality of particles of a second color and opposite charge polarity. In other embodiments, the method to form self-aligned pixel walls using a TFT array photomask may be used in multi-particle electrophoretic displays comprising more than two pluralities of particles of different color, different mobilities and charge polarities. In still other embodiments, the method to form self-aligned pixel walls using a TFT array photomask may be used in electrowetting and electrofluidic displays.

Any of the full or partial wall TIR and dual particle-based display embodiments described herein may include at least one transparent barrier layer. A barrier layer may be located in various locations within the TIR-based display embodiment described herein. A barrier layer may act as one or more of a gas barrier or moisture barrier and may be hydrolytically stable. A barrier layer may be one or more of a flexible or conformable polymer. A barrier layer may comprise one or more of polyester, polypropylene, polyethylene terephthalate, polyethylene naphthalate or copolymer, or polyethylene. A barrier layer may comprise one or more of a chemical vapor deposited (CVD) or sputter coated ceramic-based thin film on a polymer substrate. The ceramic may comprise one or more of $Al_2O_3$, $SiO_2$ or other metal oxide. A barrier layer may comprise one or more of a Vitriflex barrier film, Invista OXYCLEAR® barrier resin, Toppan GL™ barrier films GL-AEC-F, GX-P-F, GL-AR-DF, GL-ARH, GL-RD, Celplast Ceramis® CPT-036, CPT-001, CPT-022, CPA-001, CPA-002, CPP-004, CPP-005 silicon oxide ($SiO_x$) barrier films, Celplast CAMCLEAR® aluminum oxide (AlOx) coated clear barrier films, Celplast CAMSHIELD® T AlOx-polyester film, Torayfan® CBH or Torayfan® CBLH biaxially-oriented clear barrier polypropylene films.

Any of the display embodiments described herein may further comprise a conductive cross-over. A conductive cross-over may bond to the front electrode layer and to a trace on the rear electrode layer such as a TFT. This may allow a driver integrated circuit (IC) to control the voltage at the front electrode. In an exemplary embodiment, the conductive cross-over may comprise an electrically conductive adhesive that is flexible or conformable.

Any of the full or partial wall TIR and dual particle-based display embodiments described herein may include at least one diffuser layer. A diffuser layer may be used to soften the incoming light or reflected light or to reduce glare. The diffuser layer may comprise a flexible polymer. The diffuser layer may comprise ground glass in a flexible polymer matrix. The diffuser layer may comprise a micro-structured or textured polymer. The diffuser layer may comprise 3M™ anti-sparkle or anti-glare film. The diffuser layer may comprise 3M™ GLR320 film (Maplewood, Minn.) or AGF6200 film. A diffuser layer may be located at one or more various locations within the display embodiments described herein.

Any of the full or partial wall TIR and dual particle-based display embodiments described herein may comprise at least one optically clear adhesive (OCA) layer. The OCA layer may be flexible or conformable. OCA's may be used to adhere display layers together and to optically couple the layers. Any of the display embodiments described herein may comprise optically clear adhesive layers further comprise one or more of 3M™ optically clear adhesives 3M™ 8211, 3M™ 8212, 3M™ 8213, 3M™ 8214, 3M™ 8215, 3M™ OCA 8146-X, 3M™ OCA 817X, 3M™ OCA 821X, 3M™ OCA 9483, 3M™ OCA 826XN or 3M™ OCA 8148-X, 3M™ CEF05XX, 3M™ CEF06XXN, 3M™ CEF19XX, 3M™ CEF28XX, 3M™ CEF29XX, 3M™ CEF30XX, 3M™ CEF31, 3M™ CEF71XX, Lintec MO-T020RW, Lintec MO-3015UV series, Lintec MO-T015, Lintec MO-3014UV2+, Lintec MO-3015UV.

In other embodiments, any of the reflective image display embodiments comprising at least one full or partial wall disclosed herein may further include at least one spacer structure. The spacer structures may be used to control the gap between the front and rear electrodes. Spacer structures may be used to support the various layers in the displays. The spacer structures may be in the shape of circular or oval beads, blocks, cylinders or other geometrical shapes or combinations thereof. The spacer structures may comprise glass, metal, plastic or other resin.

At least one edge seal may be employed with the disclosed display embodiments. The edge seal may prevent ingress of moisture, air or other environmental contaminants from entering the display. The edge seal may be a thermally, chemically or a radiation cured material or a combination thereof. The edge seal may comprise one or more of an epoxy, silicone, polyisobutylene, acrylate or other polymer based material. In some embodiments the edge seal may comprise a metallized foil. In some embodiments the edge sealant may comprise a filler such as $SiO_2$ or $Al_2O_3$. In other embodiments, the edge seal may be flexible or conformable after curing. In still other embodiments, the edge seal may also act as a barrier to moisture, oxygen and other gasses. At least one edge seal may comprise one or more of Sekisui Chemical (Osaka, Japan) SUR-137, Kyoritsu Chemical (Tokyo, Japan) 723K, Nagase (Tokyo, Japan) XNR5570 or Nagase XNR5588LV.

Any of the display embodiments described herein comprising at least one partial wall or a full wall or a combination of partial and full walls may further comprise, a viscosity enhancement material. In an exemplary embodiment, the viscosity enhancement material may be added to the medium comprising electrophoretically mobile particles to prevent diffusion driven particle migration. In other embodiments, a viscosity enhancement material that undergoes shear thickening may be added to the medium comprising electrophoretically mobile particles. Any of the display embodiments described herein comprising at least one partial wall or full wall, may further comprise a gettering material. The gettering material may consume and trap the electrophoretically mobile particles thus suppressing subsequent diffusion driven migration.

In some embodiments, any of the display embodiments described herein may comprise at least one partial wall or a full wall of height in the range of about 1-50 µm. In other embodiments, the height of the walls may be in the range of about 2-30 µm. In still other embodiments, the height of the walls may be in the range of about 5-25 µm. In an exemplary embodiment, the height of the walls may be in the range of about 10-25 µm.

In some embodiments, any of the display embodiments described herein may comprise at least one partial wall or a full wall of width in the range of about 1-30 µm. In other embodiments, the width of the walls may be in the range of about 1-20 µm. In still other embodiments, the width of the walls may be in the range of about 2-15 µm. In an exemplary embodiment, the width of the walls may be in the range of about 4-10 µm.

In some embodiments, the aspect ratio of wall height/wall width is in the range of about 1-25. In other embodiments, the aspect ratio of wall height/wall width is in the range of about 1-15. In still other embodiments, the aspect ratio of wall height/wall width is in the range of about 1-5. In an exemplary embodiment, the aspect ratio of wall height/wall width is in the range of about 1-2.

Any of the full or partial wall TIR and dual particle-based display embodiments described herein may comprise a rigid or flexible front light system with an outer surface facing a viewer. The front light system may comprise a light source to emit light through an edge of a light guide. The light source may comprise one or more of a light emitting diode (LED), cold cathode fluorescent lamp (CCFL) or a surface mounted technology (SMT) incandescent lamp. In an exemplary embodiment, the light source may define an LED whose output light emanates from a refractive or reflective optical element that concentrates said diode's output emission in a condensed angular range to an edge of a light guide. In some embodiments, a light source may be optically coupled to light guide.

The light guide may comprise one or more of a flexible or conformable polymer. The light guide may comprise more than one layer. The light guide may comprise one or more contiguous layers light guiding layers parallel to each other. The light guide may comprise at least a first light guiding layer that forms a transparent bottom surface. The light guide may comprise a second layer that forms a transparent top or outer surface. The light guide may comprise a third layer that forms a central transparent core. The refractive indices of the layers of the light guide may differ by at least 0.05. The multiple layers may be optically coupled. In an exemplary embodiment, the light guide may comprise an array of light extractor elements. The light extractor elements may comprise one or more of light scattering particles, dispersed polymer particles, air pockets, tilted prismatic facets, parallel prism grooves, curvilinear prism grooves, curved cylindrical surfaces, conical indentations, spherical indentations or aspherical indentations. The light extractor elements may be arranged such that they redirect light towards a semi-retro-reflective display sheet in a substantially perpendicular direction to the front surface of the semi-retro-reflective display sheet with a non-Lambertian narrow-angle distribution. The light guide may comprise diffusive optical haze. The front light system may contain more than one active zone. A light guide system utilized in any of the display embodiments described herein may comprise of a FLEx Front Light Panel made from FLEx Lighting (Chicago, Ill.). The light guide may comprise an ultra-thin, flexible light guide film manufactured by Nanocomp Oy, Ltd. (Lehmo, Finland).

In some embodiments, a porous reflective layer may be used in combination with the disclosed display embodiments. The porous reflective layer may be interposed between the front and rear electrode layers. In other embodiments the rear electrode may be located on the surface of the porous electrode layer.

In some embodiments, a dielectric layer may be used in combination with the disclosed display embodiments. The dielectric layer may be located on the surface of the transparent front electrode layer. The dielectric layer may be located on the surface of the rear electrode layer. Dielectric layers may be located on the surface of the front electrode and rear electrode layers. The dielectric layer may be used to protect the transparent electrode layer. The dielectric layer may define a conformal coating and may be free of pin holes or may have minimal pin holes. The dielectric layer may also be a structured layer. The dielectric layer may be a polymer or a combination of polymers. In an exemplary embodiment, the dielectric layer may include parylene. The dielectric layer may be a polymer such as a halogenated parylene or a polyimide. The dielectric layer may be a glass such as $SiO_2$, SiN, SiON, $SiN_x$, or other metal oxide inorganic layer. The dielectric layer may be a combination of a polymer and a glass. The compositions of the dielectric layers may approximately be the same on both the front and rear electrode layers in a symmetric fashion. The compositions of the dielectric layers may be different on the front and rear electrode layers in an asymmetric fashion.

Various control mechanisms for the invention may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

In some embodiments, a tangible machine-readable non-transitory storage medium that contains instructions may be used in combination with the disclosed display embodiments. In other embodiments the tangible machine-readable non-transitory storage medium may be further used in combination with one or more processors.

Figure 28:
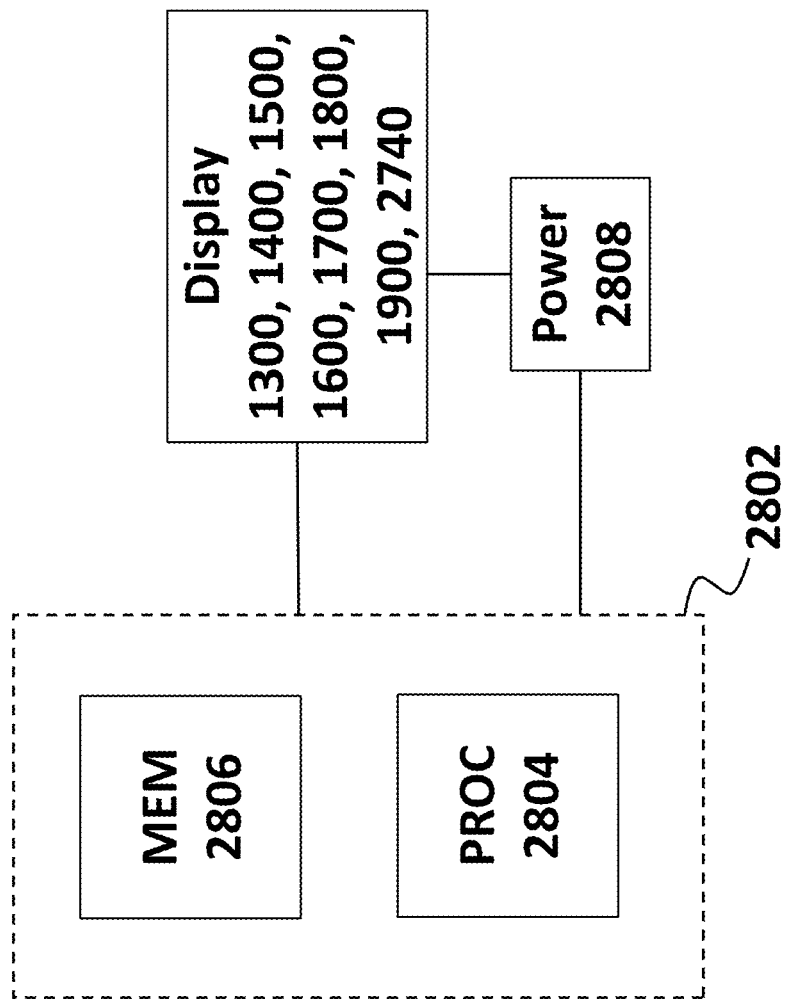
FIG. 28 schematically illustrates an exemplary system for implementing an embodiment of the disclosure.

FIG. 28 shows an exemplary system for controlling a display according to one embodiment of the disclosure. In FIG. 28, display 1300, 1400, 1500, 1600, 1700, 1800, 1900, 2740 is controlled by controller 2802 having processor 2804 and memory 2806. Other control mechanisms and/or devices may be included in controller 2802 without departing from the disclosed principles. Controller 2802 may define hardware, software or a combination of hardware and software. For example, controller 2802 may define a processor programmed with instructions (e.g., firmware). Processor 2804 may be an actual processor or a virtual processor. Similarly, memory 2806 may be actual memory (i.e., hardware) or virtual memory (i.e., software).

Memory 2806 may store instructions to be executed by processor 2804 for driving display 1300, 1400, 1500, 1600, 1700, 1800, 1900, 2740. The instructions may be configured to operate display 1300, 1400, 1500, 1600, 1700, 1800, 1900, 2740. In one embodiment, the instructions may include biasing electrodes associated with display 1300, 1400, 1500, 1600, 1700, 1800, 1900, 2740 (not shown) through power supply 2808. When biased, the electrodes may cause movement of electrophoretic particles to a region proximal to the front electrode to thereby absorb light. Absorbing the incoming light creates a dark state of display 1300, 1400, 1500, 1600, 1700, 1800, 1900, 2740. By appropriately biasing the electrodes, mobile light absorbing particles (e.g., particles 1430, 1432 in FIG. 14; particles 1628, 1632 in FIG. 16; particles 1830 in FIG. 18; particles 1930 in FIG. 19; particles 2752 in FIG. 27E) may be summoned to a location away from the transparent front electrode (e.g., electrode 1410 in FIG. 14; electrode 1608 in FIG. 16; electrode 1818 in FIG. 18; electrode 1918 in FIG. 19) and out of the evanescent wave region. Moving particles out of the evanescent wave region causes light to be reflected at the surface of the plurality of convex protrusions (e.g., protrusions 1404 in FIG. 14; protrusions 1808 in FIG. 18; protrusions 1908 in FIG. 19; protrusions 2748 in FIG. 27E) by TIR and zeroth order reflections. In FIGS. 16-17, light may be reflected by moving reflective electrophoretically mobile particles (such as $TiO_2$) to the front sheet. Reflecting the incoming light creates a light state of display 1300, 1400, 1500, 1600, 1700, 1800, 1900, 2740.

In the exemplary display embodiments described herein, they may be used in Internet of Things (IoT) devices. The IoT devices may comprise a local wireless or wired communication interface to establish a local wireless or wired communication link with one or more IoT hubs or client devices. The IoT devices may further comprise a secure communication channel with an IoT service over the internet using a local wireless or wired communication link. The IoT devices comprising one or more of the display devices described herein may further comprise a sensor. Sensors may include one or more of a temperature, humidity, light, sound, motion, vibration, proximity, gas or heat sensor. The IoT devices comprising one or more of the display devices described herein may be interfaced with home appliances such as a refrigerator, freezer, television (TV), close captioned TV (CCTV), stereo system, heating, ventilation, air conditioning (HVAC) system, robotic vacuum, air purifiers, lighting system, washing machine, drying machine, oven, fire alarms, home security system, pool equipment, dehumidifier or dishwashing machine. The IoT devices comprising one or more of the display devices described herein may be interfaced with health monitoring systems such as heart monitoring, diabetic monitoring, temperature monitoring, biochip transponders or pedometer. The IoT devices comprising one or more of the display devices described herein may be interfaced with transportation monitoring systems such as those in an automobile, motorcycle, bicycle, scooter, marine vehicle, bus or airplane.

In the exemplary display embodiments described herein, they may be used IoT and non-IoT applications such as in, but not limited to, electronic book readers, portable computers, tablet computers, cellular telephones, smart cards, signs, watches, wearables, military display applications, automotive displays, automotive license plates, shelf labels, flash drives and outdoor billboards or outdoor signs comprising a display. The displays may be powered by one or more of a battery, solar cell, wind, electrical generator, electrical outlet, AC power, DC power or other means.

It will be apparent to those skilled in the technology of image displays that numerous changes and modifications can be made in the preferred embodiments of the invention described above without departing from scope of the invention. Accordingly, the foregoing description is to be construed in an illustrative and not in a limitative sense, the scope of the invention being defined solely by the appended claims.

What is claimed is:

1. An image display device to limit particle drift and diffusion, the display comprising:
   a front electrode;
   an optically transparent sheet having a surface with a plurality of convex protrusions extending from a surface thereof;
   a rear electrode positioned opposite the plurality of convex protrusions to form a cavity therebetween;
   at least one electrophoretically mobile particle suspended within the cavity; and
   a plurality of partitions to form one or more segments within the cavity, wherein at least one protrusion extends partially into the cavity;
   wherein the plurality of partitions further comprises at least three or more partitions that form one or more partitioned space within the cavity and wherein a first partition of the plurality of partitions extends from a convex protrusion arch.

2. The image display device of claim 1, wherein the image display device defines a Totally Internally Reflective (TIR) device.

3. The image display device of claim 1, further comprising a medium disposed in the cavity.

4. The image display device of claim 1, wherein the at least one electrophoretically mobile particle defines a charged particle.

5. The image display device of claim 1, further comprising a voltage source to apply a voltage bias across the medium to form an electromagnetic field between the front electrode and the rear electrode to generate a field between the front and the rear electrodes.

6. The image display device of claim 1, wherein the three or more partitions extend from each of a respective convex protrusions towards the cavity.

7. The image display device of claim 1, wherein at least one of the plurality of partitions extends from a region proximal to the rear electrode into the cavity.

8. The image display device of claim 1, wherein a first of the plurality of partitions extends from a first convex protrusion towards the cavity and a second of the plurality of partitions extends from the bottom electrode towards the cavity.

9. The image display device of claim 8, wherein the first and the second partitions are substantially aligned in a first direction.

10. The image display device of claim 8, wherein the first and the second partitions are not aligned.

11. The image display device of claim 1, wherein a first partition of the plurality of partitions extends from an abutment of two adjoining protrusions.

12. An image display device to limit particle drift and diffusion, the display comprising:
    a front electrode;
    an optically transparent sheet having a surface with a plurality of convex protrusions extending from a surface thereof;
    a rear electrode positioned opposite the plurality of convex protrusions to form a cavity therebetween;
    at least one electrophoretically mobile particle suspended within the cavity; and
    a plurality of partitions to form one or more segments within the cavity, wherein the plurality of partitions further include at least three or more partitions that form one or more partitioned space within the cavity and wherein the first of the plurality of partitions extends from a convex protrusion arch.

13. The image display device of claim 12, wherein the image display device defines a Totally Internally Reflective (TIR) device.

14. The image display device of claim 12, further comprising a medium disposed in the cavity.

15. The image display device of claim 12, wherein the at least one electrophoretically mobile particle defines a charged particle.

16. The image display device of claim 12, further comprising a voltage source to apply a voltage bias across the medium to form an electromagnetic field between the front electrode and the rear electrode to generate a field between the front and the rear electrodes.

17. The image display device of claim 12, wherein first of the plurality of partitions extends from a first convex protrusion towards the cavity and a second of the plurality of partitions extends from the bottom electrode towards the cavity.

18. The image display device of claim 17, wherein the first and the second partitions are substantially aligned in a first direction.

19. The image display device of claim 17, wherein the first and the second partitions are not aligned.

* * * * *